United States Patent [19]

Terahara et al.

[11] Patent Number: 5,729,372
[45] Date of Patent: Mar. 17, 1998

[54] OPTICAL TRANSMISSION METHOD AND APPARATUS AND OPTICAL AMPLIFICATION METHOD AND APPARATUS FOR OPTICAL COMMUNICATION SYSTEM

[75] Inventors: Takafumi Terahara; Terumi Chikama; Masuo Suyama; Takao Naito, all of Kawasaki, Japan

[73] Assignee: Fujitsu Limited, Kanagawa, Japan

[21] Appl. No.: 712,958

[22] Filed: Sep. 12, 1996

Related U.S. Application Data

[63] Continuation of Ser. No. 216,263, Mar. 21, 1994, abandoned.

[30] Foreign Application Priority Data

Jun. 28, 1993 [JP] Japan ................................ 5-157159
Jan. 13, 1994 [JP] Japan ................................ 6-002079

[51] Int. Cl.$^6$ ................................ H04B 10/04
[52] U.S. Cl. .................. 359/180; 359/181; 359/188; 359/345; 359/156
[58] Field of Search ................................ 372/11, 26, 28, 372/29; 359/156, 180, 181, 188, 333, 345

[56] References Cited

U.S. PATENT DOCUMENTS

| | | | |
|---|---|---|---|
| 5,113,458 | 5/1992 | Taylor | 359/123 |
| 5,255,274 | 10/1993 | Wysocki et al. | 372/26 |
| 5,311,592 | 5/1994 | Udd | 359/164 |
| 5,337,375 | 8/1994 | Nyman | 372/6 |
| 5,381,230 | 1/1995 | Blake | 372/32 |

FOREIGN PATENT DOCUMENTS

| | | | |
|---|---|---|---|
| 2250402 | 10/1987 | Japan . | |
| 3135511 | 6/1991 | Japan . | |
| 4180282 | 6/1992 | Japan . | |
| 05-313215 | 11/1993 | Japan . | |
| 2175766 | 12/1988 | United Kingdom | 359/179 |

*Primary Examiner*—Leslie Pascal
*Attorney, Agent, or Firm*—Helfgott & Karas, PC.

[57] ABSTRACT

The invention provides an optical transmission method and apparatus suitable for use with a terminal station apparatus for an optical communication system for a very long distance of up to several thousands kilometers across an ocean as well as an optical amplification method and apparatus suitable for use with a repeater for an optical communication system. The methods and apparatus are improved in that the excessive loss in an optical amplifier and the variation of the branching ratio are suppressed to suppress the variation of the gain to suppress the polarization dependency of the loss or the gain on a transmission line of the optical communication system. The optical transmission apparatus comprises a depolarized light source for outputting depolarized light, and an external modulator for modulating light from the depolarized light source.

22 Claims, 37 Drawing Sheets

FIG. 17(a) SOLITON PULSE TRAIN AT POINT a 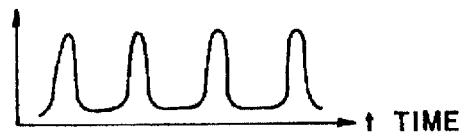
FIG. 17(b) SOLITON PULSE TRAIN AT POINT b 
FIG. 18
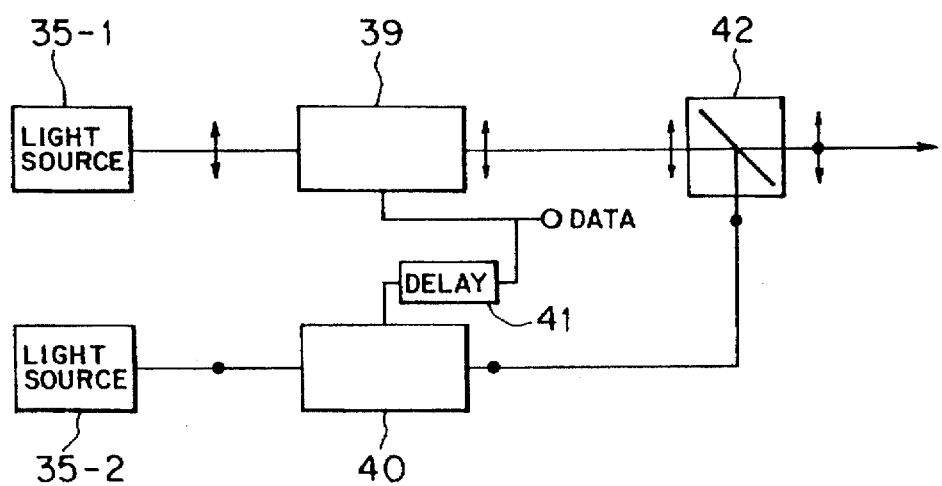

FIG. 48

| TOTAL SYSTEM LENGTH | 10000km |
|---|---|
| REPEATER SPAN | 40 km |
| BITE RATE | 5Gb/s |
| EXTINCTION RATIO | 13dB |
| REPEATER NUMBER | 199 |
| FIBER LOSS | 0.22dB/km |
| NOISE FIGURE | 6dB |
| ASE BANDWIDTH | 3nm |
| RECEIVER BANDWIDTH | 3.5Ghz |
| REPEATER OUTPUT POWER | 4dBm |

OPTICAL TRANSMISSION METHOD AND APPARATUS AND OPTICAL AMPLIFICATION METHOD AND APPARATUS FOR OPTICAL COMMUNICATION SYSTEM

This is a continuation, of application Ser. No. 08/216,263, filed Mar. 21, 1994 now abandoned.

BACKGROUND OF THE INVENTION

This invention relates to an optical transmission method and apparatus suitable for use with a terminal station apparatus for an optical communication system for a very long distance of up to several thousands kilometers across an ocean as well as an optical amplification method and apparatus suitable for use with a repeater for an optical communication system.

A repeater for use with a very long distance transmission system across an ocean of up to several thousands kilometers is constructed as a regeneration repeater which converts signal light once into an electric signal, amplifies the electric signal, converts the electric signal back into signal light and then repeats the signal light. Now, investigations are directed to realization of an optical amplifier multi-stage repeating system wherein, replacing such regeneration repeater, by an optical amplifier repeater which amplifies signal light, a plurality of optical amplifier repeaters are connected in a chain to effect optical communications.

Since the optical amplifier multi-stage repeating system has a function of optical amplification without relying upon the transmission rate, it is anticipated that the transmission rate is raised by improving the terminal station apparatus on the opposite sides to reduce the number of parts significantly, assure a high reliability and achieve reduction of the cost.

As an optical amplifier (repeater) for use with the optical amplifier multi-stage repeating system, investigations are directed to a doped fiber amplifier which is accommodated in a single repeater housing for each of an ascending line and a descending line and employs an excitation light source in an amplifier of each of the ascending line and the descending line. The doped fiber amplifier is constituted mainly from a doped fiber, an excitation light source, and an optical coupler (or wave combiner).

An exemplary one of popular doped fiber amplifiers is shown in FIG. 51. Referring to FIG. 51, the doped fiber amplifier shown includes an input port 101 for inputting signal light therethrough, an excitation light source 102 for outputting excitation light, a wave combiner 103 for coupling signal light from the input port 101 and excitation light from the excitation light source 102, a doped fiber 104 for amplifying light from the wave combiner 103, and an output port 105 for outputting light from the doped fiber 104.

The doped fiber amplifier shown in FIG. 51 has a so-called forward excitation construction wherein the wave combiner 103 is provided on the input side of the doped fiber 104 and excitation light from the excitation light source 102 is inputted to the doped fiber 104 from the front of the same.

In the popular doped fiber amplifier shown in FIG. 51 and having the construction just described, excitation light outputted from the excitation light source 102 is inputted to the doped fiber 104 using the wave combiner 103, and also signal light from the input port 101 is inputted to the doped fiber 104 using the wave combiner 103. In the doped fiber 104, the signal light is excited by the thus inputted excitation light in accordance with the energy level of doped ions of the doped fiber 104. Thus, the signal light is increased by stimulated emission of the excitation light with the signal light inputted from the input port 101.

FIG. 52 shows another doped fiber amplifier which has a so-called rearward excitation construction. The doped fiber amplifier shown in FIG. 52 is different from the doped fiber amplifier shown in FIG. 51 in that the wave combiner 103 is provided on the output side of the doped fiber 104 and excitation light from the excitation light source 102 is inputted from the rear of the doped fiber 104.

FIG. 53 shows a further doped fiber amplifier which has a so-called bidirectional excitation construction. Referring to FIG. 53, a first wave combiner 103a is provided on the input side of the doped fiber 104 and excitation light from an excitation light source 102a is inputted from the front of the doped fiber 104 while a second wave combiner 103b is provided on the output side of the doped fiber 104 and excitation light from another excitation light source 102b is inputted from the rear of the doped fiber 104.

It is to be noted that the input port 101, the doped fiber 104 and the output port 105 have similar functions to those of the doped fiber amplifiers described hereinabove with reference to FIGS. 51 and 52.

Meanwhile, various improvements to the amplifiers described above have been proposed wherein output light from a single excitation light source is supplied to both of an ascending line and a descending line from the point of view of reduction of the number of parts and enhancement of the reliability.

One of such improved doped fiber amplifiers is shown in FIG. 54. Referring to FIG. 54, the improved doped fiber amplifier shown has a forward excitation construction and includes an input port 201a for inputting signal light (first signal light) of an ascending line therethrough, a wave combiner 203a for coupling signal light of the ascending line and excitation light, a first doped fiber 204a for amplifying light from the wave combiner 203a, an output port 205a for outputting light from the first doped fiber 204a, an input port 201b for inputting signal light (second signal light) of a descending line, a wave combiner 203b for coupling signal light of the descending line and excitation light, a second doped fiber 204b for amplifying light from the wave combiner 203b, an output portion 205b for outputting light from the second doped fiber 204b, a first excitation light source 202a and a second excitation light source 202b for outputting excitation light, and a coupler 206 for splitting excitation light outputted from the first excitation light source 202a and the second excitation light source 202b.

in the doped fiber amplifier of FIG. 54 having the construction just described, excitation light from the first excitation light source 202a and the second excitation light source 202b is split by the coupler 206. Meanwhile, first and second signal light beams are inputted to and excited by the wave combiners 203a and 203b and then amplified by and outputted from the first and second doped fibers 204a and 204b.

Accordingly, even when only the first excitation light source 202a is used, excitation light is outputted to the first and second wave combiners 203a and 203b by way of the coupler 206 to amplify signal light of the ascending line and the descending line, respectively. Meanwhile, the second excitation light source 202b is employed in order to provide redundancy.

FIG. 55 shows another improved doped fiber amplifier. Referring to FIG. 55, the improved doped fiber amplifier shown has a rearward excitation construction and has a similar construction to that of the doped fiber amplifier described hereinabove with reference to FIG. 54 except that excitation light is inputted from the rear of each of the first and second doped fibers 204a and 204b to excite signal light.

FIG. 56 shows a further improved doped fiber amplifier. Referring to FIG. 56, the improved doped fiber amplifier shown has a bidirectional excitation construction and includes first and second excitation light sources 222a and 222b, a first coupler 226a for inputting excitation light from the first excitation light source 222a and a second coupler 226b for inputting excitation light from the second excitation light source 222b. The doped fiber amplifier further includes, for an ascending line, a first wave combiner 223a provided on the input side of the first doped fiber 204a and a second second wave combiner 223b provided on the output side of the doped fiber 204a, and for a descending line, a third wave combiner 223c provided on the output side of the doped fiber 204b and a fourth wave combiner 223d provided on the input side of the doped fiber 204b.

In the doped fiber amplifier of the construction just described, the excitation light sources are used commonly for the ascending line and the descending line to amplify signal light.

By the way, in such optical communication systems as described above, the magnitude and the variation of the value of the signal to noise ratio (SNR) which depends upon a signal amplitude, signal light-ASE (accumulated spontaneous emission light) beat noise and inter-ASE beat noise make causes of deterioration of the code error rate in communication.

As seen, for example, from FIG. 57, the signal to noise ratio presents its maximum value when signal light is in a polarization condition in which a maximum transmission line gain is obtained, and the signal to noise ratio presents its minimum value when the signal light is in another polarization condition in which a minimum transmission line gain is obtained. Since the polarization condition of signal light normally varies in response to physical conditions of a transmission line (for example, the temperature, the stress or some other parameter of the optical fiber), the value of the signal to noise ratio temporally varies from a minimum value in a worst polarization condition to a maximum value in a best polarization condition around a certain value.

Where the transmission line gain for a horizontally polarized light component is represented by $\Gamma s$ and the gain for a vertically polarized light component is represented by $\Gamma p$, when the transmission line has a polarization dependency, $\Gamma s \neq \Gamma p$. Ordinary signal light involves some polarization, and the polarization condition of the signal light varies with respect to time.

Accordingly, if, for example, linearly polarized light is inputted to such transmission line, then the signal light power at the output of the transmission line varies depending upon the polarization direction $\theta$ as seen from FIG. 58. In particular, in the case of $\Gamma s > \Gamma p$, the signal power after transmission exhibits its minimum (maximum) value when $\theta = \pi/2$ ($\theta = 0$) and exhibits its maximum value when $\theta = 0$ ($\theta = \pi/2$).

However, as described above, in such popular optical communication systems as described above, signal light as a communication medium normally involves some polarization, and if a component of a transmission line such as, for example, an optical amplifier has some polarization dependency of a loss or a gain, then the ratio between the signal light and the ASE varies at an input of the receiver.

Consequently, also the signal to noise ratio varies as seen from FIG. 57. Accordingly, the popular optical communication systems have a subject to be solved in that also the signal to noise ratio is sometimes deteriorated depending upon the polarization condition so that the code error rate may be deteriorated.

Further, where the number of repeating stages of optical amplifiers is comparatively great, deterioration of the signal to noise ratio is accumulated, and even when the gain per one optical amplifier varies, for example, by only 0.1 dB, where the number of repeating stages of optical fibers is several hundreds or more, also the total gain of the optical fibers varies cumulatively. Consequently, the popular optical communication systems have another subject to be solved in that the level of the signal light power on the reception side varies significantly.

Furthermore, when light wavelength multiplexing or light frequency multiplexing is performed to transmit signal light of a plurality of signals, an interaction occurs between the signal light beams as a result of four light wave mixture which is one of a non-linear optical effect of the optical fiber, resulting in deterioration of the signal to noise ratio.

SUMMARY OF THE INVENTION

It is an object of the present invention to provide an optical amplification method and apparatus for an optical communication system wherein the excessive loss in an optical amplifier and the variation of the branching ratio are controlled to control the variation of the gain to control the polarization dependency of the loss or the gain on a transmission line of the optical communication system.

It is another object of the present invention to provide an optical transmission method and apparatus for an optical communication system by which signal light free from polarization can be transmitted.

In order to attain the objects described above, according to an aspect of the present invention, there is provided an optical transmission method for an optical communication system, comprising the steps of modulating depolarized light to produce depolarized signal light by means of a modulator, and transmitting the modulated depolarized signal light.

According to another aspect of the present invention, there is provided an optical transmission apparatus for an optical communication system, comprising a depolarized light source for outputting depolarized light, and an external modulator for modulating the depolarized light from the depolarized light source to produce modulated depolarized signal light to be transmitted.

With the optical transmission method and apparatus for an optical communication system, since the polarization dependency of a loss or a gain on a transmission line can be suppressed by transmitting modulated depolarized signal light, otherwise possible deterioration of the signal to noise ratio can be avoided, and incidentally, the polarization dependency on a transmission line OF an optical amplification apparatus can be permitted to some degree, which allows enhancement of the productivity for optical amplification apparatus or like apparatus. Further, deterioration of the signal to noise ratio by four light wave mixture upon wavelength multiplexing of optical frequency multiplexing can be reduced.

The depolarized light source and the external modulator may be connected to each other such that the polarized light outputted from the depolarized light source is inputted to the external modulator in such polarization directions that polarization dependencies of the depolarized light source and the external modulator are cancelled with each other. Even if the depolarized light source outputs signal light having a polarized light component, the polarized light component can be cancelled by the polarization dependency of the external modulator. Consequently, further depolarized signal light can be transmitted advantageously.

The depolarized light source may include a light source and depolarization means. This advantageously allows realization of the depolarized light source with a simplified construction. Preferably, the depolarized light source further includes polarization control means interposed between the light source and the depolarization means for outputting linearly polarized light. This advantageously allows transmission of depolarized light of a higher degree of accuracy.

The depolarized light source may be spontaneous emission light emitted from an external amplifier. This advantageously allows realization of the depolarized light source with a simple construction. Preferably, the spontaneous emission light emitted from the external amplifier is used as the depolarized light source after it is narrowed into light of a narrow band by an optical filter. Consequently, depolarized light of a higher degree of accuracy can advantageously be realized with a simple construction.

Alternatively, the depolarized light source may include a light emitting diode. This advantageously allows the depolarized light source to be realized with a simple construction. Preferably, the depolarized light source further includes an optical filter for narrowing output light of the light emitting diode into light of a narrow band. Consequently, depolarized light of a higher degree of accuracy can advantageously be realized with a simple construction.

Otherwise, the depolarized light source may include a pair of light sources for outputting linearly polarized light beams having an equal output power, and a wave combiner for coupling the linearly polarized light beams from the light sources orthogonally to each other, the light sources outputting light beams which have signal wavelengths equal to or a little different from each other. This advantageously allows depolarized light of a high degree of accuracy to be outputted. Preferably, the depolarized light source further includes a pair of polarization control means interposed between the light sources and the wave combiner each for outputting linearly polarized light. Consequently, depolarized light of a higher degree of accuracy can advantageously be outputted.

Preferably, the external modulator is an electric field absorbing modulator. The external modulator therefore has no polarization dependency, and consequently, depolarized light of a higher degree of accuracy can advantageously be outputted.

According to a further aspect of the present invention, there is provided an optical transmission method for an optical communication system, comprising the steps of modulating light emitted from a light source by means of a modulator and depolarizing light emitted from the light source to produce modulated depolarized signal light, and transmitting the modulated depolarized signal light.

According to a still further aspect of the present invention, there is provided an optical transmission apparatus for an optical communication system, comprising a light source for outputting light, and external modulation/depolarization means including an external modulator for modulating the light from the light source and depolarization means for depolarizing the light from the light source.

With the optical transmission method and apparatus for an optical communication system, since the polarization dependency of a loss or a gain on a transmission line can be suppressed by transmitting depolarized signal light, otherwise possible deterioration of the signal to noise ratio can be avoided, and incidentally, the polarization dependency on a transmission line or an optical amplification apparatus can be permitted to some degree, which allows enhancement of the productivity for optical amplification apparatus or like apparatus. Further, deterioration of the signal to noise ratio by four light wave mixture upon wavelength multiplexing or optical frequency multiplexing can be reduced.

Preferably, the optical transmission apparatus for an optical communication system further comprises polarization control means interposed between the light source and the external modulator for outputting linearly polarized light. This advantageously allows depolarized light of a high degree of accuracy to be outputted.

Preferably, the external modulator is an electric field absorbing modulator so that depolarized light of a higher degree of accuracy can advantageously be outputted.

The optical transmission apparatus for an optical communication system may be constructed such that the light source includes linearly polarized light outputting means for outputting linearly polarized light, and a beam splitter for branching the linearly polarized light from the linearly polarized light outputting means into two beams while maintaining polarization thereof; the external modulator includes a first external modulator for modulating one of the two beams from the beam splitter, and a second external modulator for modulating the other beam from the beam splitter; and the depolarization means includes delay means provided on a route of one of the two beams from the beam splitter for providing a route difference from another route of the other beam from the beam splitter to the route of the one beam with which a delay time difference of the route of the one beam from the route of the other beam is sufficiently longer than a coherence time, and a wave combiner for coupling the two polarized signal light beams from the first and second external modulators orthogonally to each other. The optical transmission apparatus for an optical communication system is advantageous in that, even where a transmission line has some polarization dependency, stabilized depolarized light free from a variation of the power with respect to time involved in a variation of the polarization condition can be outputted. Preferably, the light source outputs a solution pulse train, and the lengths of the routes of the two beams from the beam splitter to the first and second external modulators are adjusted so that a delay time difference between the two routes may be equal to an integral number of times of a solution pulse cycling time. This allows depolarized signal light to be outputted, and besides, advantageously the polarization dependency of a loss or a gain on a transmission line can be suppressed and deterioration of the signal to noise ratio can be prevented. Preferably, the optical transmission apparatus for an optical communication system further comprises means for providing a delay time difference between driving data signals to be supplied to the first and second external modulators. This allows two signal light beams to be inputted in a same phase relationship to the wave combiner. Consequently, there is an advantage in that signal light depolarized with a high degree of accuracy can be transmitted. Alternatively, a pair of routes along which driving data signals are supplied to the first and second external modulators and another pair of routes along which optical signals are transmitted from the first and second external modulators to the wave combiner may be set equal in length to each other. This also allows two signal light beams to be inputted in a same phase relationship to the wave combiner, and consequently, signal light depolarized with a high degree of accuracy can advantageously be transmitted.

Otherwise, the optical transmission apparatus for an optical communication system may be constructed such that the light source includes first and second light sources for outputting linearly polarized light beams having an equal output power; the external modulator includes first and second external modulators for modulating the linearly polarized light beams from the first and second light sources, respectively; and the depolarization means includes a wave combiner for coupling the polarized light beams from the first and second external modulators orthogonally to each other, the first and second light sources outputting light beams which have signal wavelengths equal to or a little different from each other. This allows depolarized signal light to be outputted, and besides, advantageously the polarization dependency of a loss or a gain on a transmission line can be suppressed and deterioration of the signal to noise ratio can be prevented. Preferably, the optical transmission apparatus for an optical communication system further comprises means for providing a delay time difference between driving data signals to be supplied to the first and second external modulators. This allows two signal light beams to be inputted in a same phase relationship to the wave combiner, and consequently, signal light depolarized with a high degree of accuracy can advantageously be transmitted. Alternatively, a pair of routes along which driving data signals are supplied to the first and second external modulators and another pair of routes along which optical signals are transmitted from the first and second external modulators to the wave combiner may be set equal in length to each other. This also allows two signal light beams to be inputted in a same phase relationship to the wave combiner, and consequently, signal light depolarized with a high degree of accuracy can advantageously be transmitted.

According to a yet further aspect of the present invention, there is provided an optical amplification method for an optical communication system, comprising the steps of inputting signal light into a doped fiber doped with ions of a type, and inputting excitation light into the doped fiber by way of a polarization holding fiber which maintains a polarization condition of the light so that the signal light is amplified by and outputted from the doped fiber.

According to a yet further aspect of the present invention, there is provided an optical amplification apparatus for an optical communication system, comprising a doped fiber doped with ions of a type, an input port for inputting signal light into the doped fiber, an output port for outputting the signal light amplified by the doped fiber, an excitation light source for outputting excitation light, a wave combiner for inputting the excitation light from the excitation light source into the doped fiber, and a polarization holding fiber interconnecting the excitation light source and the wave combiner for maintaining a polarization condition of the excitation light outputted from the excitation light source.

With the optical amplification method and apparatus for an optical transmission system, excitation light can be supplied in a stabilized condition with a reduced variation of the optical output to the doped fiber. Consequently, there is an advantage in that otherwise possible deterioration of the signal to noise ratio of signal light can be suppressed.

The doped fiber may be an optical fiber doped with erbium. The doped fiber can amplify signal light in accordance with the length of the doped fiber itself, and consequently, simplification in designing of the apparatus can advantageously be achieved.

Preferably, the optical amplification apparatus for an optical communication system further comprises depolarization means provided for the polarization holding fiber for depolarizing the excitation light from the excitation light source into depolarized light. The depolarization means may include delay time difference providing means for providing a delay time difference between two polarized light components of the excitation light outputted from the polarization holding fiber, and a wave combiner for inputting the excitation light having passed the delay time difference providing means. This advantageously allows depolarization of excitation light with a simple construction. Preferably, the delay time difference providing means is formed from a birefringent optical material, and more preferably, the polarization holding fiber and the birefringent optical material are disposed such that a main axis of the polarization holding fiber and a main axis of the birefringent optical material with regard to polarization are displaced by 45 degrees from each other. This advantageously allows excitation light to be depolarized effectively with a simple construction.

According to a yet further aspect of the present invention, there is provided an optical amplification apparatus for an optical communication system, comprising an excitation light source for outputting excitation light, a first doped fiber doped with ions of a type, a first input port for inputting signal light to the first doped fiber, a first output port for outputting the signal light amplified by the first doped fiber, a first wave combiner for inputting the excitation light from the excitation light source to the first doped fiber, a second doped fiber doped with ions of the same type or another type, a second input port for inputting signal light to the second doped fiber, a second output port for outputting the signal light amplified by the second doped fiber, a second wave combiner for inputting the excitation light from the excitation light source to the second doped fiber, and excitation light distribution means interposed between the excitation light source and the first and second wave combiners for supplying the excitation light from the excitation light source simultaneously to the first and second doped fibers. This allows excitation light to be outputted in a stabilized condition with a reduced variation of the optical output. Consequently, otherwise possible deterioration of the signal to noise ratio of signal light can advantageously be suppressed.

The excitation light distribution means may include a plurality of couplers connected in series. This reduces the branching ratio variation of the excitation light distribution means. Consequently, there is an advantage in that deterioration of the signal to noise ratio of signal light can be suppressed.

The excitation light source may include first and second excitation light sources, and the excitation light distribution means include a polarizing composer for polarizing and composing excitation light outputted from the first and second excitation light sources, and a coupler interposed between the polarizing composer and the first and second wave combiners for supplying the excitation light simultaneously to the first and second doped fibers. With the optical amplification apparatus, excitation light beams are supplied simultaneously to the two doped fibers by means of the coupler, and consequently, an otherwise possible variation of the gains of signal light to be outputted by way of the first and second output ports can be suppressed. Accordingly, there is an advantage in that deterioration of the signal to noise ratio of signal light can be suppressed.

Preferably, the optical amplification apparatus for an optical communication system further comprises depolarization means for depolarizing the excitation light from the excitation light source. The depolarization means may include delay time difference providing means for providing a delay time difference between two polarized light components of the excitation light, and a wave combiner for inputting the excitation light having passed the delay time difference providing means. The delay time difference providing means may be formed from a birefringent optical material. Thus, excitation light can be converted into depolarized light with a simple construction.

The optical amplification apparatus for an optical communication system may further comprise a polarization holding fiber interposed between each of the first and second wave combiners and the excitation light distribution means, the excitation light distribution means including a polarization holding fiber coupler for supplying the excitation light simultaneously to the first doped fiber and the second doped fiber while maintaining a polarization condition of the same, and depolarization means for depolarizing the excitation light from the excitation light source, the depolarization means including delay time difference providing means for providing a delay time difference between two polarized light components of the excitation light and a wave combiner for inputting the excitation light having passed the delay time difference providing means, the delay time difference providing means being formed from a birefringent optical material, the polarization holding fiber and the delay time difference providing means being disposed such that a main axis of the polarization holding fiber is displaced by 45 degrees from a main axis of the birefringent optical material with regard to polarization. Due to the displacement of 45 degrees, there is an advantage in that excitation light can be converted into depolarized light effectively.

The first and second doped fibers may be optical fibers doped with erbium. The doped fiber can amplify signal light in accordance with the length of the doped fiber itself, and consequently, simplification in designing of the apparatus can advantageously be achieved.

The excitation light distribution means may include a directional coupler or a 3 dB coupler. This can compensate for the variation of the branching ratio of excitation light, and consequently, excitation light can be outputted in a stabilized condition with a reduced variation of the optical output. Consequently, deterioration of the signal to noise ratio of signal light can advantageously be suppressed.

The excitation light source may include a first excitation light source and a second excitation light source. This can compensate for the variation of the branching ratio of excitation light with a high degree of accuracy, and consequently, excitation light can be outputted in a stabilized condition with a reduced variation of the optical output. Consequently, deterioration of the signal to noise ratio of signal light can advantageously be suppressed remarkably. The first and second excitation light sources may operate simultaneously to supply excitation light to the first and second doped fibers. This allows outputting of excitation light in a stabilized condition with a reduced variation of the optical output, and consequently, deterioration of the signal to noise ratio of signal light can advantageously be suppressed remarkably. A different frequency of frequencies may be supplied to one or both of the first and second excitation light sources when one or both of oscillation wavelengths of the excitation light sources are to be varied in order to vary polarization of the excitation light to be outputted from the excitation light source. This allows variation of an oscillation wavelength of excitation light, and consequently, excessive losses of the wave combiners can be suppressed. Accordingly, deterioration of the signal to noise ratio of signal light can advantageously be suppressed further. Optical powers of light to be outputted from the excitation light sources may be set so that a sum thereof may be lower than a maximum excitation light power of light which can be outputted from one of the excitation light sources when the other excitation light source is broken. This advantageously prevents otherwise possible destruction of one of the excitation light sources when the other excitation light source is broken.

The excitation light source may include a first excitation light source and a second excitation light source and be constructed such that one of two axes of the excitation light distribution means coincides with a main axis of polarized light of output light of the first and second excitation light sources inputted to the excitation light distribution means. This allows excitation light to be outputted in a stabilized condition and allows suppression of the variation of the branching ratio by the coupler. Consequently, deterioration of the signal to noise ratio of signal light can be suppressed.

Or else, the excitation light source may include a first excitation light source and a second excitation light source and be constructed such that one of two axes of the excitation light distribution means coincides with a main axis of polarized light of output light of the first excitation light source inputted to the excitation light distribution means, and the other axis of the excitation light distribution means coincides with a main axis of polarized light of output light of the second excitation light source inputted to the excitation light distribution means. This also allows excitation light to be outputted in a stabilized condition and allows suppression of the variation of the branching ratio by the coupler. Consequently, deterioration of the signal to noise ratio of signal light can be suppressed.

Preferably, the excitation light source has a variable oscillation wavelength so as to vary polarization of the excitation light to be outputted from the excitation light source. An injection current to the excitation light source may be varied in order to vary an oscillation wavelength of the excitation light source. Alternatively, a temperature of the excitation light source may be varied in order to vary an oscillation wavelength of the excitation light source. Preferably, the frequency with which the oscillation wavelength is to be varied is higher than 1 kHz. Thus, since the oscillation wavelength of excitation light can be varied with the frequency higher than 1 kHz by varying the injection current or the temperature, excessive losses of the wave combiners can be suppressed and deterioration of the signal to noise ratio of signal light can be suppressed.

Two output terminals of one of each two adjacent ones of the couples at a preceding stage are connected to two input terminals of the other coupler at a following stage. This allows suppression of the variation of the branching ratio of the couplers, and consequently, deterioration of the signal to noise ratio of signal light can advantageously be suppressed. Preferably, each of the couplers is a polarization holding coupler, and main axes of polarized light coincide with each other at two connection portions at which each adjacent ones of the couplers are connected to each other, or alternatively, the couplers may be connected such that main axes of polarized light of two excitation light beams inputted to the second polarization holding coupler are different from each other. This allows further stabilized excitation light to be supplied, and consequently, deterioration of the signal to noise ratio of signal light can advantageously be suppressed. Preferably, the couplers are connected such that the excitation light outputted from the excitation light source is branched into two beams by one of the couplers at the first stage and a delay time is provided to one of routes of the two light beams so that a great delay time difference may be provided between the two light beams of the two routes until the two light beams are coupled by another one of the couplers at the last stage. This prevents a fluctuation of the intensity of light, and consequently, further stabilized excitation light can be supplied. Accordingly, deterioration of the signal to noise ratio of signal light can advantageously be suppressed.

Preferably, optical fibers interconnecting the first and second excitation light sources and the polarizing wave combiner are polarization holding fibers which maintain polarization conditions of the excited light, and more preferably, the couplers are polarization holding couplers. Further preferably, the polarizing composer and the polarization holding fibers are connected such that a main axis of polarized light on the output side of the polarizing composer and a main axis of polarized light of the polarization holding fiber coincide with each other. This allows a polarization condition of excitation light to be maintained, and consequently, further stabilized excitation light can be supplied. Accordingly, deterioration of the signal to noise ratio of signal light can advantageously be suppressed further.

Further objects, features and advantages of the present invention will become apparent from the following detailed description when read in conjunction with the accompanying drawings in which like parts or elements are denoted by like reference characters.

BRIEF DESCRIPTION of THE DRAWINGS

FIGS. 17(a) and 17(b) are waveform diagrams illustrating operation of the optical transmission apparatus shown in FIG. 16;

FIG. 18 is a block diagram showing a third modification to the optical transmission apparatus shown in FIG. 14;

FIG. 48 is a table illustrating parameters used for the calculation illustrated in FIG. 47;

DESCRIPTION OF THE PREFERRED EMBODIMENTS a. Description of the Aspects of the Present invention FIG. 1 illustrates an optical transmission apparatus for an optical communication system according to an aspect of the present invention. Referring to FIG. 1, the optical transmission apparatus for an optical communication system comprises a depolarized light source 1 for outputting depolarized light, and an external modulator 2 for modulating the depolarized light from the depolarized light source 1 to produce modulated depolarized signal light to be transmitted.

Figure 1:
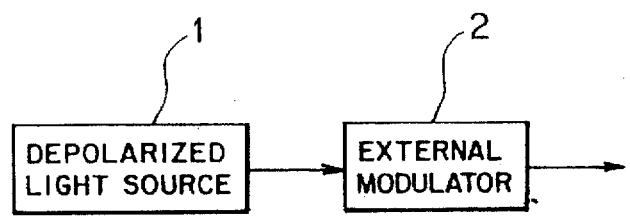
FIG. 1 is a block diagram illustrating the principle of an aspect of the present invention.

In the optical transmission apparatus for an optical communication system, depolarized light from the depolarized light source 1 is modulated by the external modulator 2 to produce modulated depolarized signal light, and the modulated depolarized light signal thus produced is transmitted.

The depolarized light source 1 and the external modulator 2 are connected to each other such that the depolarized light outputted from the depolarized light source 1 is inputted to the external modulator 2 in such polarization directions that polarization dependencies of the depolarized light source 1 and the external modulator 2 are cancelled with each other.

The external modulator 2 may be an electric field absorbing modulator. The depolarized light source 1 may include a light source and depolarization means, and polarization control means may be interposed between the light source and the depolarization means for outputting linearly polarized light.

The depolarized light source 1 may be spontaneous emission light emitted from an external amplifier, and the spontaneous emission light emitted from the external amplifier may be used as the depolarized light source after it is narrowed into light of a narrow band by an optical filter. Alternatively, the depolarized light source 1 may include a light emitting diode, the depolarized light source may further include an optical filter for narrowing output light of the light emitting diode into light of a narrow band.

The depolarized light source 1 may include a pair of light sources for outputting linearly polarized light beams having an equal wavelength and an equal output power, and a wave combiner for coupling the linearly polarized light beams from the light sources orthogonally to each other. A pair of polarization control means each for outputting linearly polarized light may be interposed between the light sources and the wave combiner.

It is known that the effect of four optical wave mixture exhibits its maximum level when polarization conditions of a plurality of signal light beams are same, but exhibits its reduced level when the polarization conditions of the signal light beams are in a random condition. Accordingly, by transmitting signal light in the form of depolarized light, deterioration of the signal to noise ratio caused by four optical wave mixture upon waveform multiplexing or frequency multiplexing can be reduced.

With the optical transmission method and apparatus for an optical communication system, since the polarization dependency of a loss or a gain on a transmission line can be suppressed by transmitting modulated depolarized signal light produced from depolarized light from the depolarized light source 1, otherwise possible deterioration of the signal to noise ratio can be avoided, and incidentally, the polarization dependency on a transmission line or an optical amplification apparatus can be permitted to some degree, which allows enhancement of the productivity for optical amplification apparatus or like apparatus. Further, deterioration of the signal to noise ratio by four light wave mixture upon wavelength multiplexing or optical frequency multiplexing can be reduced.

Where the depolarized light outputted from the depolarized light source 1 is inputted to the external modulator 2 in such polarization directions that polarization dependencies of the depolarized light source 1 and the external modulator 2 are cancelled with each other, even if the depolarized light source 1 outputs signal light having a polarized light component, the polarized light component can be cancelled by the polarization dependency of the external modulator 2. Consequently, further depolarized signal light can be transmitted advantageously.

Where the depolarized light source 1 includes the light source and the depolarization means, the depolarized light source 1 can be realized with a simplified construction.

Where the polarization control means for outputting linearly polarized light is interposed between the light source and the depolarization means, depolarized light of a higher degree of accuracy can be transmitted.

Where the depolarized light source 1 is spontaneous emission light emitted from an external amplifier. the depolarized light source can be realized with a simple construction.

Where the spontaneous emission light emitted from the external amplifier is used as the depolarized light source 1 after it is narrowed into light of a narrow band by an optical filter, depolarized light of a higher degree of accuracy can advantageously be realized with a simple construction.

Where the depolarized light source includes a light emitting diode. the depolarized light source can be realized with a simple construction.

Where the depolarized light source further includes an optical filter for narrowing output light of the light emitting diode into light of a narrow band, depolarized light of a higher degree of accuracy can be realized with a simple construction.

Where the depolarized light source includes a pair of light sources for outputting linearly polarized light beams having an equal wavelength and an equal output power and a wave combiner for coupling the linearly polarized light beams from the light sources orthogonally to each other, depolarized light of a high degree of accuracy can be outputted.

Where the depolarized light source further includes a pair of polarization control means interposed between the two light sources and the wave combiner each for outputting linearly polarized light, depolarized light of a higher degree of accuracy can be outputted.

Where the external modulator is an electric field absorbing modulator, the external modulator can be formed as an external dependency having no polarization dependency, and consequently, depolarized light of a higher degree of accuracy can be outputted.

Figure 2:
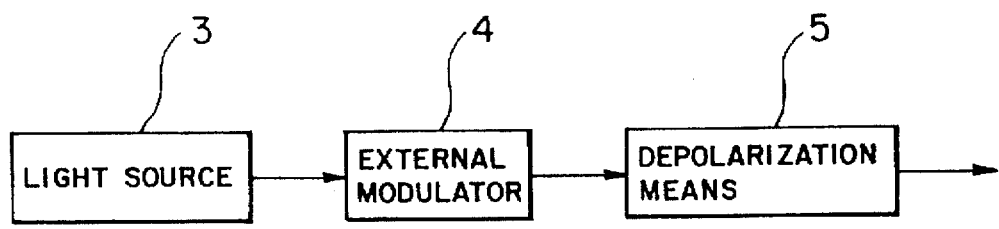
FIG. 2 is a block diagram illustrating the principle of another aspect of the present invention.

FIG. 2 shows an optical transmission apparatus for an optical communication system according to another aspect of the present invention. Referring to FIG. 2, the optical transmission apparatus for an optical communication system comprises a light source 3 for outputting light, an external modulator 4 for modulating the light from the light source 3 to produce modulated signal light, and depolarization means 5 for depolarizing the signal light from the external modulator 4.

In the optical transmission apparatus for an optical communication system, light outputted from the light source 3 is modulated by the external modulator 4, and modulated signal light from the external modulator 4 is depolarized by the depolarization means 5. The depolarized modulated signal light from the depolarization means 5 is transmitted.

Polarization control means may be interposed between the light source 3 and the external modulator 4 for outputting linearly polarized light. The external modulator 4 may be is an electric field absorbing modulator.

The optical transmission apparatus for an optical communication system may be constructed such that the light source 3 includes linearly polarized light outputting means for outputting linearly polarized light, and a beam splitter for branching the linearly polarized light from the linearly polarized light outputting means into two beams while maintaining polarization thereof; the external modulator 4 includes a first external modulator for modulating one of the two beams from the beam splitter, and a second external modulator for modulating the other beam from the beam splitter; and the depolarization means 5 includes delay means provided on a route of one of the two beams from the beam splitter for providing a route difference from another route of the other beam from the beam splitter to the route of the one beam with which a delay time difference of the route of the one beam from the route of the other beam is sufficiently longer than a coherence time, and a wave combiner for coupling the two polarized signal light beams from the first and second external modulators orthogonally to each other.

In this instance, means for providing a delay time difference between driving data signals to be supplied to the first and second external modulators may be provided, or a pair of routes along which driving data signals are supplied to the first and second external modulators and another pair of routes along which optical signals are transmitted from the first and second external modulators to the wave combiner may be set equal to each other.

The light source may be constructed as a light source which outputs a solution pulse train, and the lengths of the routes of the two beams from the beam splitter to the first and second external modulators are adjusted so that a delay time difference between the two routes may be equal to an integral number of times of a solution pulse cycling time.

Otherwise, the optical transmission apparatus for an optical communication system may be constructed such that the light source 3 includes first and second light sources for outputting linearly polarized light beams having an equal wavelength and an equal output power; the external modulator 4 includes first and second external modulators for modulating the linearly polarized light beams from the first and second light sources, respectively; and the depolarization means 5 includes a wave combiner for coupling the polarized light beams from the first and second external modulators orthogonally to each other. In this instance, means may be provided for providing a delay time difference between driving data signals to be supplied to the first and second external modulators, a pair of routes along which driving data signals are supplied to the first and second external modulators and another pair of routes along which optical signals are transmitted from the first and second external modulators to the wave combiner may be set equal to each other.

With the optical transmission method and apparatus for an optical communication system, since the polarization dependency of a loss or a gain on a transmission line can be suppressed by transmitting modulated depolarized signal light produced by depolarizing signal light from the light source 3, otherwise possible deterioration of the signal to noise ratio can be avoided, and incidentally, the polarization dependency on a transmission line or an optical amplification apparatus can be permitted to some degree, which allows enhancement of the productivity for optical amplification apparatus or like apparatus. Further, deterioration of the signal to noise ratio by four light wave mixture upon wavelength multiplexing or optical frequency multiplexing can be reduced.

Where the polarization control means for outputting linearly polarized light is interposed between the light source 3 and the external modulator 4, depolarized light of a high degree of accuracy can be outputted.

Where the external modulator 2 or 4 is an electric field absorbing modulator, it is formed as an external modulator having not polarization dependency, and depolarized light of a higher degree of accuracy can be outputted.

Where the optical transmission apparatus for an optical communication system is constructed such that the light source 3 includes linearly polarized light outputting means for outputting linearly polarized light, and a beam splitter for branching the linearly polarized light from the linearly polarized light outputting means into two beams while maintaining polarization thereof; the external modulator 4 includes a first external modulator for modulating one of the two beams from the beam splitter, and a second external modulator for modulating the other beam from the beam splitter; and the depolarization means 5 includes delay means provided on a route of one of the two beams from the beam splitter for providing a route difference from another route of the other beam from the beam splitter to the route of the one beam with which a delay time difference of the route of the one beam from the route of the other beam is sufficiently longer than a coherence time, and a wave combiner for coupling the two polarized signal light beams from the first and second external modulators orthogonally to each other, even where a transmission line has some polarization dependency, stabilized depolarized light free from a variation of the power with respect to time involved in a variation of the polarization condition can be outputted.

Where the light source 3 outputs a solution pulse train and the lengths of the routes of the two beams from the beam splitter to the first and second external modulators are adjusted so that a delay time difference between the two routes may be equal to an integral number of times of a solution pulse cycling time, depolarized signal light can be outputted, and besides, the polarization dependency of a loss or a gain on a transmission line can be suppressed and deterioration of the signal to noise ratio can be prevented.

Where the optical transmission apparatus for an optical communication system is constructed such that the light source 3 includes first and second light sources for outputting linearly polarized light beams having an equal wavelength and an equal output power; the external modulator 4 includes first and second external modulators for modulating the linearly polarized light beams from the first and second light sources; and the depolarization means 5 includes a wave combiner for coupling the polarized light beams from the first and second external modulators orthogonally to each other, since the two signal light beams are inputted in a same phase condition to the wave combiner, depolarized signal light is transmitted, and besides, the polarization dependency of a loss or a gain on a transmission line can be suppressed and deterioration of the signal to noise ratio can be prevented.

Where the means for providing a delay time difference between driving data signals to be supplied to the first and second external modulators, since two signal light beams are inputted in a same phase relationship to the wave combiner, signal light depolarized with a high degree of accuracy can be transmitted.

Where the pair of routes along which driving data signals are supplied to the first and second external modulators and the pair of routes along which optical signals are transmitted from the first and second external modulators to the wave combiner are set equal to each other, since two signal light beams are inputted in a same phase relationship to the wave combiner, signal light depolarized with a high degree of accuracy can be transmitted.

Figure 3:
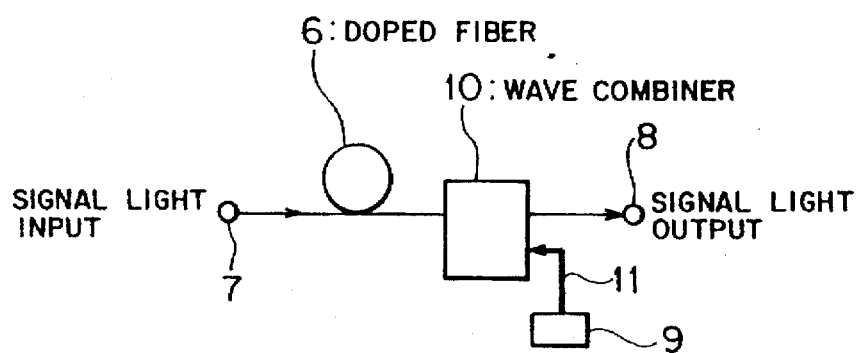
FIGS. 3(a) and 3(b) are block diagrams illustrating the principle of a further aspect of the present invention.
Figure 3:
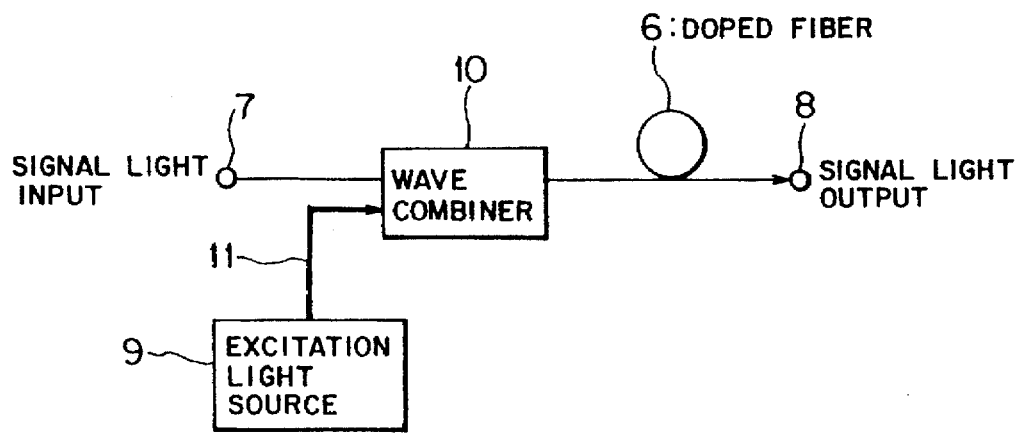

FIGS. 3(a) and 3(b) show optical amplification apparatus for an optical communication system according to a further aspect of the present invention. FIG. 3(a) shows an optical amplification apparatus of a forward excitation construction wherein excitation light is inputted to a doped fiber from the front while FIG. 3(b) shows another optical amplification apparatus of a rearward excitation construction wherein excitation light is inputted to a doped fiber from the rear.

Referring to FIGS. 3(a) and 3(b), the optical amplification apparatus shown include a doped fiber 6 doped with ions of a type. For example, an optical fiber doped with erbium can be used as the doped fiber 6.

The optical amplification apparatus further include an input port 7 for inputting signal light into the doped fiber 6, an output port 8 for outputting the signal light amplified by the doped fiber 6, an excitation light source 9 for outputting excitation light, a wave combiner 10 for inputting the excitation light from the excitation light source 9 into the doped fiber 6, and a polarization holding fiber 11 interconnecting the excitation light source 9 and the wave combiner 10 for maintaining a polarization condition of the excitation light outputted from the excitation light source 9.

In the optical amplification apparatus for an optical communication system, signal light is inputted to the doped fiber 6 doped with ions of a type while excitation light is inputted to the doped fiber 6 while keeping its polarization condition by way of the polarization holding fiber 11. Consequently, the signal light is amplified by and outputted from the doped fiber 6.

The excitation light source 9 may be constructed as a light source of the variable oscillation wavelength type wherein the oscillation wavelength of the excitation light source 9 is varied with a frequency higher than 1 kHz by providing for the excitation light source 9 control means for varying the injection current of the temperature to control the oscillation wavelength of the excitation light source 9 so that polarization of excitation light to be outputted from the excitation light source 9 may be varied.

Depolarization means may be provided for the polarization holding fiber 11 for depolarizing the excitation light from the excitation light source 9 into depolarized light. The depolarization means may include delay time difference providing means for providing a delay time difference between two polarized light components of the excitation light outputted from the polarization holding fiber, and a wave combiner to which the excitation light having passed the delay time difference providing means is inputted. The delay time difference providing means may be formed from a birefringent optical material.

In this instance, the polarization holding fiber and the birefringent optical material are disposed such that a main axis of the polarization holding fiber and a main axis of the birefringent optical material with regard to polarization are displaced by 45 degrees from each other.

With the optical amplification method and apparatus for an optical transmission system, excitation light can be supplied in a stabilized condition with a reduced variation of the optical output to the doped fiber 4. Consequently, otherwise possible deterioration of the signal to noise ratio of signal light can be suppressed.

Where the doped fiber 6 is an optical fiber doped with erbium, it can amplify signal light in accordance with the length of itself, and consequently, simplification in designing of the apparatus can be achieved.

Where the depolarization means for depolarizing the excitation light from the excitation light source into depolarized light is provided for the polarization holding fiber and includes delay time difference providing means for providing a delay time difference between two polarized light components of the excitation light outputted from the polarization holding fiber and a wave combiner for inputting the excitation light having passed the delay time difference providing means, depolarization of excitation light can be achieved with a simple construction.

Where the delay time difference providing means is formed from a birefringent optical material and the polarization holding fiber and the birefringent optical material are disposed such that a main axis of the polarization holding fiber and a main axis of the birefringent optical material with regard to polarization ace displaced by 45 degrees from each other, excitation light can be depolarized effectively with a simple construction.

Figure 4A:
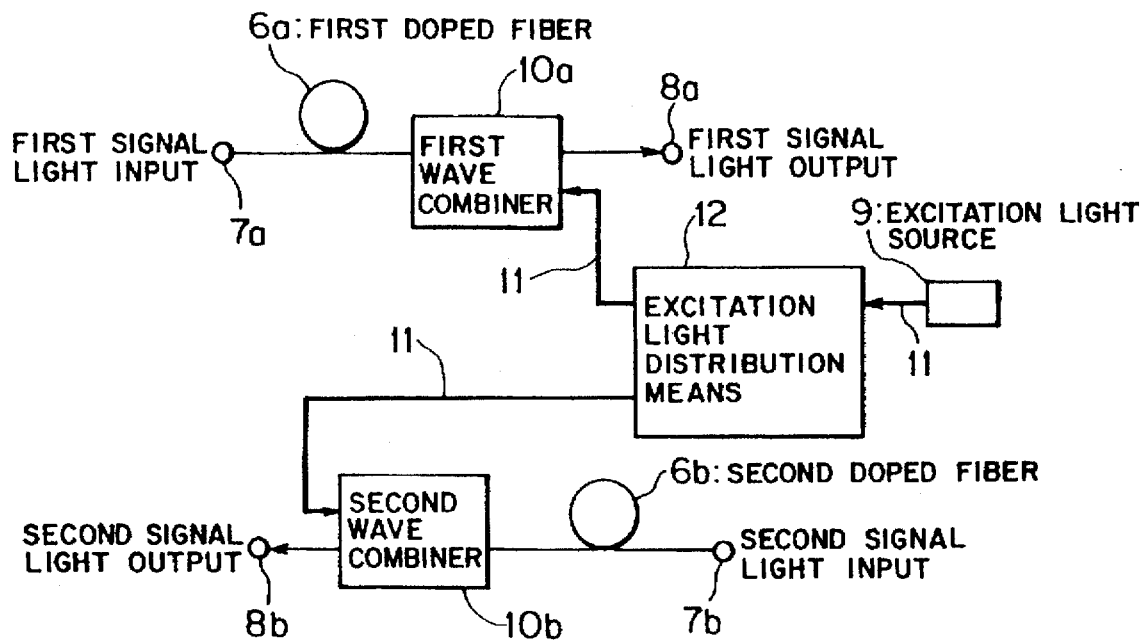
FIGS. 4(a) and 4(b) are block diagrams illustrating the principle of a still further aspect of the present invention.
Figure 4B:
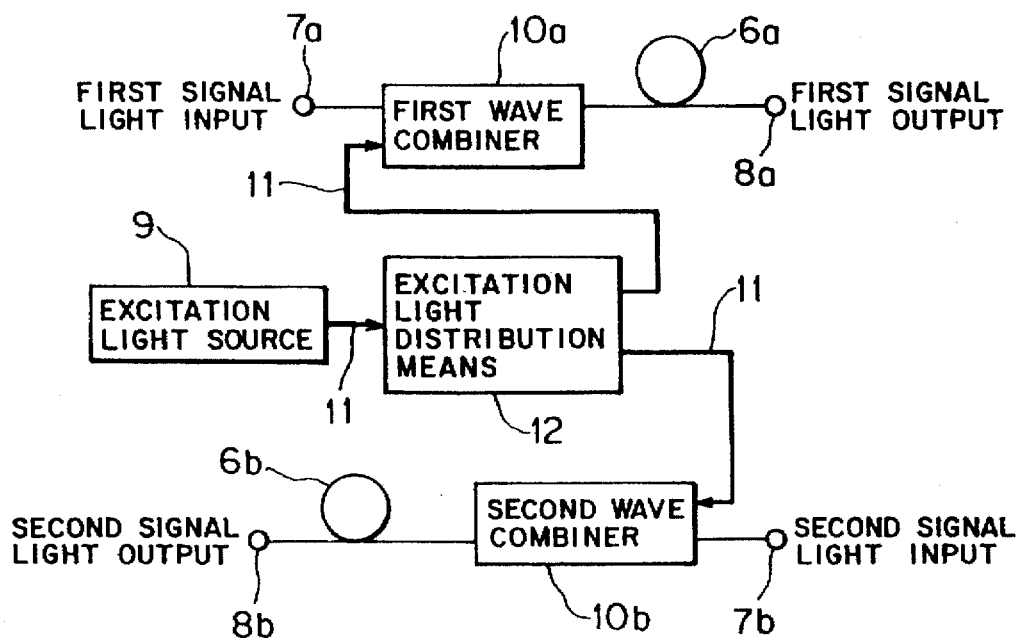

FIGS. 4(a) and 4(b) show optical amplification apparatus for an optical communication system according to a still further aspect of the present invention. The optical amplification apparatus shown in FIG. 4(a) is of the forward excitation construction while the optical amplification apparatus shown in FIG. 4(b) is of the rearward excitation construction.

Referring to FIGS. 4(a) and 4(b), the optical amplification apparatus shown include a first doped fiber 6a doped with ions of a type, a first input port 7a for inputting signal light to the first doped fiber 6a, a first output port 8a for outputting the signal light amplified by the first doped fiber 6a, a first wave combiner 10a for inputting excitation light to the first doped fiber 6a, a second doped fiber 6b doped with ions of the same type or another type, a second input port 7b for inputting signal light to the second doped fiber 6b, a second output port 8b for outputting the signal light amplified by the second doped fiber 6b, a second wave combiner 10b for inputting the excitation light to the second doped fiber 6b, an excitation light source 9 for outputting excitation light, and excitation light distribution means 12 interposed between the excitation light source 9 and the first and second wave combiners 10a and 10b for supplying the excitation light simultaneously to the first and second doped fibers 6a and 6b.

In the optical amplification apparatus for an optical communication system, signal light from the first input port 7a is inputted to the first doped fiber 6a doped with ions of a type from the first input port 7a while excitation light is inputted to the first doped fiber 6a by way of the first wave combiner 10a, and the signal light amplified by the first doped fiber 6a is outputted from the first output port 8a. Meanwhile, signal light is inputted to the second doped fiber 6b doped with the same type or another type from the second input port 7b while excitation light is inputted to the second doped fiber 6b by way of the second wave combiner 10b, and the signal light amplified by the second doped fiber 6b is outputted from the second output port 8b.

The excitation light from the excitation light source 9 is supplied simultaneously to the first and second doped fibers 6a and 6b while maintaining its polarization by means of polarization holding fibers interposed between the excitation light source 9 and the first and second wave combiners 10a and 10b.

Depolarization means may be provided for depolarizing the excitation light from the excitation light source 9. The depolarization means may include delay time difference providing means for providing a delay time difference between two polarized light components of the excitation light, and a wave combiner to which the excitation light having passed the delay time difference providing means is inputted. The delay time difference providing means may be formed from a birefringent optical material.

A polarization holding fiber 11 may be interposed between each of the first and second wave combiners 10a and 10b and the excitation light distribution means 12 while the excitation light distribution means 12 includes a polarization holding fiber coupler for supplying the excitation light simultaneously to the first doped fiber 6a and the second doped fiber 6b while maintaining a polarization condition of the same, and depolarization means may be provided for depolarizing the excitation light from the excitation light source 9 and include delay time difference providing means for providing a delay time difference between two polarized light components of the excitation light and a wave combiner to which the excitation light having passed the delay time difference providing means is inputted, and besides, the delay time difference providing means may be formed from a birefringent optical material and the polarization holding fiber 11 and the delay time difference providing means may be disposed such that a main axis of the polarization holding fiber is displaced by 45 degrees from a main axis of the birefringent optical material with regard to polarization.

The first and second doped fibers 6a and 6b may be optical fibers doped with erbium. Meanwhile, the excitation light distribution means 12 may include a directional coupler or a 3 dB coupler.

The excitation light source 9 may include a first excitation light source and a second excitation light source. In this instance, the first and second excitation light sources may operate simultaneously to supply excitation light to the first and second doped fibers. A different frequency or frequencies may be supplied to one or both of the first and second excitation light sources when one or both of oscillation wavelengths of the first and second excitation light sources are to be varied in order to vary polarization of the excitation light to be outputted from the excitation light source 9.

Further, optical powers of light to be outputted from the excitation light sources may be set so that a sum thereof may be lower than a maximum excitation light power of light which can be outputted from one of the excitation light sources when the other excitation light source is broken.

The excitation light source 9 may be constructed such that one of two axes of the excitation light distribution means 12 coincides with a main axis of polarized light of output light of the first and second excitation light sources inputted to the excitation light distribution means 12.

Or else, the excitation light source mar be constructed such that one of two axes of the excitation light distribution means 12 coincides with a main axis of polarized light of output light of the first excitation light source inputted to the excitation light distribution means 12, and the other axis of the excitation light distribution means 12 coincides with a main axis of polarized light of output light of the second excitation light source inputted to the excitation light distribution means 12.

The excitation light source 9 may be constructed as a light source of the variable oscillation wavelength type wherein the oscillation wavelength of the excitation light source 9 is varied with a frequency higher than 1 kHz by providing for the excitation light source 9 control means for varying the injection current or the temperature to control the oscillation wavelength of the excitation light source 9 so that polarization of excitation light to be outputted from the excitation light source 9 may be varied.

Figure 5A:
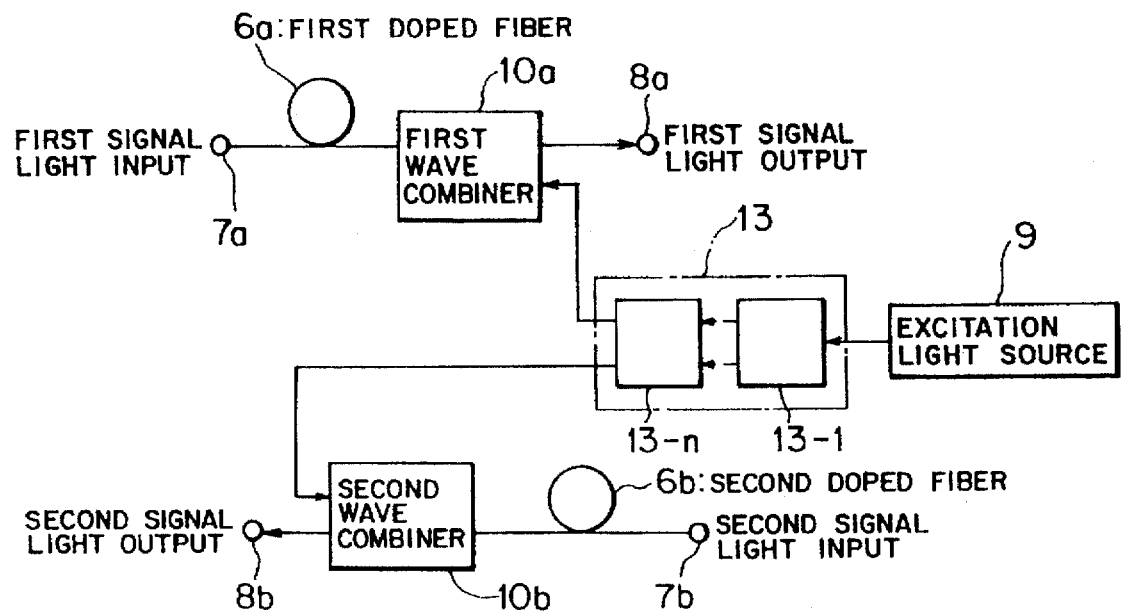
FIGS. 5(a) and 5(b) are block diagrams illustrating the principle of a yet further aspect of the present invention.
Figure 5B:
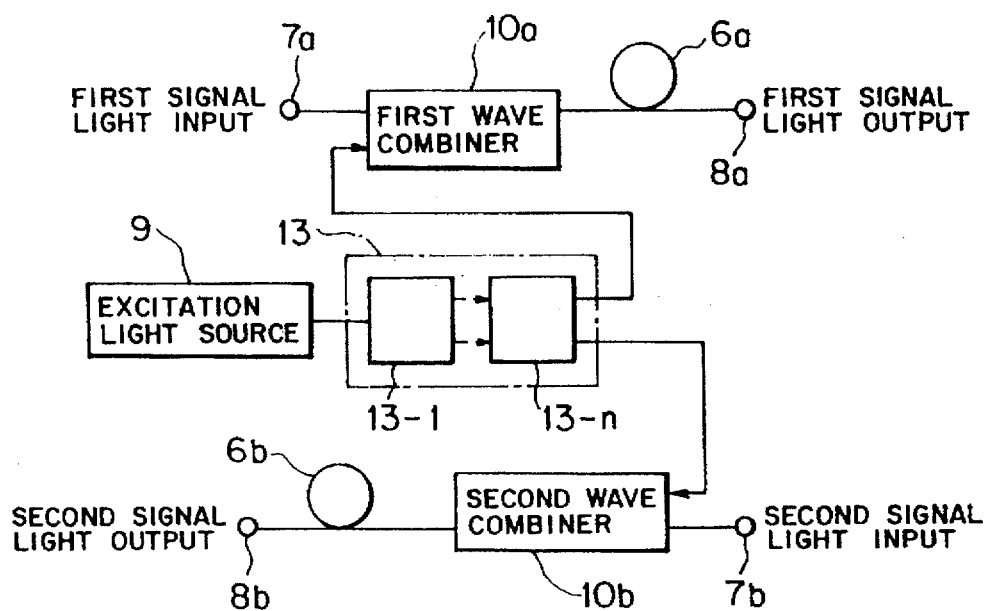

FIGS. 5(a) and 5(b) show optical amplification apparatus for an optical communication system according to a yet further aspect of the present invention. The optical amplification apparatus shown in FIG. 5(a) is of the forward excitation construction while the optical amplification apparatus shown in FIG. 5(b) is of the rearward excitation construction.

Referring to FIGS. 5(a) and 5(b), the optical amplification apparatus shown include a first doped fiber 6a doped with ions of a type, a first input port 7a for inputting signal light to the first doped fiber 6a, a first output port 8a for outputting the signal light amplified by the first doped fiber 6a, a first wave combiner 10a for inputting excitation light to the first doped fiber 6a, a second doped fiber 6b doped with ions of the same type or another type, a second input port 7b for inputting signal light to the second doped fiber 6b, a second output port 8b for outputting the signal light amplified by the second doped fiber 6b, a second wave combiner 10b for inputting the excitation light to the second doped fiber 6b, an excitation light source 9 for outputting excitation light, and excitation light distribution means 13 interposed between the excitation light source 9 and the first and second wave combiners 10a and 10b and including a plurality of couplers connected in series at a plurality of stages for supplying the excitation light simultaneously to the first and second doped fibers 6a and 6b.

In the optical amplification apparatus for an optical communication system, signal light from the first input port 7a is inputted to the first doped fiber 6a, doped with ions of a type from the first input port 7a while excitation light is inputted to the first doped fiber 6a by way of the first wave combiner 10a, and the signal light amplified by the first doped fiber 6a is outputted from the first output port 8a. Meanwhile, signal light is inputted to the second doped fiber 6b doped with the same type or another type from the second input port 7b while excitation light is inputted to the second doped fiber 6b by way of the second wave combiner 10b, and the signal light amplified by the second doped fiber 6b is outputted from the second output port 8b.

The excitation light from the excitation light source 9 is supplied simultaneously to the first and second doped fibers 6a and 6b as it is outputted to the first and second wave combiners 10a and 10b by way of the couplers connected in series at a plurality of stages.

The first and second doped fibers 6a and 6b may be optical fibers doped with erbium. Meanwhile, the coupler 13 may be a directional coupler or a 3 dB coupler.

The excitation light source 9 may include a first excitation light source and a second excitation light source. In this instance, the first and second excitation light sources may operate simultaneously to supply excitation light to the first and second doped fibers 6a and 6b. A different frequency or frequencies may be supplied to one or both of the first and second excitation light sources when one or both of oscillation wavelengths of the first and second excitation light sources are to be varied in order to vary polarization of the excitation light to be outputted from the excitation light source 9.

Optical powers of light to be outputted from the excitation light sources may be set so that a sum thereof may be lower than a maximum excitation light power of light which can be outputted from one of the excitation light sources when the other excitation light source is broken.

Two output terminals of one of each two adjacent ones of the couplers at a preceding stage may be connected to two input terminals of the other coupler at a following stage. Each of the couplers may be a polarization holding coupler, and main axes of polarized light coincide with each other at two connection portions at which each adjacent ones of the couplers are connected to each other, and or alternatively, the couplers may be connected such that main axes of polarized light of two excitation light beams inputted to the second polarization holding coupler are different from each other.

Meanwhile, the couplers may be connected such that the excitation light outputted from the excitation light source 9 is branched into two beams by one of the couplers at the first stage and a delay time is provided to one of routes of the two light beams so that a great delay time difference may be provided between the two light beams of the two routes until the two light beams are coupled by another one of the couplers at the last stage.

The excitation light source 9 may be constructed as a light source of the variable oscillation wavelength type wherein the oscillation wavelength of the excitation light source 9 is varied with a frequency higher than 1 kHz by providing for the excitation light source 9 control means for varying the injection current or the temperature to control the oscillation wavelength of the excitation light source 9 so that polarization of excitation light to be outputted from the excitation light source 9 may be varied.

Figure 6A:
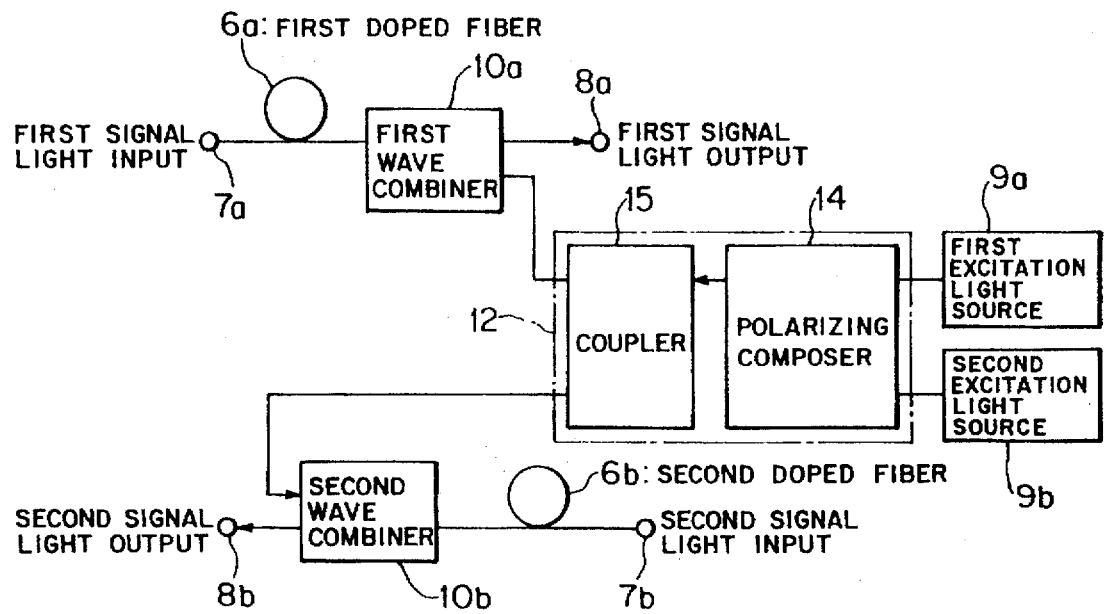
FIGS. 6(a) and 6(b) are block diagrams illustrating the principle of a yet further aspect of the present invention.
Figure 6B:
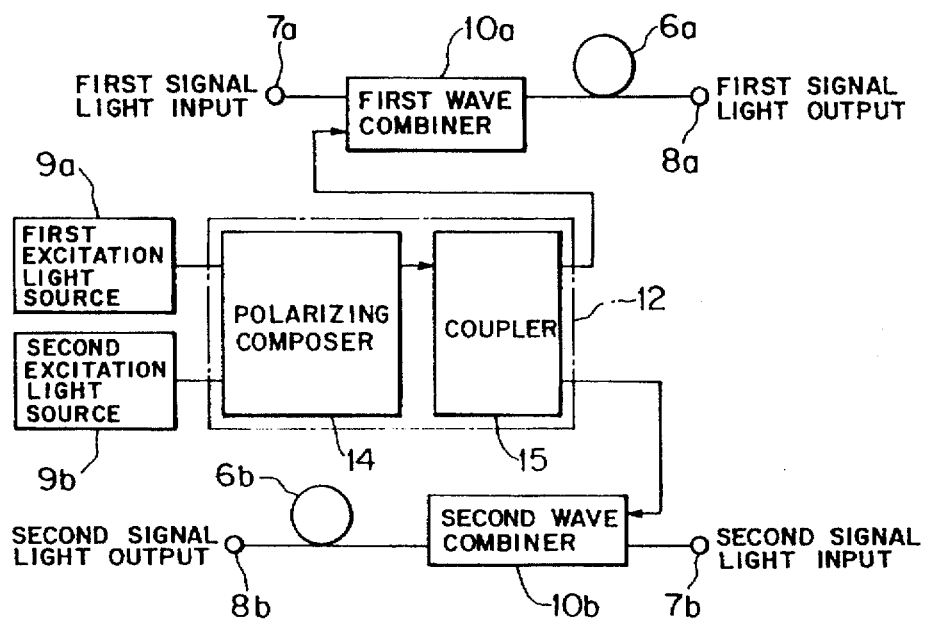

FIGS. 6(a) and 6(b) show optical amplification apparatus for an optical communication system according to a yet further aspect of the present invention. The optical amplification apparatus shown in FIG. 6(a) is of the forward excitation construction while the optical amplification apparatus shown in FIG. 6(b) is of the rearward excitation construction.

Referring to FIGS. 6(a) and 6(b), the optical amplification apparatus shown include a first doped fiber 6a doped with ions of a type, a first input port 7a for inputting signal light to the first doped fiber 6a, a first output port 8a for outputting the signal light amplified by the first doped fiber 6a, a first wave combiner 10a for inputting excitation light to the first doped fiber 6a, a second doped fiber 6b doped with ions of the same type or another type, a second input port 7b for inputting signal light to the second doped fiber 6b, a second output port 8b for outputting the signal light amplified by the second doped fiber 6b, a second wave combiner 10b for inputting the excitation light to the second doped fiber 6b, a pair of excitation light sources 9a and 9b for outputting excitation light, and excitation light distribution means 12 including a polarizing composer 14 and a coupler 15.

The polarizing composer 14 polarizes and composes excitation light outputted from the excitation light sources 9a and 9b, and the coupler 15 is interposed between the polarizing composer 14 and the first and second wave combiners 10a and 10b and supplies excitation light simultaneously to the first and second doped fibers 6a and 6b.

In the optical amplification apparatus for an optical communication system, signal light from the first input port 7a is inputted to the first doped fiber 6a doped with ions of a type from the first input port 7a while excitation light is inputted to the first doped fiber 6a by way of the first wave combiner 10a, and the signal light amplified by the first doped fiber 6a is outputted from the first output port 8a. Meanwhile, signal light is inputted to the second doped fiber 6b doped with the same type or another type from the second input port 7b while excitation light is inputted to the second doped fiber 6b by way of the second wave combiner 10b, and the signal light amplified by the second doped fiber 6b is outputted from the second output port 8b.

Two excitation light beams from the excitation light sources 9a and 9b are polarized and composed into a single excitation light beam by the polarizing composer 14, and the excitation light is outputted to the first and second wave combiners 10a and 10b by way of the coupler 15. Consequently, the excitation light is supplied simultaneously to the first and second doped fibers 6a and 6b.

The first and second doped fibers 6a and 6b may be optical fibers doped with erbium. Meanwhile, the coupler 15 may be a directional coupler or a 3 dB coupler.

The first and second excitation light sources 9a and 9b may operate simultaneously to supply excitation light to the first and second doped fibers 6a and 6b. A different frequency or frequencies may be supplied to one or both of the first and second excitation light sources 9a and 9b when one or both of oscillation wavelengths of the first and second excitation light sources 9a and 9b are to be varied in order to vary polarization of the excitation light to be outputted from the excitation light sources 9a and 9b.

Optical fibers interconnecting the first and second excitation light sources 9a and 9b and the polarizing wave combiner 14 may be polarization holding fibers which maintain polarization conditions of the excited light, and the couplers may be polarization holding couplers.

The polarizing composer 14 and the polarization holding fibers may be connected such that a main axis of polarized light on the output side of the polarizing composer 14 and a main axis of polarized light of the polarization holding fibers coincide with each other.

With the optical amplification apparatus for an optical communication system described above with reference to FIGS. 4(a), 4(b), 5(a), 5(b), 6(a) and 6(b), excitation light can be outputted in a stabilized condition with a reduced variation of the optical output, and consequently, deterioration of the signal to noise ratio of signal light can be suppressed.

Where the excitation light distribution means includes the plurality of couplers 13 connected in series, the branching ratio variation of the excitation light distribution means can be reduce, and consequently, deterioration of the signal to noise ratio of signal light can be suppressed.

Where the excitation light is supplied simultaneously to the two doped fibers 6a and 6b by way of the coupler 15, the variation of the gain of signal light outputted by way of the first and second output ports can be suppressed, and consequently, deterioration of the signal to noise ratio of signal light can be suppressed.

Where the depolarization means for depolarizing the excitation light from the excitation light source 9 is provided and includes delay time difference providing means for providing a delay time difference between two polarized light components of the excitation light and a wave combiner for inputting the excitation light having passed the delay time difference providing means and the delay time difference providing means is formed from a birefringent optical material, excitation light can be converted into depolarized light with a simple construction.

Where the polarization holding fiber and the delay time difference providing means are disposed such that a main axis of the polarization holding fiber is displaced by 45 degrees from a main axis of the birefringent optical material, excitation light can be converted into depolarized light effectively.

Where the first and second doped fibers 6a and 6b are optical fibers doped with erbium, it can amplify signal light in accordance with the length of itself, and consequently, simplification in designing of the apparatus can be achieved.

Where the excitation light distribution means includes a directional coupler or a 3 dB coupler, the variation of the branching ratio of excitation light can be compensated for with a high degree of accuracy, and consequently, excitation light can be outputted in a stabilized condition with a reduced variation of the optical output and deterioration of the signal to noise ratio of signal light can be suppressed.

Where the excitation light source 9 includes the first and second excitation light sources, the variation of the branching ratio of excitation light can be compensated for with a high degree of accuracy. Consequently, excitation light can be outputted in a stabilized condition with a reduced variation of the optical output, and deterioration of the signal to noise ratio of signal light can be suppressed remarkably.

Further, where the first and second excitation light sources operate simultaneously to supply excitation light to the first and second doped fibers 6a and 6b, excitation light can be outputted in a stabilized condition with a reduced variation of the optical output, and consequently, deterioration of the signal to noise ratio of signal light can be suppressed remarkably.

Where a different frequency or frequencies are supplied to one or both of the first and second excitation light sources when one or both of oscillation wavelengths of the excitation light sources are to be varied in order to vary polarization of the excitation light to be outputted from the excitation light source 9, the oscillation wavelength of excitation light can be varied, and consequently, excessive losses of the wave combiners can be suppressed. Accordingly, deterioration of the signal to noise ratio of signal light can be suppressed further.

Where optical powers of light to be outputted from the two excitation light sources are set so that a sum thereof may be lower than a maximum excitation light power of light which can be outputted from one of the excitation light sources when the other excitation light source is broken, otherwise possible destruction of one of the excitation light sources can be prevented when the other excitation light source is broken.

Where the excitation light source 9 includes the first and second excitation light sources and are constructed such that one of two axes of the excitation light distribution means coincides with a main axis of polarized light of output light of the first and second excitation light sources inputted to the excitation light distribution means, excitation light can be outputted in a stabilized condition and the variation of the branching ratio by the coupler can be suppressed. Consequently, deterioration of the signal to noise ratio of signal light can be suppressed.

Where the excitation light source includes the first and second excitation light sources and are constructed such that one of two axes of the excitation light distribution means coincides with a main axis of polarized light of output light of the first excitation light source inputted to the excitation light distribution means and the other axis of the excitation light distribution means coincides with a main axis of polarized light of output light of the second excitation light source inputted to the excitation light distribution means, excitation light can be outputted in a stabilized condition and the variation of the branching ratio by the coupler can be suppressed. Consequently, deterioration of the signal to noise ratio of signal light can be suppressed.

Where the oscillation wavelength of excitation light is varied with the frequency higher than 1 kHz by varying the injection current or the temperature, excessive losses of the wave combiners can be suppressed and deterioration of the signal to noise ratio of signal light can be suppressed.

Where two output terminals of one of each two adjacent ones of the couplers at a preceding stage are connected to two input terminals of the other coupler at a following stage, the variation of the branching ratio of the couplers can be suppressed, and consequently, deterioration of the signal to noise ratio of signal light can advantageously be suppressed.

Where each of the couplers 13-1 to 13-n is a polarization holding coupler and main axes of polarized light coincide with each other at two connection portions at which each adjacent ones of the couplers are connected to each other and besides the couplers 13-1 to 13-n are connected such that main axes of polarized light of two excitation light beams inputted to the second polarization holding coupler are different from each other, further stabilized excitation light can be supplied, and consequently, deterioration of the signal to noise ratio of signal light can be suppressed further.

Where the couplers 13-1 to 13-n are connected such that the excitation light outputted from the excitation light source 9 is branched into two beams by one of the couplers at the first stage and a delay time is provided to one of routes of the two light beams so that a great delay time difference may be provided between the two light beams of the two routes until the two light beams are coupled by another one of the couplers at the last stage, a fluctuation of the intensity of light can be suppress, and consequently, further stabilized excitation light can be supplied. Accordingly, deterioration of the signal to noise ratio of signal light can be suppressed further.

Where optical fibers interconnecting the first and second excitation light sources and the polarizing composer 14 are polarization holding fibers which maintain polarization conditions of the excited light and the coupler 15 is a polarization holding coupler and besides the polarizing composer 14 and the polarization holding fibers are connected such that a main axis of polarized light on the output side of the polarizing composer 14 and a main axis of polarized light of the polarization holding fibers coincide with each other, a polarization condition of excitation light can be maintained, and consequently, further stabilized excitation light can be supplied. Accordingly, deterioration of the signal to noise ratio of signal light can be suppressed further.

b. Description of the First Embodiment

Figure 8:
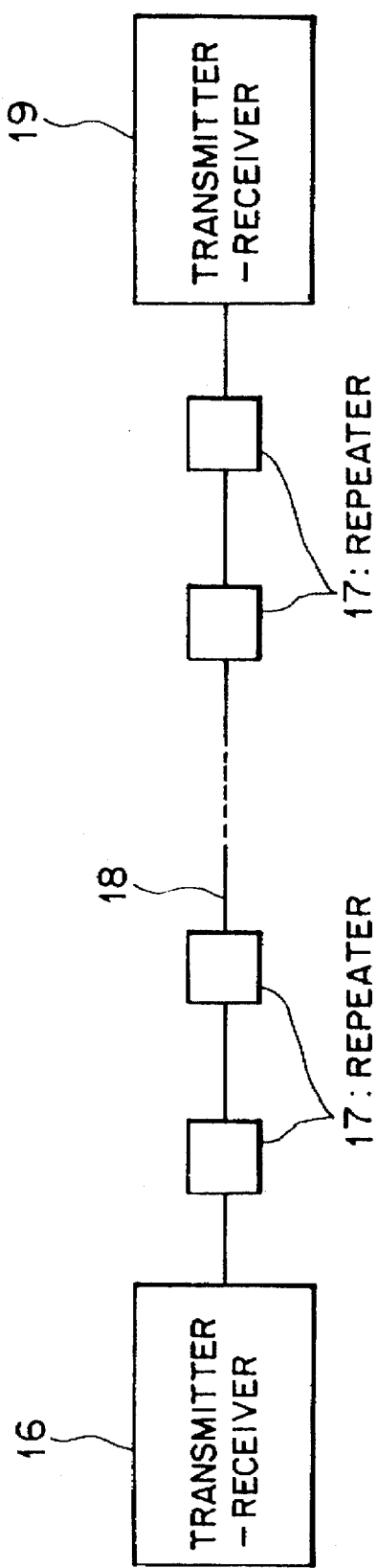
FIG. 8 is a block diagram showing an optical communication system to which the present invention is applied.

Referring first to FIG. 8. there is shown an optical communication system to which the present invention is applied. The optical communication system shown includes a pair of transmitter-receivers 16 and 19 located in a remotely spaced relationship from each other and serve as terminal station apparatus which transmit and receive signal light to effect communications by way of a transmission line 18. The optical communication system further includes a plurality of repeaters 17 interposed between the transmitter-receivers 16 and 19 for repeating signal light on the transmission line 18. Thus, signal light is transmitted and received from and to the remotely located transmitter-receivers 16 and 19 over the transmission line 18 formed from an optical fiber by way of the repeaters 17 to effect communications.

Figure 7:
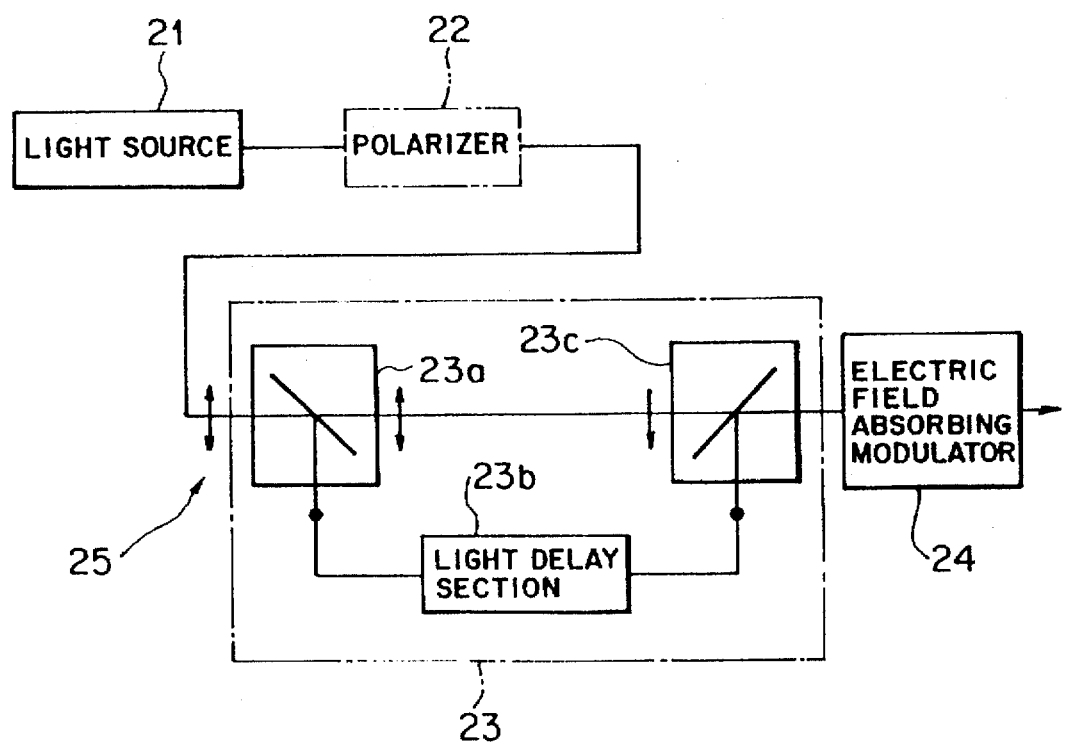
FIG. 7 is a block diagram of an optical transmission apparatus for an optical communication system showing a first preferred embodiment of the present invention.

FIG. 7 shows an optical transmission apparatus for an optical communication system according to a first preferred embodiment of the present invention. The present optical transmission apparatus for an optical communication system is applied to such an optical communication system as described above with reference to FIG. 8 and is constructed taking notice of a transmission function of the transmitter-receivers shown in FIG. 8.

In particular, referring to FIG. 7, the optical transmission apparatus shown includes a light source 21 for outputting signal light. A gas laser, a solid state laser, a semiconductor laser diode, a laser of the type wherein a fixed polarization fiber is optically coupled to a semiconductor laser module or some other suitable laser may be employed for the light source 21. The optical transmission apparatus further includes a polarizer 22 which converts, when signal light outputted from the light source 21 is elliptically polarized light or circularly polarized light, the signal light into linearly polarized light.

The optical transmission apparatus further includes a depolarizer 23 which inputs and depolarizes linearly polarized light from the polarizer 22 into depolarized light and outputs the depolarized signal light. The depolarizer 23 includes a beam splitter 23a, a light delay element 23b and a wave combiner 23c.

Here, depolarized light signifies light which has an equal power between a vertically polarized light component and a horizontally polarized light component without having a particular tendency regarding a polarization direction and has no correlation in phase between the vertically polarized light component and the horizontally polarized light component, and depolarizatien signifies to convert signal light into depolarized light.

The beam splitter 23a splits linearly polarized light from the polarizer 22 equally into two light beams. For example, a fixed polarization coupler composed of polarization holding fibers fusion-molded to each other, a PBS (Polarization Beam Splitter) of the small optical element type produced using a dielectric multi-layer film or crystal or some other suitable element may be used for the beam splitter 23a.

The light delay element 23b delays one of linearly polarized light beams branched from the beam splitter 23a by an amount greater than a coherence length. The wave combiner 23c couples one of the linearly polarized light beams delayed by the light delay element 23b and the other linearly polarized light beam which has not been delayed, in an orthogonal relationship to produce and output depolarized light.

Accordingly, the light source 21, the polarizer 22 and the depolarizer 23 cooperatively construct a depolarized light source 25.

The optical transmission apparatus further includes an electric field absorbing modulator or external modulator 24, which modulates signal light from the depolarizer 23 into a condition of a reduced polarization dependency and transmits the thus modulated signal light to the reception side by way of a transmission line.

In order to covert depolarized signal light from the depolarizer 23 into further depolarized light, the optical transmission apparatus is constructed such that the signal light is inputted to the electric field absorbing modulator 24 so that the polarization dependency of the depolarized light source 25 may be cancelled by the polarization dependency of the electric field absorbing modulator 24. Consequently, even if a polarized light component is included in the signal light from the depolarized light source 25, this is absorbed by the polarization dependency of the electric field absorbing modulator 24, and consequently, depolarized light of a higher degree of accuracy can be outputted from the optical transmission apparatus.

The optical transmission apparatus for an optical communication system according to the first embodiment of the present invention having such construction as described above operates in the following manner.

In particular, signal light outputted from the light source 21 is converted into signal light of linearly polarized light by the polarizer 22 and then inputted to the beam splitter 23a of the depolarizer 23.

The signal light of the linearly polarized light inputted to the beam splitter 23a is branched equally into two signal light beams while maintaining its polarization condition, and one of the linearly polarized signal light beams is delayed by the light delay element 23b and then inputted to the wave combiner 23c while the other linearly polarized signal light beam is inputted to the wave combiner 23c without being delayed.

In the wave combiner 23c, the two signal light beams are coupled orthogonally to each other into depolarized light. The depolarized light is outputted from the wave combiner 23c and modulated by the electric field absorbing modulator 24, whereafter it is transmitted to the reception side by way of the transmission line.

Figure 9:
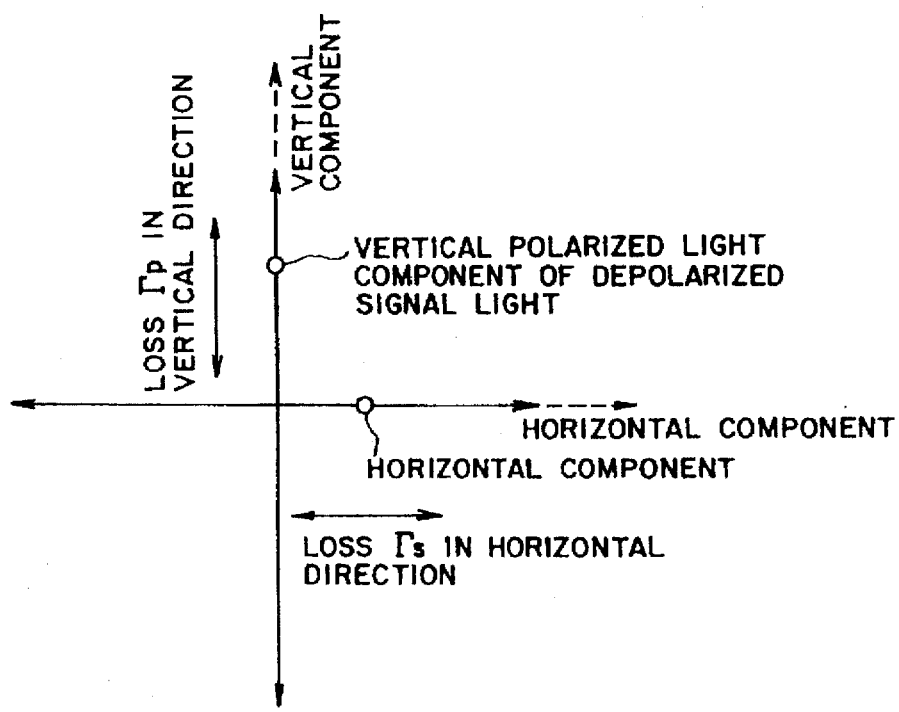
FIG. 9 is a diagram illustrating a polarization condition of depolarized signal light.

Thus, the power of the depolarized signal light transmitted by way of the transmission line is equally divided into two orthogonally polarized light components as seen from FIG. 9, and the rate between the powers of the polarized light components does not vary with respect to time. Consequently, even if the transmission line has some polarization dependency, one half of the power of the signal light always has the gain of $\Gamma$s while the other half has the gain of $\Gamma$p, and no power variation is exhibited with respect to time irrespective of a variation of the polarization condition. Further, since one of the two polarized light components passes the higher gain side without fail, otherwise possible deterioration of the signal power when polarized light is involved and the entire signal power depends upon a polarized light component which passes the lower gain side can be avoided.

Where the optical transmission apparatus for an optical communication system described above includes, for example, 199 repeaters to effect 199 repetitions, if the gains of the optical amplifiers in the optical amplifier multi-repeater system have a polarization dependency, the signal to noise ratio (SNR: Q value) varies with respect to time, which makes a factor of deterioration of the transmission characteristics since the polarization condition of signal light is varied irregularly in the optical fiber by the polarization dependency. Here, a statistical distribution of the Q value fluctuation and results by depolarization obtained by simulation calculation of the variation of the polarization condition of signal light based on the Monte Carlo method will be described with reference to FIGS. 46 to 50.

Figure 46:
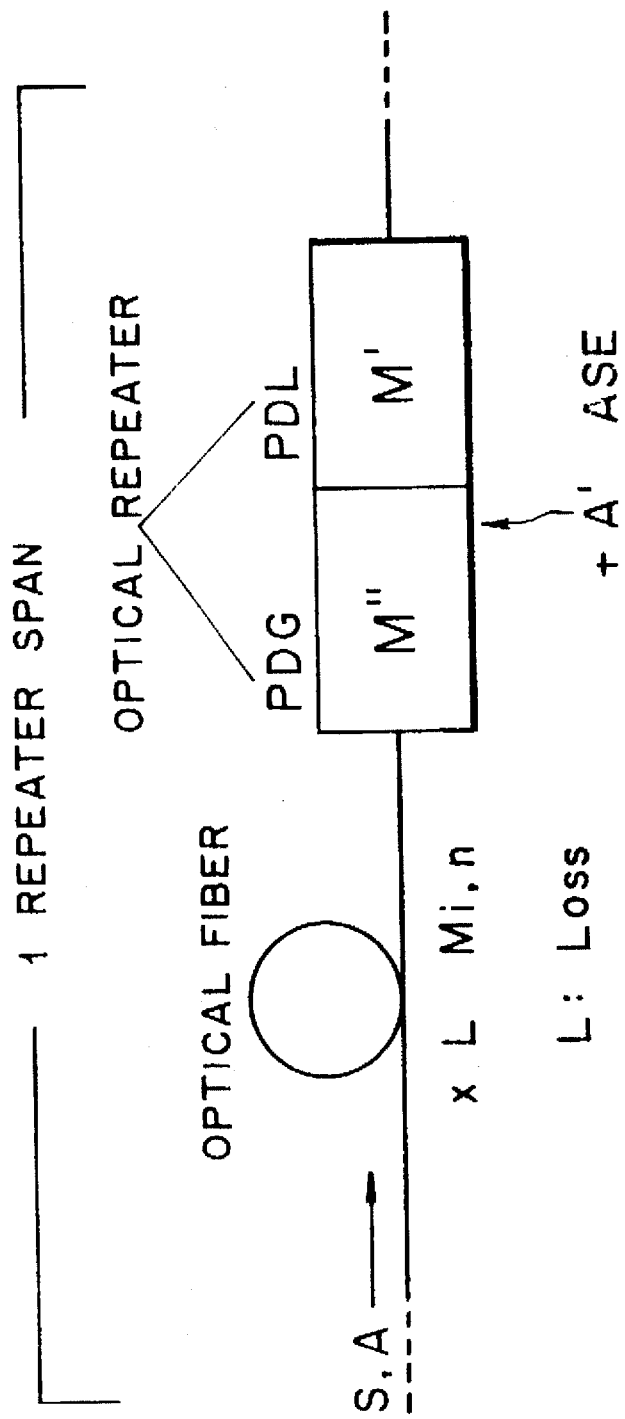
FIG. 46 is a diagrammatic view illustrating a theoretical model showing the construction of a transmission line.

FIG. 46 illustrates a theoretical model showing the construction of a transmission line. Referring to FIG. 46, polarization conditions of signal light and ASE during transmission are indicated by Stokes' vectors S and A. Meanwhile, maps between vectors which provide a variation of a polarization condition are indicated by a Mueller matrix $M_{i,n}$. Here, the suffix i,n denotes a different map and repeater section. The polarization dependency of the gain of an optical amplifier is considered arising from polarization hole burning (PHB) of the EDFA and a polarization dependent loss (PDL) of a passive device employed in the repeater. Therefore, the polarization dependency of the gain (PDG) by the PHB and the PDL of the passive device are represented by Mueller matrices M' and M", respectively. Since the polarization condition in the transmission line exhibits a random variation, a total of 10,000 combinations of the matrix $M_{i,n}$ ($M_{i,1}$, $M_{i,2}$, ... $M_{i,n}$) were generated based on random numbers, and the distribution of SNR (Q value)= $20\log_{10}[(\mu_1-\mu_o)/(\sigma_1+\sigma_o)]$ was calculated from corresponding Stokes' vectors S and A after transmission. Here, $\mu$ and $\sigma^2$ are an average signal level and a noise power, respectively, and the suffixes i and o denote the mark and the space, respectively. Further, dominant components of the noise are signal-ASE beat noise and ASE-ASE beat noise.

Figure 47:
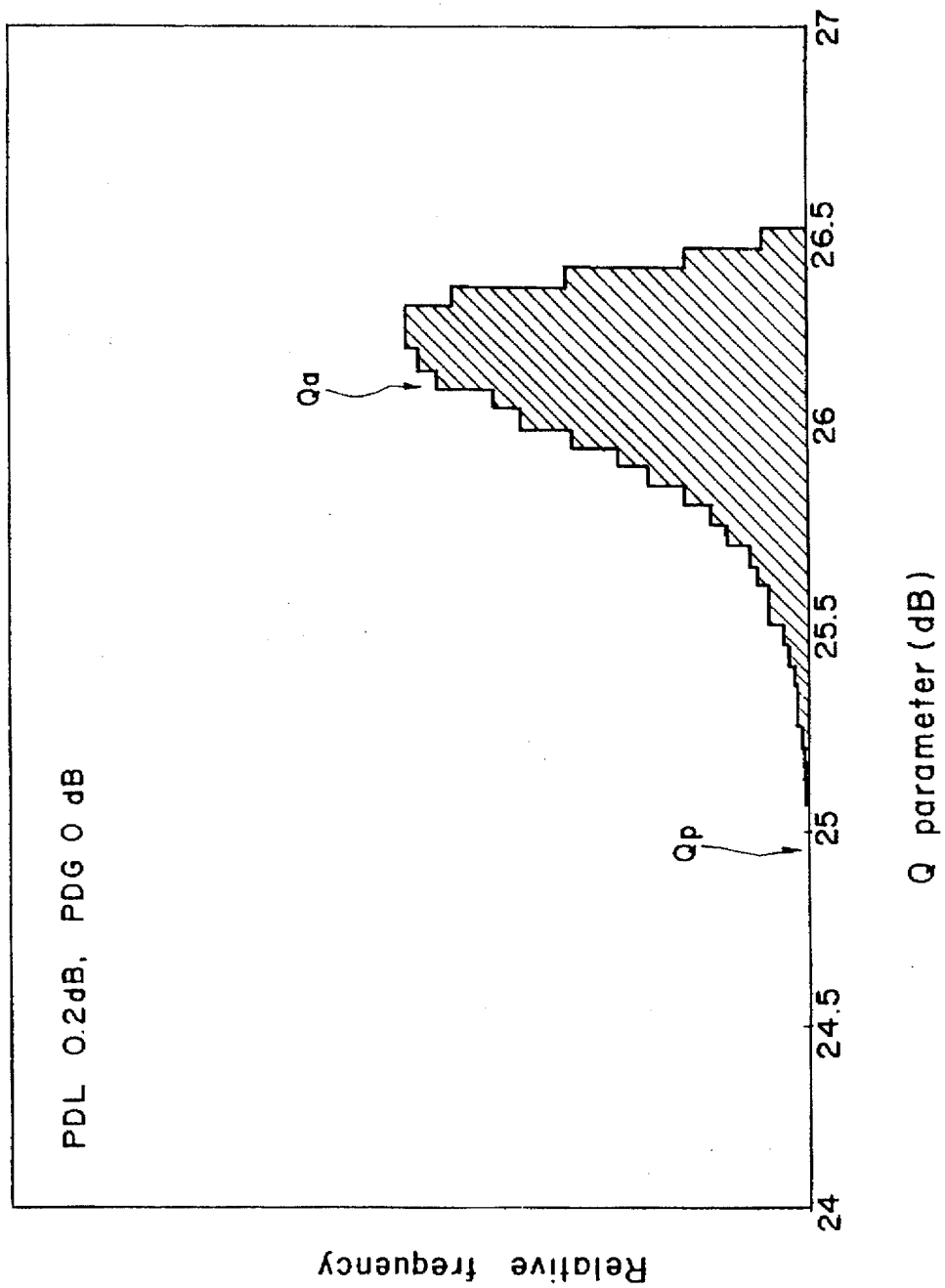
FIG. 47 is a view illustrating an example of calculation of a probability distribution of the signal to noise ratio.
Figure 49:
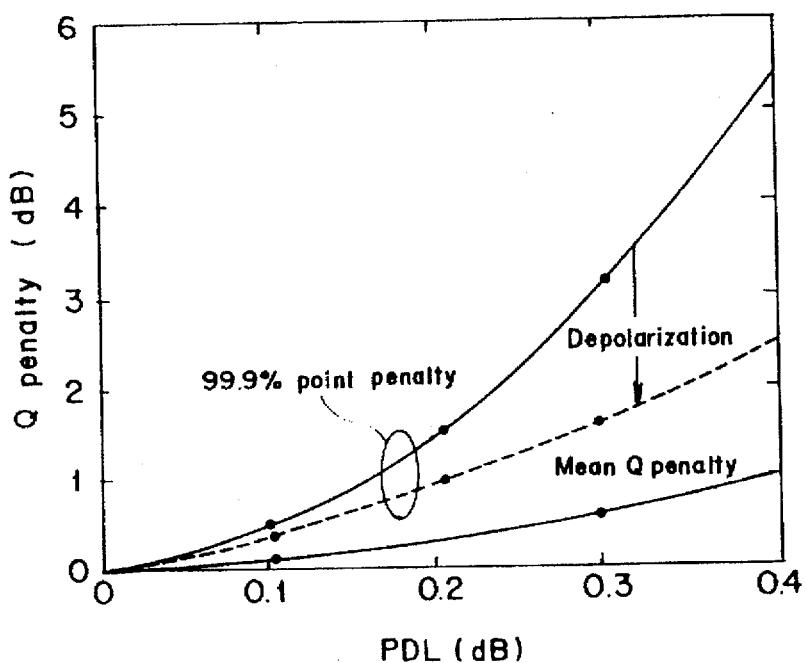
FIGS. 49 and 50 are views illustrating results of calculation of the mean Q penalty.
Figure 50:
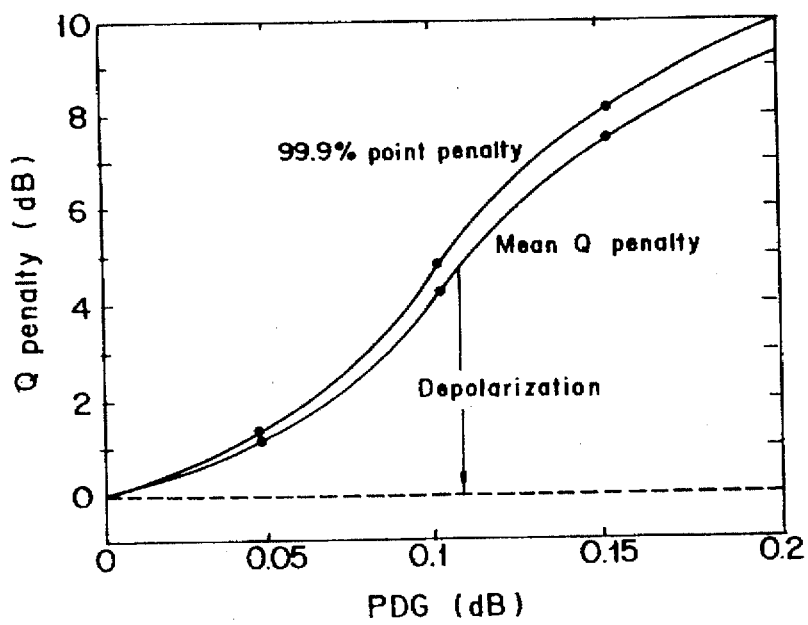
Figure 51:
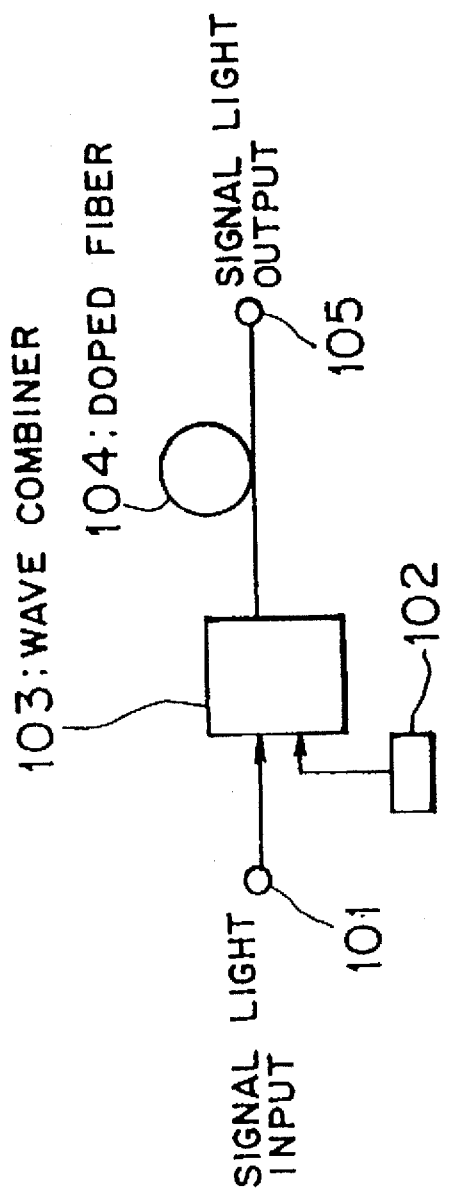
FIG. 51 is a block diagram showing an exemplary optical amplifier.
Figure 52:
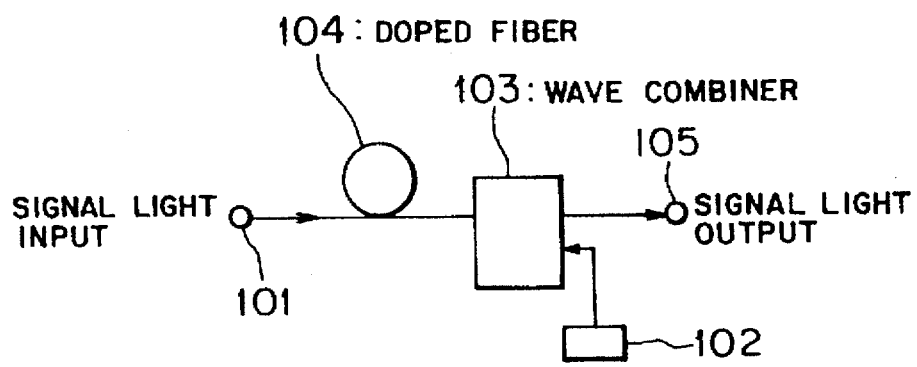
FIG. 52 is a block diagram showing another exemplary optical amplifier.
Figure 53:
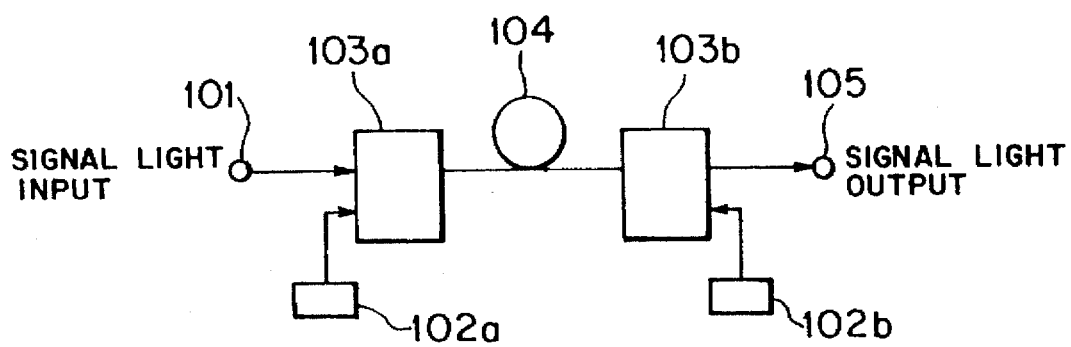
FIG. 53 is a block diagram showing a further exemplary optical amplifier.
Figure 54:
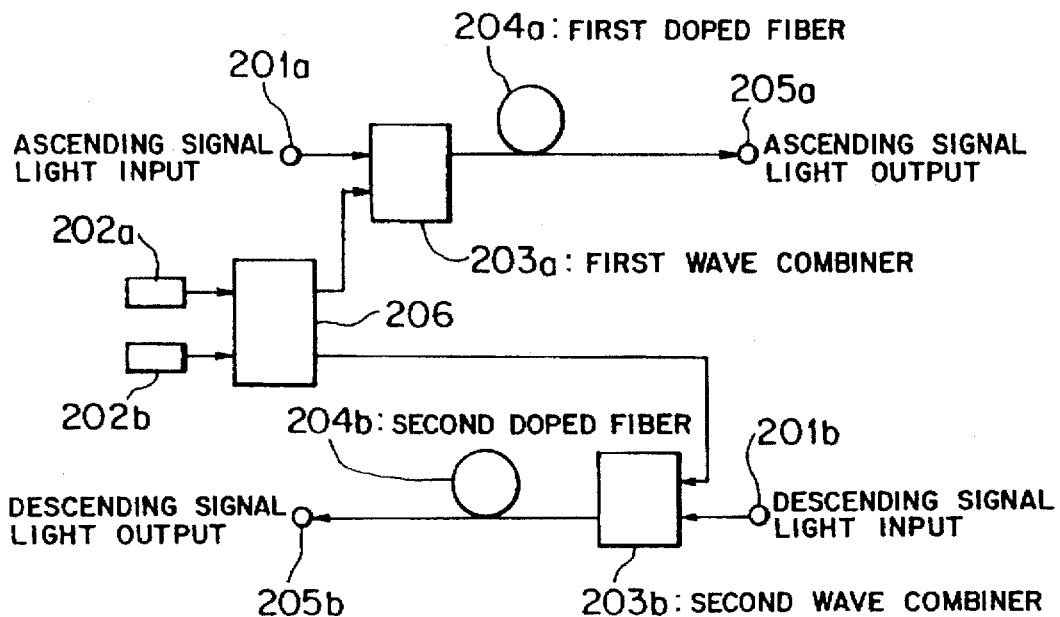
FIG. 54 is a block diagram showing a still further exemplary optical amplifier.
Figure 55:
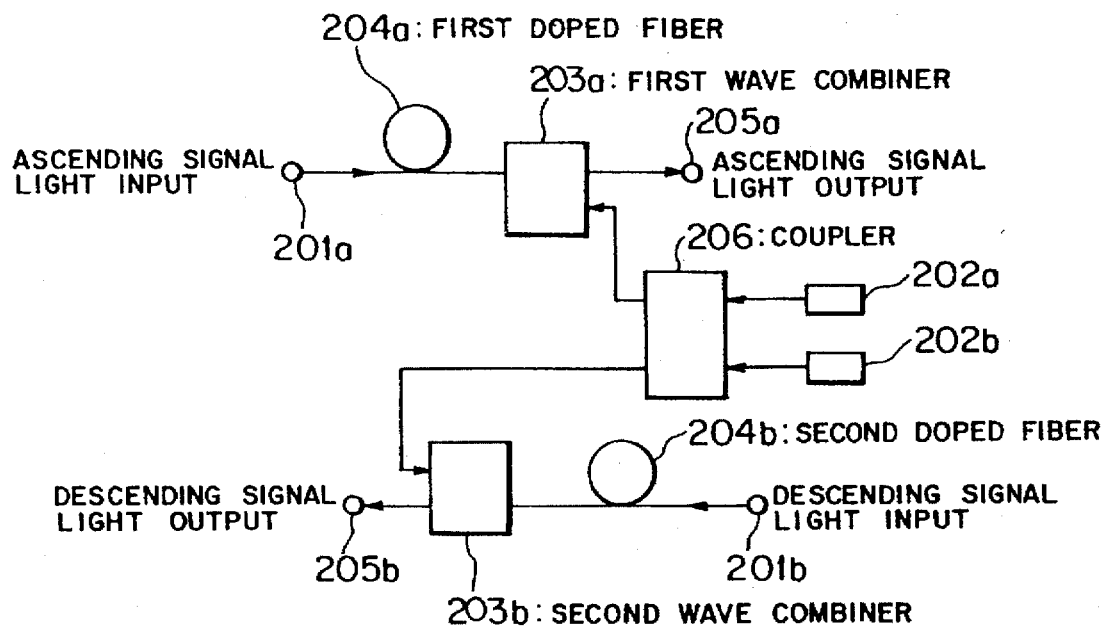
FIG. 55 is a block diagram showing a yet further exemplary optical amplifier.
Figure 56:
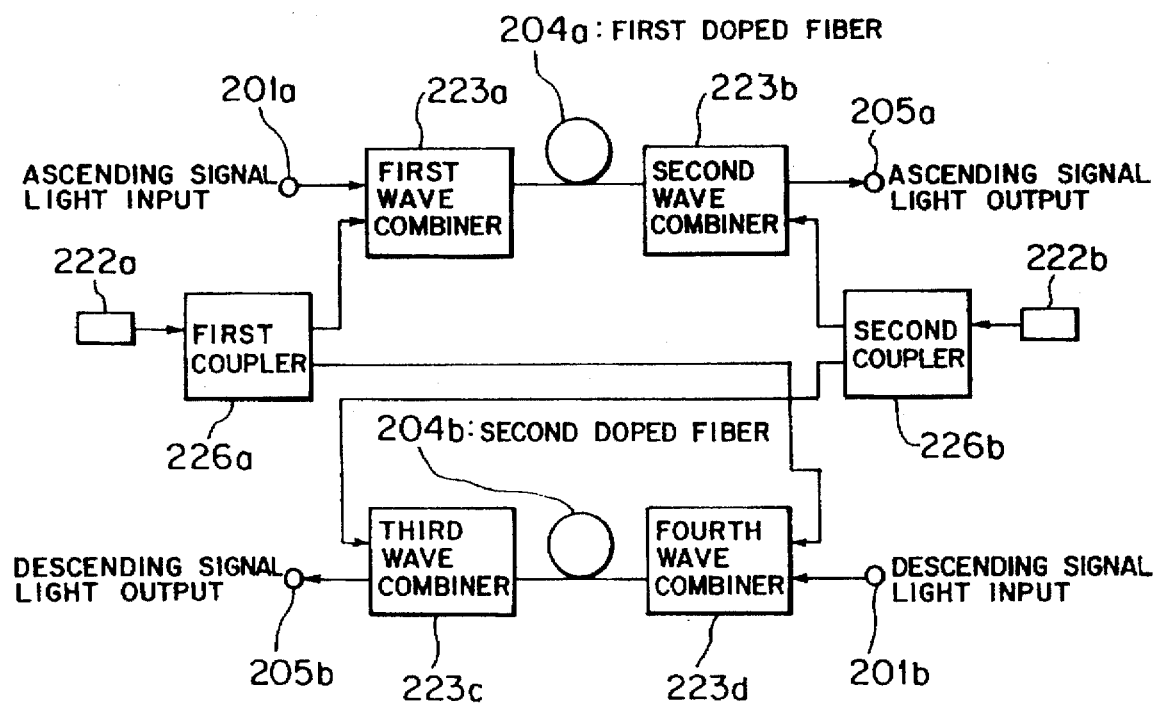
FIG. 56 is a block diagram showing a yet further exemplary optical amplifier.
Figure 57:
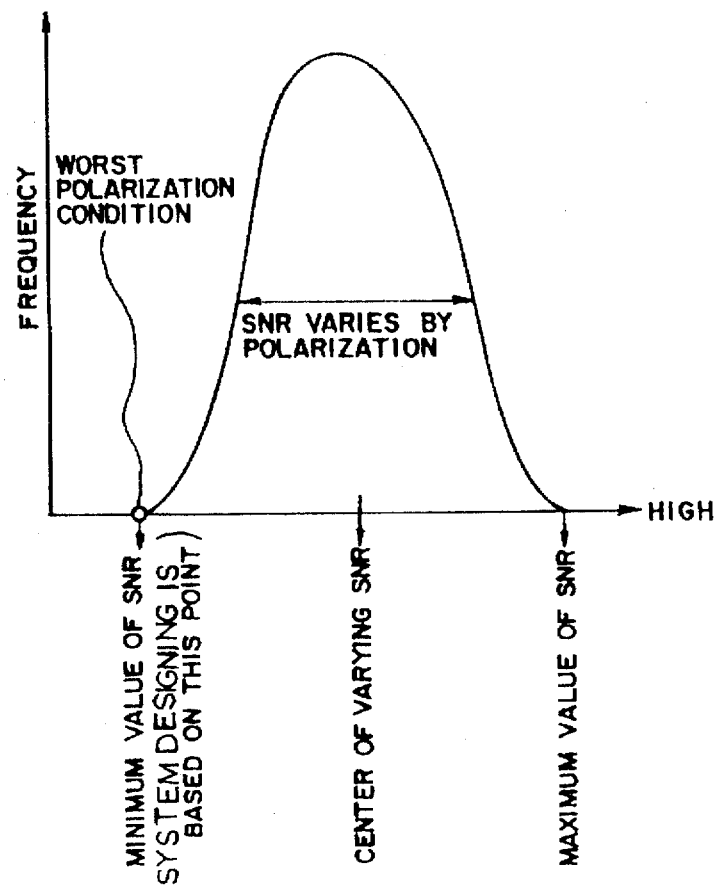
FIG. 57 is a diagram illustrating the variation of the signal to noise ratio.
Figure 58:
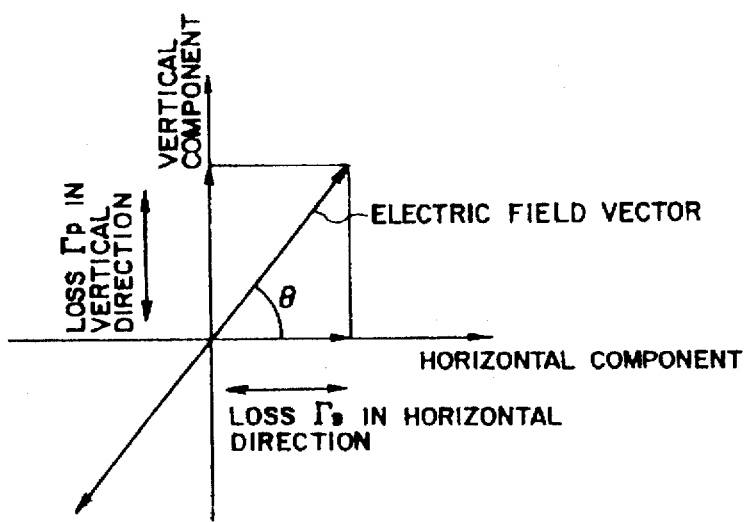
FIG. 58 is a diagram illustrating a polarization condition of signal light.

FIG. 47 illustrates an example of probability distribution calculation of the Q values after such 199 repetitions (total system length: 10,000 km). In the calculation example illustrated in FIG. 47, values listed in FIG. 48 were used as calculation parameters. Here, in order to describe deterioration of the Q value (Q penalty) by the polarization dependency of the gain of a repeater in detail, the difference Qn–Qa between an average value Qa of the Q value distribution and a value Qn in the case wherein no polarization dependency is involved is defined as mean Q penalty. Results of calculation of the mean Q penalty arising from the PDL and the PDG are illustrated in FIGS. 49 and 50. In the case of the PDG, also where the PDG of individual repeaters is 0.1 dB, significant deterioration of 3 dB or more is caused. In contrast, in the case of the PDL, it can be seen that, if the PDL is within 0.4 dB, the mean Q penalty can be suppressed to 1 dB or less. However, actually since the Q value varies with respect to time in accordance with such a probability distribution as illustrated in FIG. 47, deterioration of the Q value is greater in the worst condition which may probably be taken by the Q value. Taking such statistic property into consideration, the penalty by the Q value fluctuation is defined with the difference Qn–Qp between the value Qn and the lowest value Qp which provides 99.9 percent or more of the distribution (99.9% point penalty). Results of the calculation are similarly illustrated in FIGS. 49 and 50. In the case of the PDG, the difference between the 99.9% point penalty and the mean Q penalty falls within 0.5 dB, but in the case of the PDL, the 99.9% point penalty exhibits an exponential increase with respect to an increase of the PDL. Summarizing the results described above qualitatively, it can be recognized that the PDL has an effect to increase the width of the distribution while the PDG has another effect to decrease the average value of the distribution.

As regards the case where signal light is converted into non-polarized light, results of penalty calculation which was conducted with the polarization degree of transmission light set to 0% are indicated by chain lines in FIGS. 49 and 50. As seen from the chain lines in FIGS. 49 and 50, as regards the PDG, the penalty can be suppressed completely by depolarization, and as regards the PDL, the 99.9% point penalty can be suppressed to about one half.

Since depolarized signal light can be transmitted with a simple construction and the polarization dependency of a loss or a gain on a transmission line can be suppressed in this manner, there is an advantage in that otherwise possible deterioration of the signal to noise ratio can be eliminated. Incidentally, the polarization dependency on a transmission line or an optical amplification apparatus can be permitted to some degree, which allows enhancement of the productivity for optical amplification apparatus or like apparatus.

It is to be noted that, while the polarizer 22 is employed in the first embodiment in order to convert signal light from the light source 21 into linearly polarized light, the means for such conversion is not limited to the polarizer 22, and for example, a polarization control apparatus (polarization control means) constituted from the combination of a λ/4 (quarter-wave) plate and a λ/2 (half-wave) plate may be employed, or where signal light outputted from the light source 21 is not elliptically polarized light or circularly polarized light but linearly polarized light, the polarizer 22 or such polarization control apparatus as described above need not be employed.

Further, while the electric field absorbing modulator 24 is used as an external modulator in the first embodiment, the external modulator is not limited to the electric field absorbing modulator 24, and for example, a LiNbO (lithium niobate) modulator or some other modulator may be employed as the external modulator.

b1. Description of the First Modification to the First Embodiment

Figure 10:
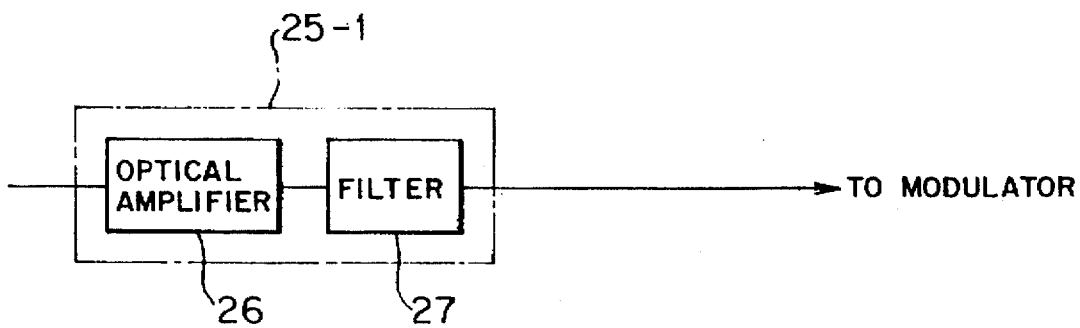
FIG. 10 is a block diagram showing a first modification to the optical transmission apparatus shown in FIG. 7.
Figure 11:
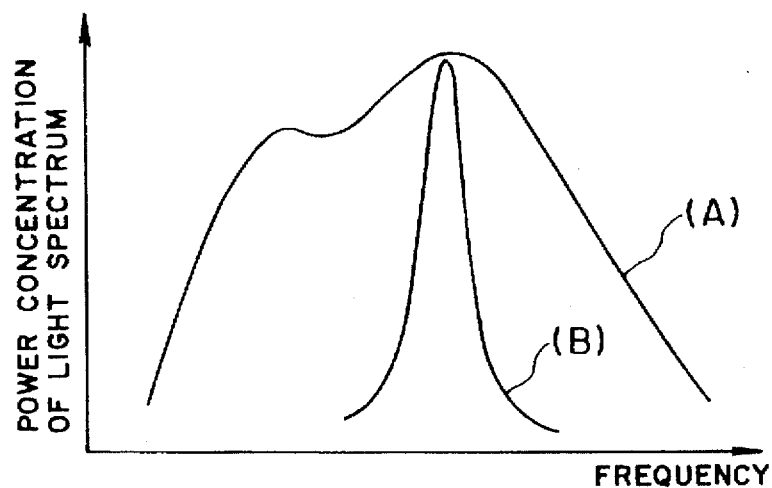
FIG. 11 is a diagram illustrating a filter characteristic of a filter.

FIG. 10 shows a first modification to the optical transmission apparatus for an optical communication system of the first embodiment of the present invention. Referring to FIG. 10, the modified optical transmission apparatus shown is different from the optical transmission apparatus of the first embodiment shown in FIG. 7 only in that it includes, in place of the depolarized light source 25 shown in FIG. 7, a modified depolarized light source 25-1 which includes an optical amplifier 26 serving as an external amplifier for outputting spontaneous emission light having such a characteristic of depolarized light as indicated, for example, by a curve (A) in FIG. 11, and a filter 27 for converting the spectrum of spontaneous emission light outputted from the optical amplifier 26 into that of a narrow band of such a characteristic as indicated, for example, by another curve (B) in FIG. 11.

Accordingly, depolarized signal light of a high degree of accuracy can be transmitted with the apparatus of a simple construction, and consequently, similar effects or advantages to those of the first embodiment can be attained.

It is to be noted that, while the filter 27 is used in the present embodiment in order to convert spontaneous emission light from the optical amplifier 26 into signal light of a narrow band, it is possible to realize a depolarized light source without using the filter 27.

b2. Description of the Second Modification to the First Embodiment

Figure 12:
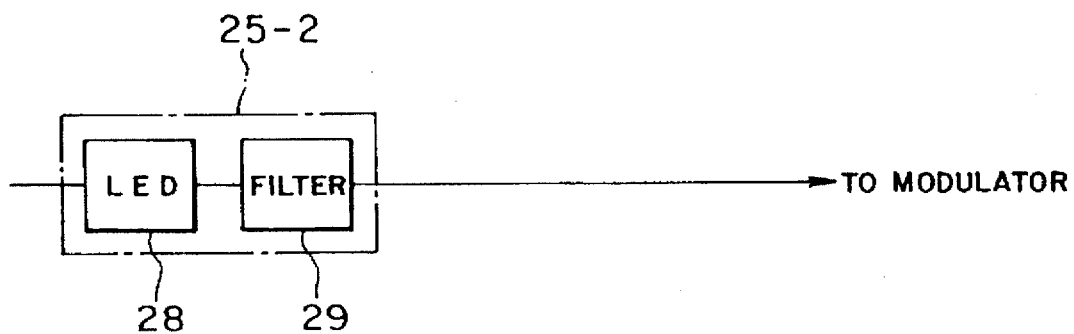
FIG. 12 is a block diagram showing a second modification to the optical transmission apparatus shown in FIG. 7.

FIG. 12 shows a second modification to the optical transmission apparatus for an optical communication system of the first embodiment of the present invention. Referring to FIG. 12, the modified optical transmission apparatus shown is different from the optical transmission apparatus of the first embodiment shown in FIG. 7 only in that it includes, in place of the depolarized light source 25 shown in FIG. 7, a modified depolarized light source 25-2 which includes an LED (Light Emitting Diode) 28, and a filter 29 for converting the spectrum of output light of the LED 28 into that of a narrow band.

Accordingly, depolarized signal light of a high degree of accuracy can be transmitted with the apparatus of a simple construction, and consequently, similar effects or advantages to those of the first embodiment can be attained.

It is to be noted that, while the filter 29 is used in the present embodiment in order to convert output light of the LED 28 into signal light of a narrow band, it is possible to realize a depolarized light source without using the filter 29.

b3. Description of the Third Modification to the First Embodiment

Figure 13:
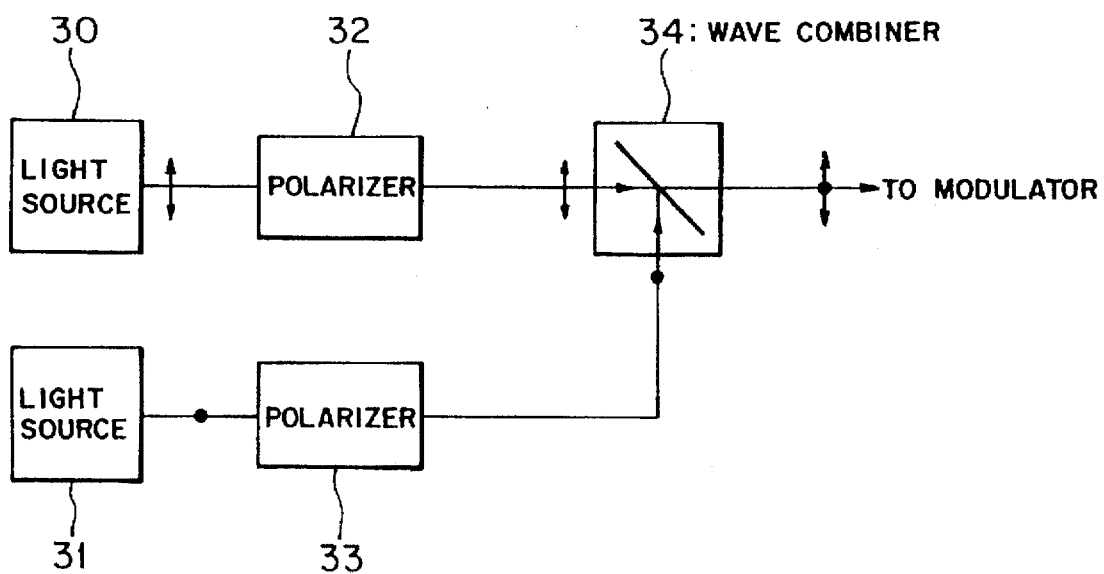
FIG. 13 is a block diagram showing a third modification to the optical transmission apparatus shown in FIG. 7.

FIG. 13 shows a third modification to the optical transmission apparatus for an optical communication system of the first embodiment of the present invention. Referring to FIG. 13, the modified optical transmission apparatus shown is different from the optical transmission apparatus of the first embodiment shown in FIG. 7 only in that it includes, as a depolarized light source in place of the depolarized light source 25 shown in FIG. 7, a pair of light sources 30 and 31 having a similar function as the light source 21 in the first embodiment, a pair of polarizers 32 and 33 having a similar function to that of the polarizer 22, and a wave combiner 34 having a similar function to that of the wave combiner 23c.

The two light sources 30 and 31 output linearly polarized light beams which have signal wavelengths equal to or a little different from each other and have output powers equal to each other.

Here, when the wavelengths of the two signal light beams outputted from the two light sources 30 and 31 are different from each other, since the velocities of the two light beams are made different from each other by the wavelength dispersion of the transmission line, the signal light beams can be depolarized artificially. However, where the difference between the wavelengths is excessively great, this makes a factor of waveform deterioration. If the wavelength dispersion of the transmission line is suppressed sufficiently or the wavelength difference between the two signal light beams is small, the influence of waveform deterioration is small.

On the contrary if the wavelengths of the two signal light waves are completely coincident with each other, such waveform deterioration as mentioned above does not occur, but also the effect of depolarization is reduced. However, where the signal light includes phase noise and has a spectral line width of approximately 100 MHz or less, depolarization by some amount is possible since the two light beams have a random phase relationship to each other.

While setting of a wavelength difference depends upon the bit rate, the spectrum line widths of the light sources and the dispersion of the transmission line in this manner, the wavelength difference is set so high that an effect of depolarization can be obtained but so low (lower than several tens pm) that no waveform deterioration is involved.

Accordingly, depolarized signal light beams which have wavelengths equal to or a little different from each other and have output powers equal to each other are outputted from the polarizers 32 and 33 and are coupled orthogonally to each other by the wave combiner 34 to produce depolarized signal light of a high degree accuracy to be transmitted. Consequently, similar effects or advantages to those of the first embodiment can be attained.

Accordingly, depolarized signal light beams whose wavelengths and output powers are equal to each other are outputted from the polarizers 32 and 33 and are coupled orthogonally to each other by the wave combiner 34 to produce depolarized signal light of a high degree accuracy to be transmitted. Consequently, similar effects or advantages to those of the first embodiment can be attained.

It is to be noted that, also in the present modification, polarization control apparatus (polarization control means) for converting signal light from the light sources 30 and 31 into linearly polarized light may be employed similarly as in the first embodiment described above.

c. Description of the Second Embodiment

Figure 14:
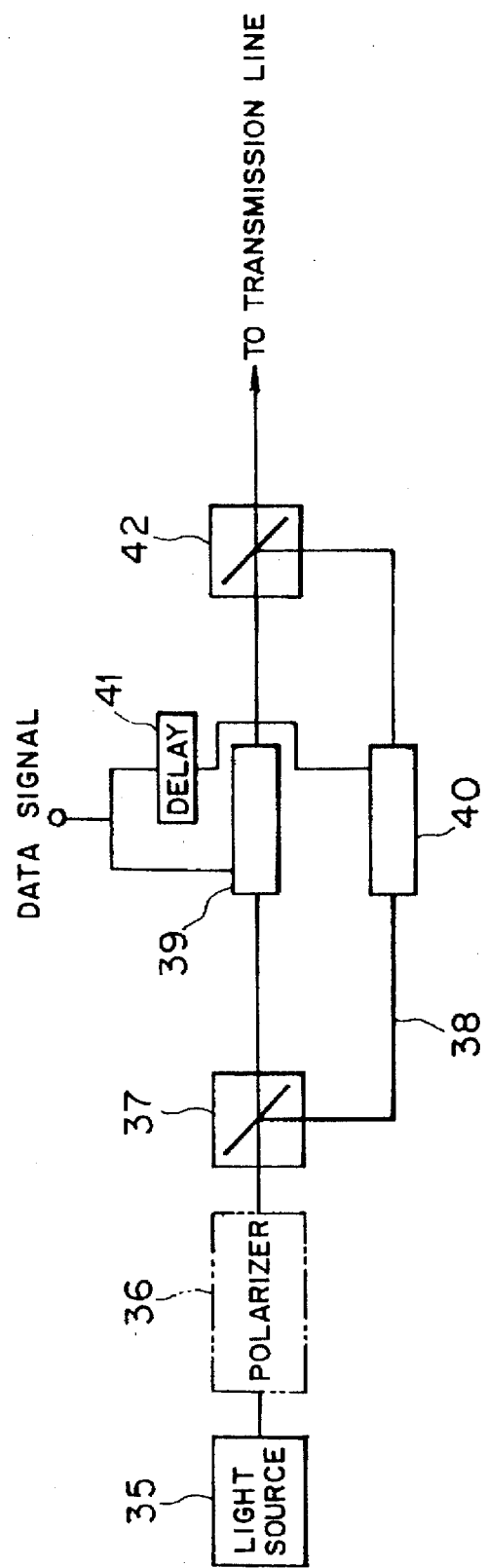
FIG. 14 is a block diagram of another optical transmission apparatus for an optical communication system showing a second preferred embodiment of the present invention.

Referring now to FIG. 14, there is shown an optical transmission apparatus for an optical communication system according to a second preferred embodiment of the present invention. Similarly to the optical transmission apparatus in the first embodiment described above, also the present optical transmission apparatus for an optical communication system is applied to such an optical communication system as described hereinabove with reference to FIG. 8 and is constructed taking notice of a transmission function of the transmitter-receivers (terminal station apparatus) shown in FIG. 8.

In particular, the optical transmission apparatus shown includes a light source 35 for outputting signal light. A gas laser, a solid state laser, a semiconductor laser diode, a laser of the type wherein a fixed polarization fiber is optically coupled to a semiconductor laser module or some other suitable laser may be employed for the light source 35. The optical transmission apparatus further includes a polarizer 36 which converts, when signal light outputted from the light source 35 is elliptically polarized light or circularly polarized light, the signal light into linearly polarized light.

The optical transmission apparatus further includes a beam splitter 37, which splits linearly polarized light from the polarizer 36 equally into two light beams while maintaining the polarization condition of the light. For example, a fixed polarization coupler composed of polarization holding fibers fusion-molded to each other, a PBS (Polarization Beam Splitter) of the small optical element type produced using a dielectric multi-layer film or crystal or some other suitable element may be used for the beam splitter 37.

The optical transmission apparatus further includes an optical delay element 38, which delays one of linearly polarized light beams branched from the beam splitter 37 and is formed from a polarization holding fiber having a sufficient length greater than a coherence length.

The optical transmission apparatus further includes a pair of electric field absorbing modulators or external modulators 39 and 40. The electric field absorbing modulator 39 inputs the other linearly polarized light beam branched from the beam splitter 37 and a DATA signal to modulate the linearly polarized light beam with the DATA signal while the other electric field absorbing modulator 40 inputs the linearly polarized light delayed by the optical delay element 38 and a similar DATA signal to that inputted to the electric field absorbing modulator 39 to modulate the linearly polarized light with the DATA signal.

The optical transmission apparatus further includes a delay element 41, which delays a DATA signal to be inputted to the electric field absorbing modulator 40 by a predetermined interval of time so that two signal light beams to be inputted to a wave combiner 42 may have a same data phase.

The wave combiner 42 couples one of two linearly polarized light beams branched from the beam splitter 37 which has been delayed by the optical delay element 38 and the other linearly polarized light which has not been delayed orthogonally to each other in a same data phase condition to produce and output depolarized light. The wave combiner 42 may be constituted from a fixed polarization coupler composed of polarization holding fibers fusion-molded to each other, a polarizing composer of the small optical element type produced using a dielectric multi-layer film or crystal or some other suitable element.

Accordingly, the optical delay element 38, the delay element 41 and the wave combiner 42 cooperatively construct depolarization means.

In the optical transmission apparatus for an optical communication system according to the second embodiment of the present invention having such construction as described above, depolarized signal light is transmitted in the following manner.

In particular, signal light outputted from the light source 35 is inputted to the polarizer 36, by which it is converted into linearly polarized light. The linearly polarized light is branched equally into two beams by the beam splitter 37 while maintaining its polarization condition.

One of the linearly polarized signal light beams branched from the beam splitter 37 is delayed by the optical delay element 38 and then modulated by the electric field absorbing modulator 40, and the thus modulated signal light is inputted to the wave combiner 42. Meanwhile, the other linearly polarized signal light beam is modulated by the electric field absorbing modulator 39 without being delayed, and the thus modulated signal light is inputted to the wave combiner 42.

It is to be noted that the two signal light beams inputted to the wave combiner 42 have a same data phase due to the presence of the delay element 41, and the wave combiner 42 couples the two signal light beams orthogonally to each other to produce depolarized light of a high degree of accuracy. The depolarized light is outputted from the wave combiner 42.

Consequently, similarly as in the first embodiment described hereinabove, the power of the depolarized signal light transmitted by way of the transmission line is equally divided into two orthogonally polarized light components, and the rate between the powers of the polarized light components does not vary with respect to time. Consequently, even if the transmission line has some polarization dependency, no power variation is exhibited with respect to time irrespective of a variation of the polarization condition. Further, since one of the two polarized light components passes the higher gain side without fail, otherwise possible deterioration of the signal power when polarized light is involved and the overall signal power depends upon a polarization component which passes the lower gain side can be avoided.

Since depolarized signal light can be transmitted to suppress the polarization dependency of a loss or a gain on the transmission line in this manner, there is an advantage in that otherwise possible deterioration of the signal to noise ratio can be eliminated. Incidentally, the polarization dependency on a transmission line or an optical amplification apparatus can be permitted to some degree, which allows enhancement of the productivity for optical amplification apparatus of like apparatus.

It is to be noted that, while the polarizer 36 is employed in the present embodiment in order to convert signal light from the light source 35 into linearly polarized light, the means for such conversion is not limited to the polarizer 36, and for example, a polarization control apparatus (polarization control means) constituted from the combination of a λ/4 (quarter-wave) plate and a λ/2 (half-wave) plate may be employed to transmit depolarized light of a high decree of accuracy, or where signal light outputted from the light source 35 is not elliptically polarized light or circularly polarized light but linearly polarized light, the polarizer 36 of such polarization control apparatus as described above need not be employed.

Further, while the electric field absorbing modulators 39 and 40 are used as external modulators in the present embodiment, the external modulators are not limited to the electric field absorbing modulators 39 and 49, and for example, a LiNbO (lithium niobate) modulator or some other modulator may be employed for the external modulators. This also applies to the following modifications to the present embodiment.

c1. Description of the First Modification to the Second Embodiment

Figure 15:
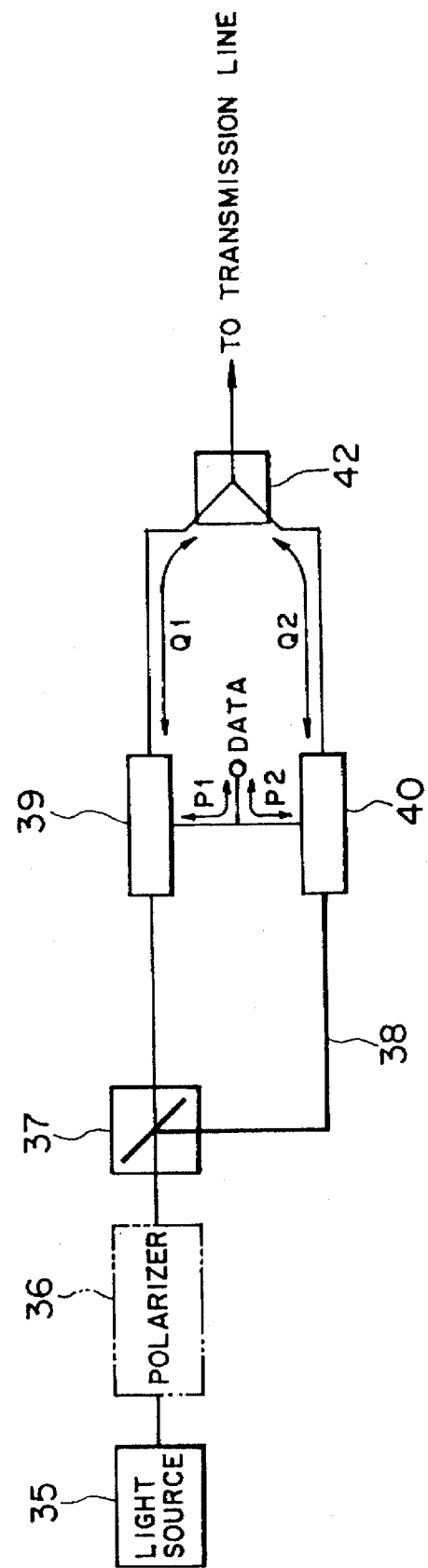
FIG. 15 is a block diagram showing a first modification to the optical transmission apparatus shown in FIG. 14.

FIG. 15 shows a first modification to the optical transmission apparatus for an optical communication system of the second embodiment of the present invention. Referring to FIG. 15, the modified optical transmission apparatus shown is different from the optical transmission apparatus of the second embodiment shown in FIG. 14 only in that a data signal to be inputted to the electric field absorbing modulator 40 is not delayed by the delay element 41 but the lengths P1 and P2 of routes of a data signal to the electric field absorbing modulators 39 and 40 are set equal to each other and the lengths Q1 and Q2 of routes from the electric field absorbing modulates 39 and 40 to the wave combiner 42 are also set equal to each other to adjust the data phases of two signal light beams to be inputted to the wave combiner 42 to a same data phase.

Accordingly, similarly as in the second embodiment described above, two signal light beams are inputted in a same data phase condition to the wave combiner 42, which couples the two signal light beams orthogonally to each other to produce and transmit depolarized signal light. Consequently, there is an advantage in that the polarization dependency of a loss or a gain on a transmission line can be suppressed and otherwise possible deterioration of the signal to noise ratio can be eliminated.

c2. Description of the Second Modification to the Second Embodiment

Figure 16:
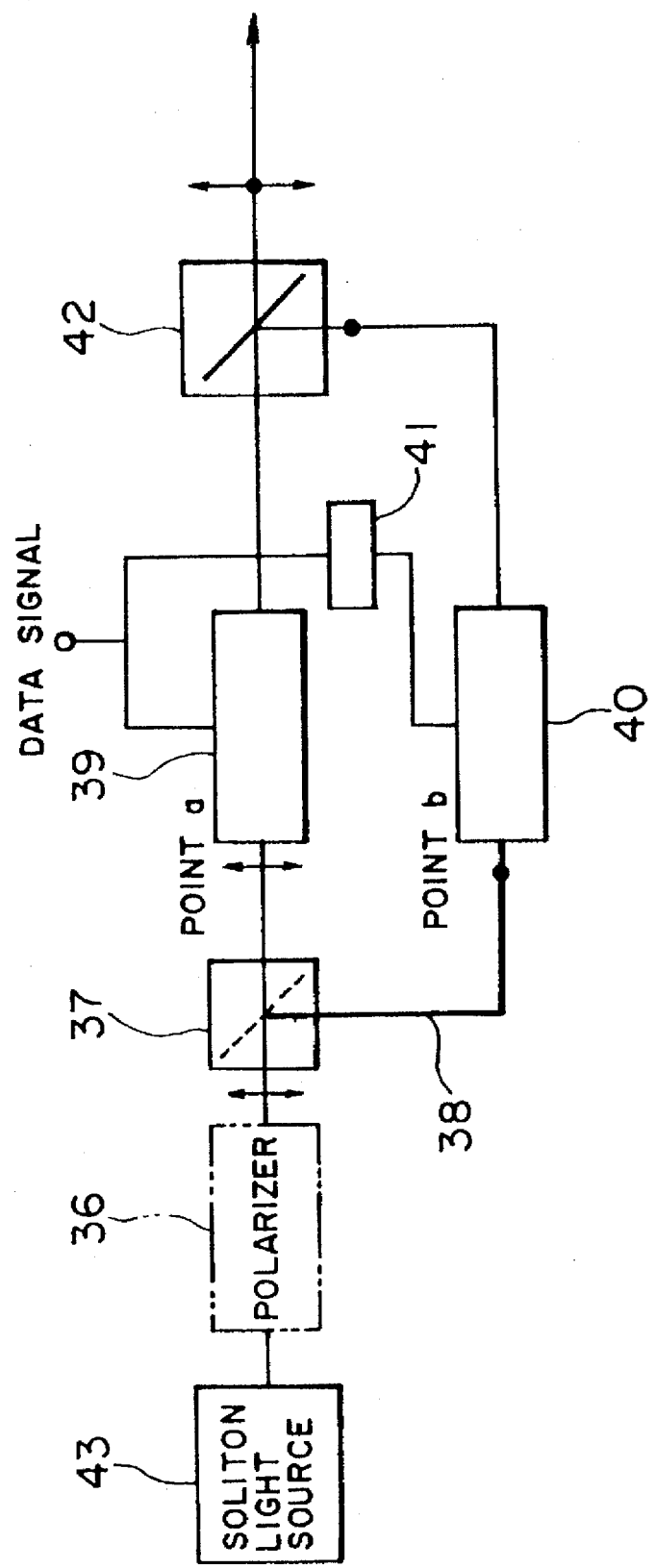
FIG. 16 is a block diagram showing a second modification to the optical transmission apparatus shown in FIG. 14.

FIG. 16 shows a second modification to the optical transmission apparatus for an optical communication system of the second embodiment of the present invention. Referring to FIG. 16, the modified optical transmission apparatus shown is different from the optical transmission apparatus of the second embodiment shown in FIG. 14 only in that it includes, in place of the light source 35 shown in FIG. 14, a solution light source 43 which outputs signal light of a pulse waveform and the lengths of two routes from the beam splitter 37 to the electric field absorbing modulators 39 and 40 are adjusted in such a manner as described below.

In particular, signal light of a pulse waveform outputted from the solution light source 43 is branched by the beam splitter 37 and inputted to the electric field absorbing modulators 39 and 40. Here, the lengths of the two routes from the beam splitter 37 to the electric field absorbing modulators 39 and 40 are adjusted so that the difference between the delay times by the routes may be equal to an integral number of times of a cycling time of solution pulses as seen from FIGS. 17(a) and 17(b).

Accordingly, similarly as in the second embodiment described above, since two signal light beams are inputted in a same data phase condition to the wave combiner 42, depolarized signal light is transmitted, and consequently, there is an advantage in that the polarization dependency of a loss or a gain on the transmission line can be suppressed and otherwise possible deterioration of the signal to noise ratio can be eliminated.

c3. Description of the Third Modification to the Second Embodiment

FIG. 18 shows a third modification to the optical transmission apparatus for an optical communication system of the second embodiment of the present invention. Referring to FIG. 18, the modified optical transmission apparatus shown is different from the optical transmission apparatus of the second embodiment shown in FIG. 14 only in that it includes, in place of the light source 35, the polarizer 36 and the beam splitter 37, a pair of light sources 35-1 and 35-2 having a similar function as the light source 35 in the second embodiment and arranged such that signal light from the light source 35-1 is inputted directly to the electric field absorbing modulator 39 while signal light from the light source 35-2 is inputted directly to the other electric field absorbing modulator 40.

In the modified optical transmission apparatus of the construction described above, the electric field absorbing modulator 39 receives a DATA signal to modulate signal light from the light source 35-1 while the electric field absorbing modulator 40 receives the DATA signal having been delayed by the delay section 41 to modulate signal light from the light source 35-2.

Then, the two signal light beams modulated by the electric field absorbing modulators 39 and 40 are inputted in a same data phase condition to the wave combiner 42.

Accordingly, similarly as in the second embodiment described above, since two signal light beams are inputted in a same data phase condition to the wave combiner 42, depolarized signal light is transmitted, and consequently, there is an advantage in that the polarization dependency of a loss or a gain on a transmission line can be suppressed and otherwise possible deterioration of the signal to noise ratio can be eliminated.

c4. Description of the Fourth Modification to the Second Embodiment

Figure 19:
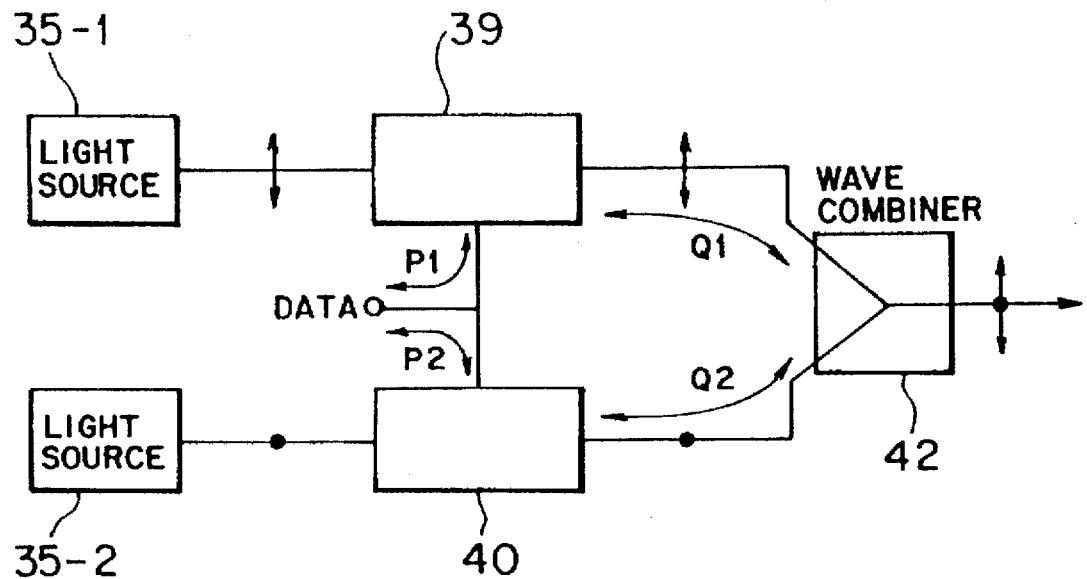
FIG. 19 is a block diagram showing a fourth modification to the optical transmission apparatus shown in FIG. 14.

FIG. 19 shows a fourth modification to the optical transmission apparatus for an optical communication system of the second embodiment of the present invention. Referring to FIG. 19, the modified optical transmission apparatus shown is different from the optical transmission apparatus of the second embodiment shown in FIG. 14 only in that it includes, in place of the light source 35, the polarizer 36, the beam splitter 37 and the delay section 41, a pair of light sources 35-1 and 35-2 having a similar function as the light source 35 in the second embodiment and arranged such that the lengths P1 and P2 of routes of a data signal to the electric field absorbing modulators 39 and 40 are set equal to each other and the lengths Q1 and Q2 of routes from the electric field absorbing modulates 39 and 40 to the wave combiner 42 are also set equal to each other.

In the modified optical transmission apparatus of the construction described above, the electric field absorbing modulator 39 receives a DATA signal to modulate signal light from the light source 35-1 while the electric field absorbing modulator 40 receives the DATA signal having been delayed by the delay section 41 to modulate signal light from the light source 35-2.

Then, the two signal light beams modulated by the electric field absorbing modulators 39 and 40 are inputted in a same data phase condition to the wave combiner 42.

Accordingly, similarly as in the second embodiment described above, since two signal light beams are inputted in a same data phase condition to the wave combiner 42, depolarized signal light is transmitted, and consequently, there is an advantage in that the polarization dependency of a loss or a gain on a transmission line can be suppressed and otherwise possible deterioration of the signal to noise ratio can be eliminated.

d. Description of the Third Embodiment

Figure 20:
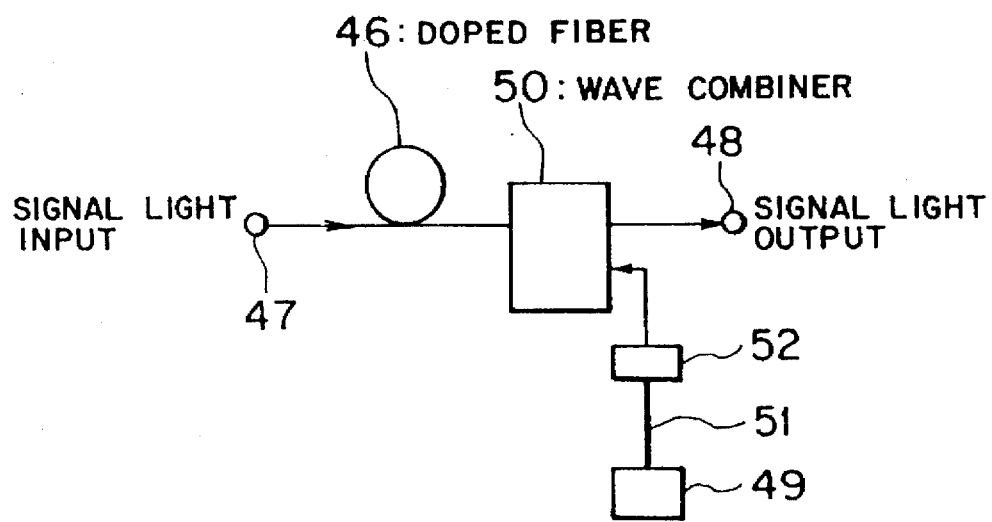
FIG. 20 is a block diagram of an optical amplification apparatus for an optical communication system showing a third preferred embodiment of the present invention.

Referring now to FIG. 20, there is shown an optical amplification apparatus for an optical communication system according to a third preferred embodiment of the present invention. The present optical amplification apparatus for an optical communication system is applied to such a repeater 17 in an optical communication system as described hereinabove with reference to FIG. 8.

The optical amplification apparatus shown includes an optical fiber 46 in the form of a doped fiber doped with, for example, erbium. The doped fiber 46 inputs excitation light and can amplify the input signal light in accordance with the length of the doped fiber 46 itself. Employment of the doped fiber 46 thus simplifies designing of the apparatus.

The optical amplification apparatus further includes an input port 47 for inputting signal light into the doped fiber 46, an output port 48 for outputting signal light amplified by the doped fiber 46, and an excitation light source 49 for outputting excitation light. Preferably, the excitation light source 49 is a Fabry-Perot laser which is simple in construction and is easy to check or maintain.

The optical amplification apparatus further includes a polarization holding fiber 51, which outputs excitation light from the excitation light source 49 to a depolarization section 52 while maintaining the polarization condition of the same so as to define the polarization condition of the excitation light.

The depolarization section 52 serves as depolarization means and converts excitation light into depolarized light with such a simple construction that it is constituted from a splitter not shown, a birefringent optical material serving as delay time difference providing means and a wave combiner, similarly to the depolarizer 23 (refer to FIG. 7) in the first embodiment described hereinabove.

Here, while excitation light from the polarization holding fiber 51 is inputted to the splitter of the depolarization section 52, an angular displacement of 45 degrees is set between a main axis of the polarization holding fiber 51 and another main axis of the portion (splitter) of the depolarization section 52 to which the excitation light is inputted so that depolarized light may be outputted effectively.

The optical amplification apparatus further includes a wave combiner 50, which inputs excitation signal from the depolarization section 52 to the doped fiber 46.

The optical amplification apparatus for an optical communication system according to the third embodiment of the present invention having the construction described above operates in the following manner.

in particular, signal light is inputted by way of the input port 47 to the doped fiber 46 doped with erbium. Meanwhile, excitation light is outputted from the excitation light source 49 and inputted to the depolarization section 52 by way of the polarization holding fiber 51 while maintaining its polarization condition. The excitation light is converted into depolarized light by the depolarization section 52 and then inputted to the doped. fiber 46 by way of the wave combiner 50.

Consequently, the signal light inputted to the doped fiber 46 is amplified by the same and then outputted from the same by way of the output port 48.

In this manner, with the optical amplification apparatus for an optical communication system according to the third embodiment of the present invention, stabilized excitation light can be supplied to the doped fiber 46 by means of the excitation light source 49, the polarization holding fiber 51 and the depolarization section 52, and consequently, there is an advantage in that otherwise possible deterioration of the signal to noise ratio of signal light can be suppressed.

It is to be noted that, while the depolarization section 52 in the present embodiment is constituted from a splitter, a birefringent optical material as delay time difference providing means and a wave combiner, the construction of the depolarization section 52 is not limited to the specific one, and the depolarization section 52 may otherwise be constituted only from a birefringent optical material. This similarly applies to the following modifications to the present embodiment.

d1. Description of the First Modification to the Third Embodiment

Figure 21:
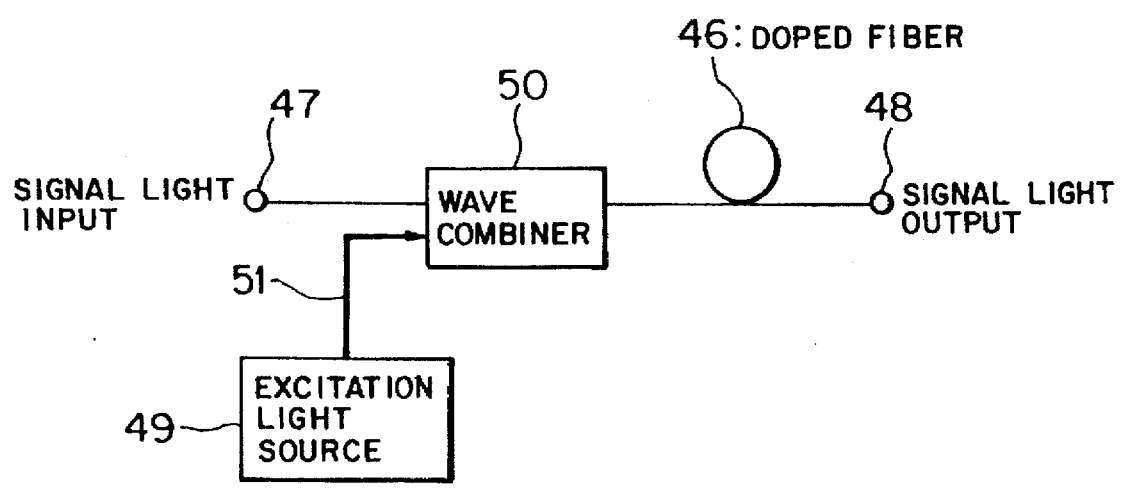
FIG. 21 is a block diagram showing a first modification to the optical amplification apparatus shown in FIG. 20.

FIG. 21 shows a first modification to the optical amplification apparatus for an optical communication system of the third embodiment of the present invention. Referring to FIG. 21, the modified optical amplification apparatus shown is different from the optical amplification apparatus of the third embodiment shown in FIG. 20 only in that, while the optical amplification apparatus of the third embodiment has a forward excitation construction wherein excitation light is inputted to the doped fiber 46 from the front, the modified optical amplification apparatus has a rearward excitation construction wherein excitation light is inputted to the doped fiber 46 from the rear.

Accordingly, also the optical amplification apparatus for an optical communication system shown in FIG. 21 presents similar advantages to those of the third embodiment described above.

d2. Description of the Second Modification to the Third Embodiment

Figure 22:
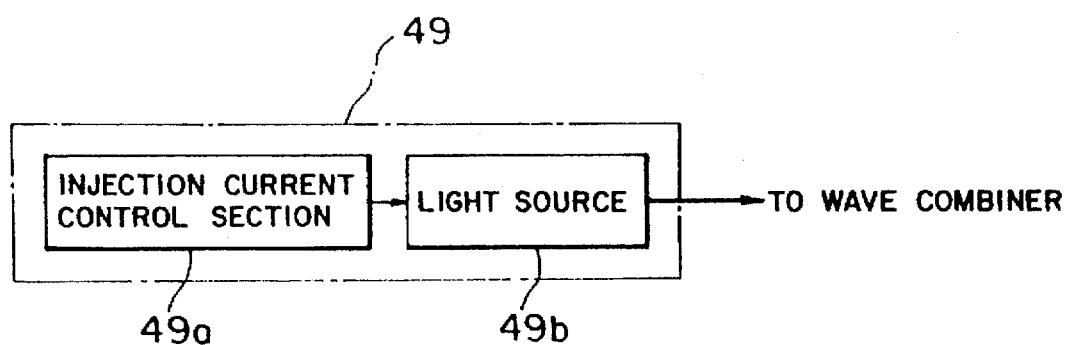
FIG. 22 is a block diagram showing a second modification to the optical amplification apparatus shown in FIG. 20.

FIG. 22 shows a second modification to the optical amplification apparatus for an optical communication system of the third embodiment of the present invention. Referring to FIG. 22, the modified optical amplification apparatus shown is different from the optical amplification apparatus of the third embodiment shown in FIG. 20 only in that the excitation light source 49 includes an injection current control section 49a and a light source 49b.

In particular, the injection current is varied under the control of the injection current control section 49a (automatic power control; APC control) so that excitation light outputted from the light source 49b may be varied with a frequency higher than 1 kHz.

Accordingly, the variation of the optical output of excitation light from the excitation light source 49 by a temperature variation of a like parameter can be compensated for, and an excessive loss of the wave combiner 50 can be suppressed. Consequently, the advantages achieved by the optical amplification apparatus of the third embodiment can be achieved. Further, since stabilized excitation light can be outputted, there is an additional advantage in that the signal to noise ratio can be further improved.

d3. Description of the Third Modification to the Third Embodiment

Figure 23:
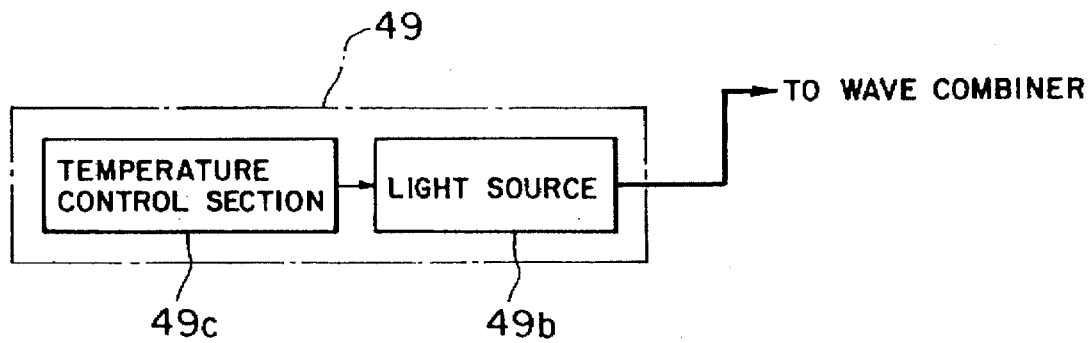
FIG. 23 is a block diagram showing a third modification to the optical amplification apparatus shown in FIG. 20.

FIG. 23 shows a third modification to the optical amplification apparatus for an optical communication system of the third embodiment of the present invention. Referring to FIG. 23, the modified optical amplification apparatus shown is different from the optical amplification apparatus of the third embodiment shown in FIG. 20 only in that the excitation light source 49 includes a temperature control section 49c and a light source 49b.

In particular, the temperature around the excitation light source 49 is varied under the control of the temperature control section 49c so that excitation light outputted from the light source 49b may be varied with a frequency higher than 1 kHz.

Accordingly, stabilized excitation light can be outputted from the excitation light source 49 and an excessive loss of the wave combiner 50 can be suppressed. Consequently, the advantages achieved by the optical amplification apparatus of the third embodiment can be achieved. In addition, there is an advantage in that the signal to noise ratio can be further improved.

e. Description of the Fourth Embodiment

Figure 24:
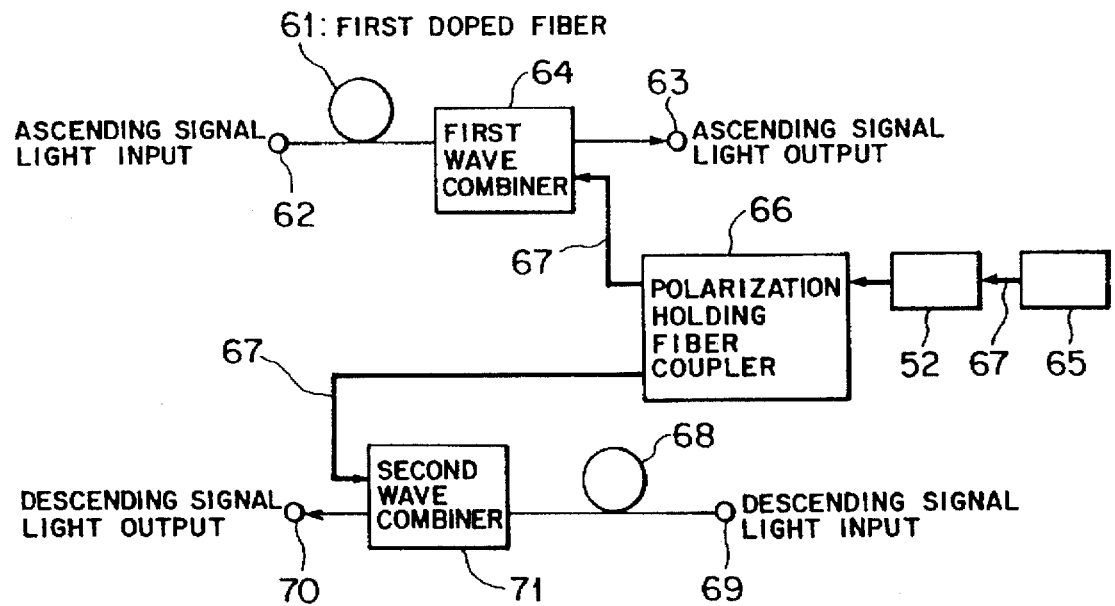
FIG. 24 is a block diagram of another optical amplification apparatus for an optical communication system showing a fourth preferred embodiment of the present invention.

Referring now to FIG. 24, there is shown an optical amplification apparatus for an optical communication system according to a fourth preferred embodiment of the present invention. Also the present optical amplification apparatus for an optical communication system is applied to such a repeater 17 in an optical communication system as described hereinabove with reference to FIG. 8, similarly to the optical amplification apparatus for an optical communication system of the third embodiment described hereinabove with reference to FIG. 20.

The optical amplification apparatus shown includes a first doped fiber 61 and a second doped fiber 68 which both are optical fibers doped with, for example, erbium similarly to the doped fiber 46 in the third embodiment.

Signal light for an ascending line is inputted to the first doped fiber 61 by way of a first input port 62, and the first doped fiber 61 can amplify the signal light in accordance with the length of the first doped fiber 61 itself. Similarly, signal light for a descending line is inputted to the second doped fiber 68 by way of a second input port 69, and the first doped fiber 61 can amplify the signal light in accordance with the length of the second doped fiber 68 itself.

The optical amplification apparatus further includes a first wave combiner 64 for inputting excitation light to the first doped fiber 61, a first output port 63 for outputting signal light amplified by the first doped fiber 61, an excitation light source 65 for supplying excitation light to the first doped fiber 61 and the second doped fiber 68, a second wave combiner 71 for inputting excitation light to the second doped fiber 68, and a second output port 70 for outputting signal light amplified by the second doped fiber 68.

The optical amplification apparatus further includes a polarization holding fiber coupler 66 serving as excitation light distribution means. The polarization holding fiber coupler 66 is interposed in a polarization holding fiber 67 between the excitation light source 65 and the first and second wave combiners 64 and 71 and outputs excitation light from the excitation light source 65 simultaneously to the first and second doped fibers 61 and 68 while maintaining the polarization condition of the same thereby to define the polarization condition of the excitation light. The polarization holding fiber coupler 66 is constituted from a directional coupler.

The optical amplification apparatus further includes a depolarization section 52 similar to the depolarization section 52 in the third embodiment described above and serving as depolarization means. The depolarization section 52 is interposed between the excitation light source 65 and the polarization holding fiber coupler 66 and is constituted from a splitter, a birefringent optical material serving as delay time difference providing means and a wave combiner to depolarize excitation light, similarly to the depolarizer 23 shown in FIG. 7.

Here, while excitation light from the polarization holding fiber 67 is inputted to the splitter of the depolarization section 52, an angular displacement of 45 degrees is set between a main axis of the polarization holding fiber 67 and another main axis of the portion (splitter) of the depolarization section 52 to which the excitation light is inputted so that depolarized light may be outputted effectively.

The optical amplification apparatus for an optical communication system according to the fourth embodiment of the present invention having the construction described above operates in the following manner.

In particular, signal light of an ascending line is inputted by way of the first input port 62 to the first doped fiber 61. Meanwhile, excitation light is outputted from the excitation light source 65 and inputted to the depolarization section 52 by way of the polarization holding fiber 67 while maintaining its polarization condition. The excitation light is converted into depolarized light by the depolarization section 52, and the depolarized light is branched by the polarization holding fiber coupler 66 and inputted to the first doped fiber 61 by way of the first wave combiner 64. Consequently, the signal light amplified by the first doped fiber 61 is outputted by way of the first output port 63.

On the other hand, signal light of a descending line is inputted by way of the second input port 69 to the second doped fiber 68. Meanwhile, the excitation light branched by the polarization holding fiber coupler 66 is inputted to the second doped fiber 68 by way of the second wave combiner 71. Consequently, the signal light amplified by the second doped fiber 68 is outputted by way of the second output port 70.

In this manner, with the optical amplification apparatus for an optical communication system according to the fourth embodiment of the present invention, excitation light can be outputted in a stabilized condition with a comparatively little variation of the optical output by means of the excitation light source 65, the polarization holding fiber coupler 66, the polarization holding fiber 67 and the depolarization section 52, and consequently, there is an advantage in that otherwise possible deterioration of the signal to noise ratio of signal light can be suppressed.

It is to be noted that, while the polarization holding fiber coupler 66 in the present embodiment is constituted from a directional coupler, since the variation of the branching ratio of excitation light can be compensated for even where the polarization holding fiber coupler 66 is constituted from a 3 dB coupler, the advantages described above can be achieved. Such 3 dB coupler may be applied to various modifications described below.

Further, while the depolarization section 52 in the present embodiment is constituted from a splitter, a birefringent optical material as delay time difference providing means and a wave combiner, the construction of the depolarization section 52 is not limited to the specific one, and the depolarization section 52 may otherwise be constituted only from a birefringent optical material. This similarly applies to the following modifications to the present embodiment.

e1. Description of the First Modification to the Fourth Embodiment

Figure 25:
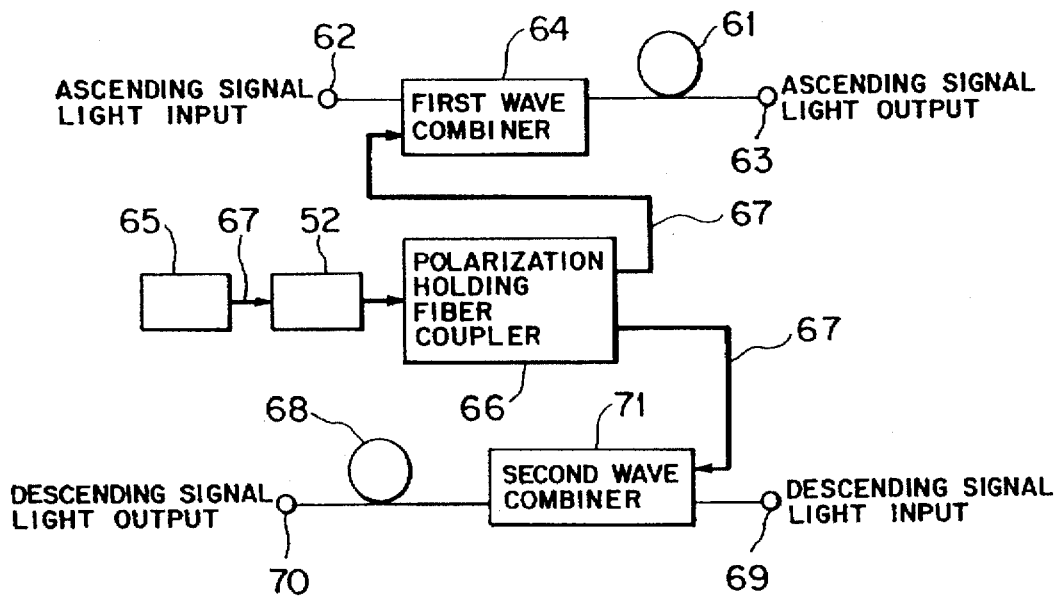
FIG. 25 is a block diagram showing a first modification to the optical amplification apparatus shown in FIG. 24.

FIG. 25 shows a first modification to the optical amplification apparatus for an optical communication system of the fourth embodiment of the present invention. Referring to FIG. 25, the modified optical amplification apparatus shown is different from the optical amplification apparatus of the fourth embodiment shown in FIG. 24 only in that, while the optical amplification apparatus of the fourth embodiment has a forward excitation construction wherein excitation light is inputted to the first and second doped fibers 61 and 68 from the front, the modified optical amplification apparatus has a rearward excitation construction wherein excitation light is inputted to the first and second doped fibers 61 and 68 from the rear.

Accordingly, also the optical amplification apparatus for an optical communication system shown in FIG. 25 presents similar advantages to those of the fourth embodiment described above.

e2. Description of the Second Modification to the Fourth Embodiment

Figure 26:
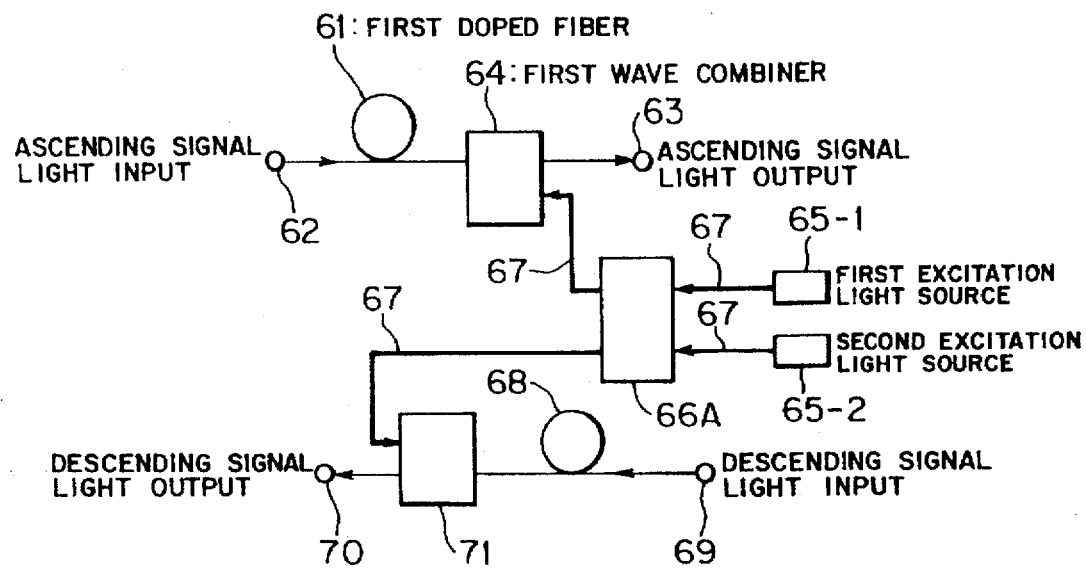
FIG. 26 is a block diagram showing a second modification to the optical amplification apparatus shown in FIG. 24.

FIG. 26 shows a second modification to the optical amplification apparatus for an optical communication system of the fourth embodiment of the present invention. Referring to FIG. 26, the modified optical amplification apparatus shown is different from the optical amplification apparatus of the fourth embodiment shown in FIG. 24 only in that it includes, in place of the excitation light source 65 and the depolarization section 52, a first excitation light source 65-1 and a second excitation light source 65-2 and includes, in place of the polarization holding fiber coupler 66, a 2-input 2-output polarization holding fiber coupler 66A.

In particular, the first and second excitation light sources 65-1 and 65-2 simultaneously output excitation light. However, when their oscillation wavelengths are to be varied, a different frequency or frequencies are supplied to one or both of the first and second excitation light sources 65-1 and 65-2 to vary polarization of excitation light from them. Further, the first and second excitation light sources 65-1 and 65-2 are set so that the sum of the light powers outputted from them may be lower than a maximum excitation light power which can be outputted from one of them when the other of them is broken. In other words, when, for example, the excitation light source 65-1 is broken. the other excitation light source 65-2 is prevented from being broken.

Figure 27:
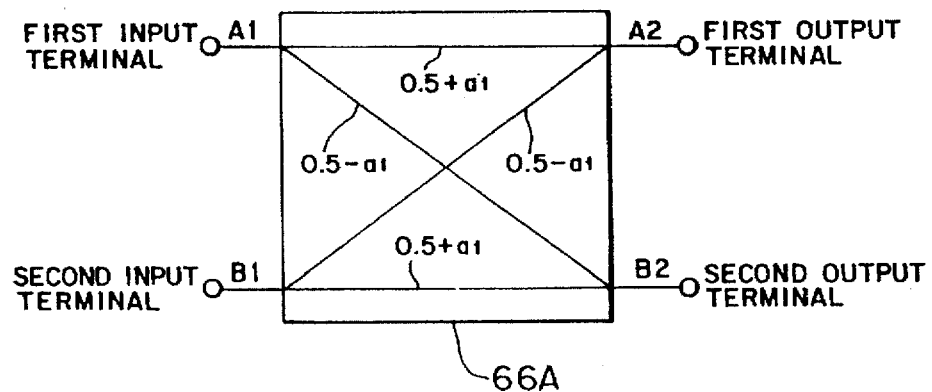
FIG. 27 is a diagrammatic view illustrating the branching ratio of a polarization holding fiber coupler.

The polarization holding fiber coupler 66A has such a construction as shown in FIG. 27. Referring to FIG. 27. where the light power ratio R11 of light branched from a first input terminal A1 and inputted to a fist output terminal A2 is $0.5+a_1$, the light power ratio $R_{12}$ of light branched from the first input terminal A1 and inputted to a second output terminal B2 is $0.5-a_1$ from the energy conservation law. Similarly. where the light power ratio $R_{21}$ of light branched from a second input terminal B1 and inputted to a second output terminal B2 is $0.5+a_1$, the light power ratio $R_{22}$ of light branched from the second input terminal B1 and inputted to the first output terminal A2 is $0.5-a_1$.

Here, $a_1$ denotes a branching ratio variation, and where the polarization holding fiber 67 is constituted from a 3 dB coupler, $a_1=0$.

Accordingly, also the optical amplification apparatus for an optical communication system shown in FIG. 25 presents similar advantages to those of the fourth embodiment described above due to the provision of the first and second excitation light sources 65-1 and 65-2, the polarization holding fiber coupler 66A and the polarization holding fiber 67, and since the oscillation wavelength of excitation light can be varied, an excessive loss of the wave combiner can be suppressed. Consequently, there is an additional advantage in that deterioration of the signal to noise ratio of signal light can be further suppressed.

e3. Description of the Third Modification to the Fourth Embodiment

Figure 28:
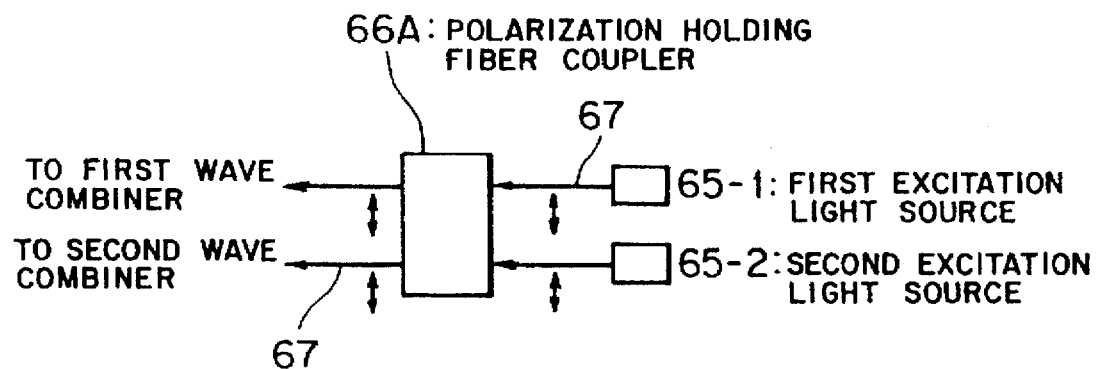
FIG. 28 is a block diagram showing a third modification to the optical amplification apparatus shown in FIG. 24.

FIG. 28 shows a third modification to the optical amplification apparatus for an optical communication system of the fourth embodiment of the present invention. Referring to FIG. 28, the modified optical amplification apparatus shown is a modification to but different from the optical amplification apparatus of the second modification shown in FIG. 26 only in that either one of two main axes of the polarization holding fiber coupler 66A coincides with a main axis of polarized light of output light of the first and second excitation light sources 65-1 and 65-2 inputted to the polarization holding fiber coupler 66A.

In particular, referring to FIG. 28, the two main axes of the polarization holding fiber coupler 66A are directed in a vertical direction, and also the main axis of polarized light beams of output light of the first and second excitation light sources 65-1 and 65-2 are directed in a vertical direction.

Accordingly, also with the optical amplification apparatus for an optical communication system in the present modification, excitation light can be outputted in a stabilized condition, and since the variation of the branching ratio by a coupler can be suppressed, there is an advantage that otherwise possible deterioration of the signal to noise ratio of signal light can be suppressed.

e4. Description of the Fourth Modification to the Fourth Embodiment

Figure 29:
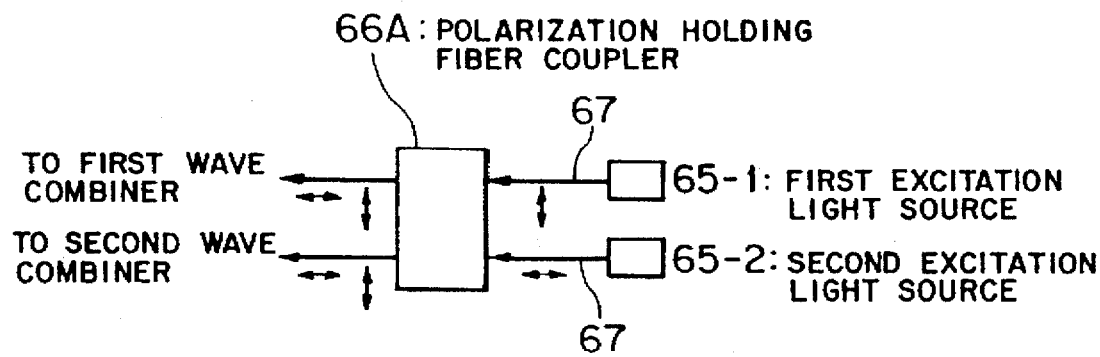
FIG. 29 is a block diagram showing a fourth modification to the optical amplification apparatus shown in FIG. 24.

FIG. 29 shows a fourth modification to the optical amplification apparatus for an optical communication system of the fourth embodiment of the present invention. Referring to FIG. 29, the modified optical amplification apparatus shown is a modification to but different from the optical amplification apparatus of the second modification shown in FIG. 26 only in that one of the two main axes of the polarization holding fiber coupler 66A coincides with the main axis of polarized light of output light of the first excitation light source 65-1 inputted to the polarization holding fiber coupler 66A while the other main axis of the polarization holding fiber coupler 66A coincides with the main axis of polarized light of output light of the second excitation light source 65-2 inputted to the polarization holding fiber coupler 66A.

In particular, referring to FIG. 29. where the main axis of output light of the first excitation light source 65-1 is directed in the vertical direction and the main axis of output light of the second excitation light source 65-2 is directed in a horizontal direction, the two main axes of the polarization holding fiber coupler 66A may both be directed in a vertical direction or in a horizontal direction.

Accordingly. also with the optical amplification apparatus for an optical communication system in the present modification, excitation light can be outputted in a stabilized condition, and since the variation of the branching ratio by a coupler can be suppressed, there is an advantage that otherwise possible deterioration of the signal to noise ratio of signal light can be suppressed.

e5. Description of the Fifth Modification to the Fourth Embodiment

Figure 30:
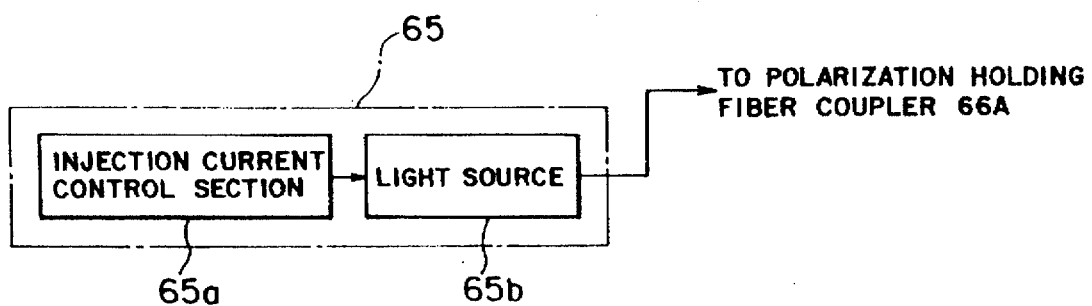
FIG. 30 is a block diagram showing a fifth modification to the optical amplification apparatus shown in FIG. 24.

FIG. 30 shows a fifth modification to the optical amplification apparatus for an optical communication system of the fourth embodiment of the present invention. Referring to FIG. 30, the modified optical amplification apparatus shown is different from the optical amplification apparatus of the fourth embodiment shown in FIG. 24 only in that the excitation light source 65 includes an injection current control section 65a and a light source 65b.

In particular, the injection current is varied under the control of the injection current control section 65a so that excitation light outputted from the light source 65b may be varied with a frequency higher than 1 kHz.

Accordingly, the variation of the optical output of excitation light from the excitation light source by a temperature variation or a like parameter can be compensated for, and excessive losses of the first and second wave combiners 64 and 71 can be suppressed. Consequently, such advantages as are achieved by the fourth embodiment are achieved, and besides, since stabilized excitation light can be outputted, there is an additional advantage that enhancement of the signal to noise ratio can be further promoted.

e6. Description of the Sixth Modification to the Fourth Embodiment

Figure 31:
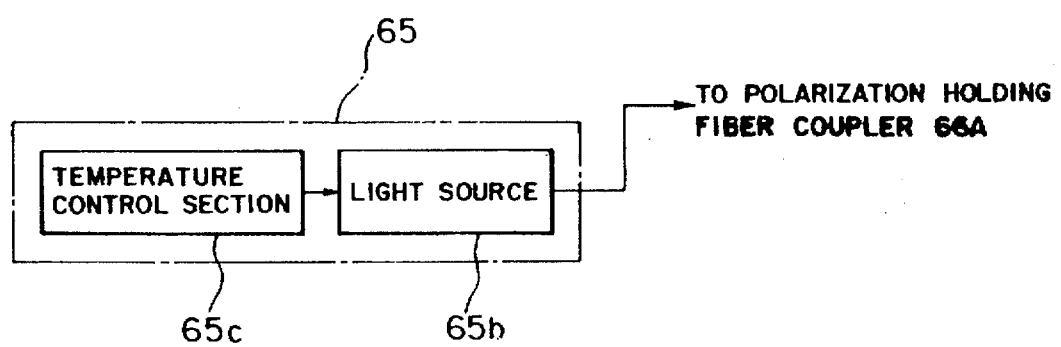
FIG. 31 is a block diagram showing a sixth modification to the optical amplification apparatus shown in FIG. 24.

FIG. 31 shows a sixth modification to the optical amplification apparatus for an optical communication system of the fourth embodiment of the present invention. Referring to FIG. 31, the modified optical amplification apparatus shown is different from the optical amplification apparatus of the fourth embodiment shown in FIG. 24 only in that the excitation light source 65 includes a temperature control section 65c and a light source 65b.

In particular, the temperature around the excitation light source 65 is varied under the control of the temperature control section 65c so that excitation light outputted from the light source 65b may be varied with a frequency higher than 1 kHz.

Accordingly, the variation of the optical output of excitation light from the excitation light source by a temperature variation or a like parameter can be compensated for, and excessive losses of the first and second wave combiners 64 and 71 can be suppressed. Consequently, such advantages as are achieved by the fourth embodiment are achieved, and besides, since stabilized excitation light can be outputted, there is an additional advantage that enhancement of the signal to noise ratio can be further promoted.

f. Description of the Fifth Embodiment

Figure 32:
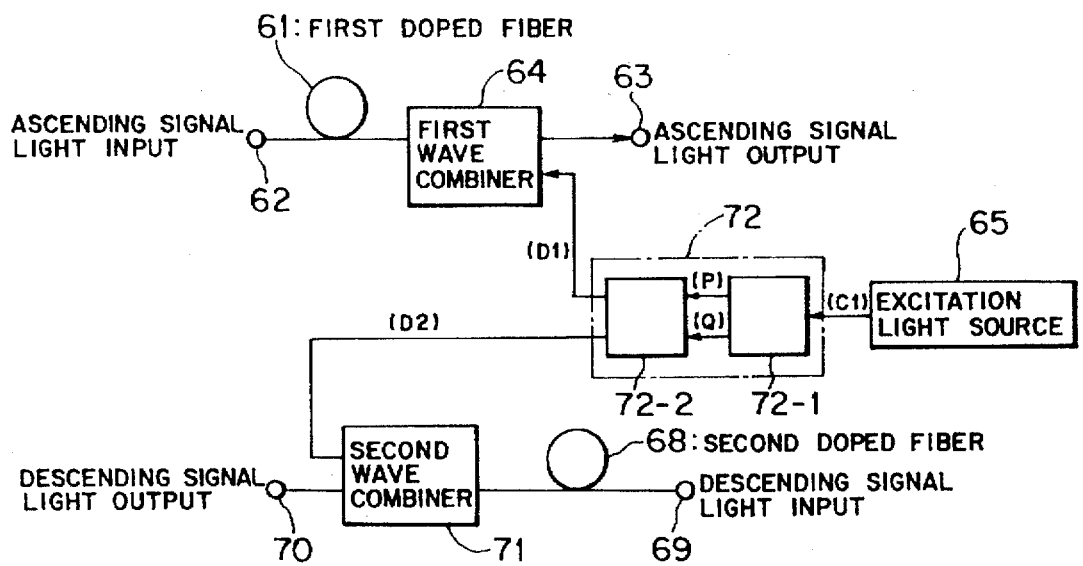
FIG. 32 is a block diagram of a further optical amplification apparatus for an optical communication system showing a fifth preferred embodiment of the present invention.

Referring now to FIG. 32, there is shown an optical amplification apparatus for an optical communication system according to a fifth preferred embodiment of the present invention. Also the present optical amplification apparatus for an optical communication system is applied to such a repeater 17 in an optical communication system as described hereinabove with reference to FIG. 8.

The optical amplification apparatus shown is a modification to and but different from the optical amplification apparatus for an optical communication system of the fourth embodiment described hereinabove with reference to FIG. 24 in that it includes, in place of the depolarization section 52 and the polarization holding fiber coupler 66, an optical coupler (excitation light distribution means) 72 which is not constituted from a polarization holding fiber coupler but constituted from a first coupler 72-1 and a second coupler 72-2 connected in series at two stages. Here, however, the first and couplers 72-1 and 72-2 are formed from directional couplers similarly to the polarization holding fiber coupler 66.

Two output terminals of the first coupler 72-1 are connected to two input terminals of the second coupler 72-2 while two output terminals of the second coupler 72-2 are individually connected to the first and second wave combiners 64 and 71.

In particular, the optical coupler 72 is interposed between the excitation light source 65 and the first and second wave combiners 64 and 71 and includes a series circuit of two stages of the first and second couplers 72-1 and 72-2 with the two output terminals of the first coupler 72-1 connected to the two input terminals of the second coupler 72-2. The second coupler 72-2 has a two-input two-output construction similarly to the polarization holding fiber coupler 66A in the second modification to the fourth embodiment described hereinabove.

By the way, similarly to the polarization holding fiber coupler 66A described in the second modification to the fourth embodiment, where the branching ratio variations at the first and second couplers 72-1 and 72-2 are represented by $a_1$ and $a_2$, respectively, the light power ratio of light branched from a first input terminal C1 to a point P is $0.5+a_1$, and the light power ratio of light branched from the first input terminal C1 to another point Q is $0.5-a_1$. Similarly, the light power ratios of light branched from the point P to first and second output terminals D1 and D2 are $0.5+a_2$ and $0.5-a_2$, respectively, and the light power ratios of light branched from the point Q to the first and second input terminals D1 and D2 are $0.5-a_2$ and $0.5+a_2$, respectively.

Accordingly, the light power ratio $R_{11}$ of light branched from the first input terminal C1 to the first output terminal D1 is given by the following equation:

$$
\begin{aligned}
R_{11} &= \text{(route passing the point } P\text{)} + \\
&\quad \text{(route passing the point } Q\text{)} \\
&= (0.5+a_1)(0.5+a_2) + \\
&\quad (0.5-a_1)(0.5-a_2) \\
&= 0.5 + 2a_1 a_2
\end{aligned} \quad (1)
$$

Similarly, the light power ratio $R_{12}$ of light branched from the first input terminal C1 to the second output terminal D2 is given by the following equation:

$$
\begin{aligned}
R_{12} &= \text{(route passing the point } P\text{)} + \\
&\quad \text{(route passing the point } Q\text{)} \\
&= (0.5+a_1)(0.5-a_2) + \\
&\quad (0.5-a_1)(0.5+a_2) \\
&= 0.5 - 2a_1 a_2
\end{aligned} \quad (2)
$$

Meanwhile, the first and second doped fibers 61 and 68 doped with erbium, the first and second input ports 62 and 69, the first and second output ports 63 and 70, the first and second wave combiners 64 and 71, and the excitation light source 65 have similar functions to those of the optical amplification apparatus for an optical communication system of the fourth embodiment described hereinabove.

In the optical amplification apparatus for an optical communication system of the fifth embodiment of the present invention having the construction described above, when excitation light is outputted from the excitation light source 65, the excitation light is supplied at the branching ratio of the optical power ratio $R_{11}=0.5+2a_1 a_2$ to the first doped fiber 61 while the excitation light is supplied at the branching ratio of the optical power ratio $R_{12}=0.5-2a_1 a_2$ to the second doped fiber 68. Similarly as in the fourth embodiment, the light signal for the ascending line and the light signal for the descending line are amplified by and outputted from the first and second doped fibers 61 and 68, respectively.

Here, if it is assumed that the first and second couplers 72-1 and 72-2 have the branching ratio variation of, for example, 50±5% due to the temperature dependency and the polarization dependency of the branching ratios, then, $|a_1|\leq 0.05$ and $|a_2|\leq 0.05$. Accordingly, the branching ratios of the optical coupler 72 having the two-stage construction are given, from the equations (1) and (2), by the following equations:

$$0.495 \leq R_{11}=0.5+2a_1 a_2 \leq 0.505$$

$$0.495 \leq R_{12}=0.5-2a_1 a_2 \leq 0.505 \quad (3)$$

Consequently, by employing a two-stage construction for an optical coupler using two optical couplers having the branching ratio variation of ±5%, the branching ratio is suppressed to one tenth, that is, to ±0.5%.

In this manner, with the optical amplification apparatus for an optical communication system of the fifth embodiment of the present invention. since the optical coupler 72 has a two-stage construction wherein the first and second couplers 72-1 and 72-2 are connected in series at two stages, the branching ratio variation of the optical coupler can be suppressed, and consequently, there is an advantage in that otherwise possible deterioration of the signal to noise ratio of signal light can be suppressed.

It is to be noted that, while the optical coupler 72 in the present embodiment is constituted from a directional coupler, the optical coupler 72 is not limited to such specific one and may otherwise be constituted from, for example, a 3 dB coupler. This may similarly apply to various modifications described below.

f1. Description of the First Modification to the Fifth Embodiment

Figure 33:
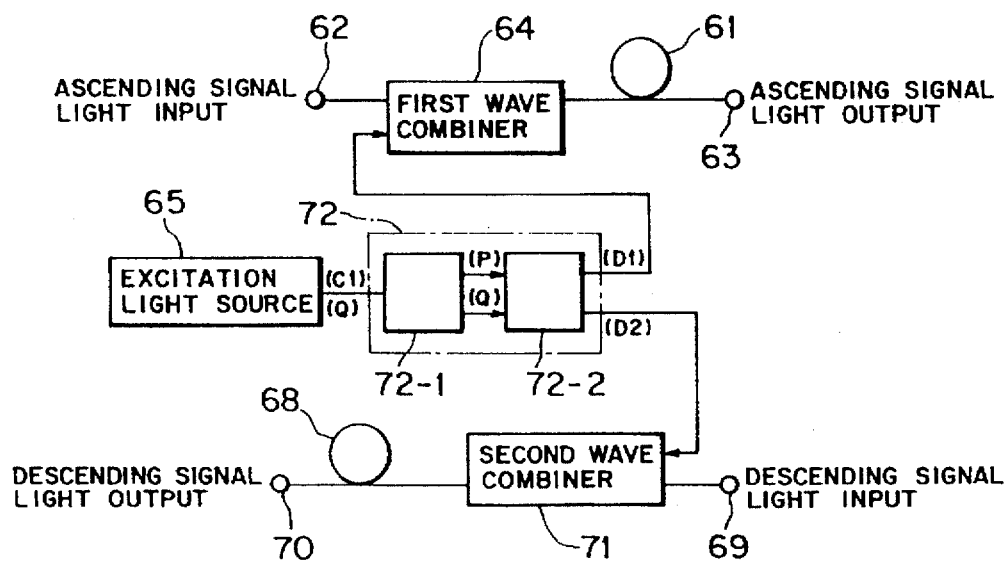
FIG. 33 is a block diagram showing a first modification to the optical amplification apparatus shown in FIG. 32.

FIG. 33 shows a first modification to the optical amplification apparatus for an optical communication system of the fifth embodiment of the present invention. Referring to FIG. 33, the modified optical amplification apparatus shown is different from the optical amplification apparatus of the fifth embodiment shown in FIG. 32 only in that, while the optical amplification apparatus of the fifth embodiment has a forward excitation construction wherein excitation light is inputted to the first and second doped fibers 61 and 68 from the front, the modified optical amplification apparatus has a rearward excitation construction wherein excitation light is inputted to the first and second doped fibers 61 and 68 from the rear.

Accordingly, also the optical amplification apparatus for an optical communication system shown in FIG. 33 presents similar advantages to those of the fifth embodiment described above.

f2. Description of the Second Modification to the Fifth Embodiment

Figure 34:
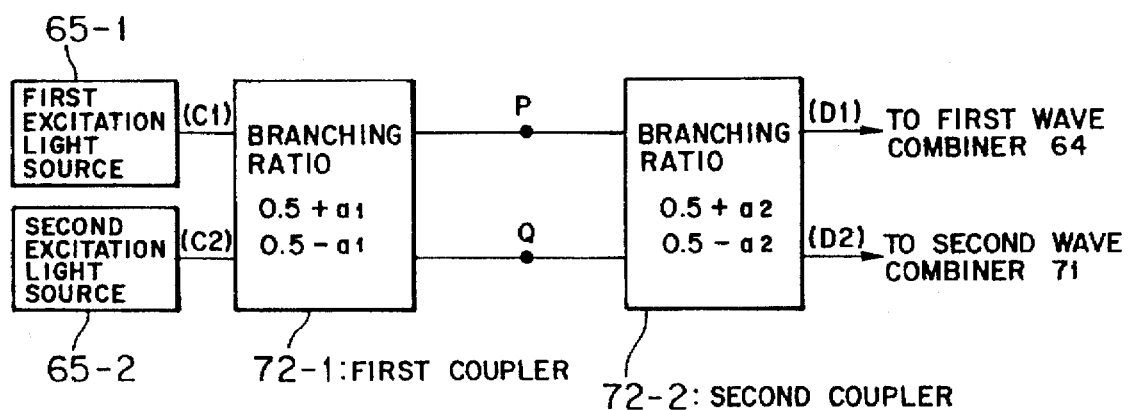
FIG. 34 is a block diagram showing a second modification to the optical amplification apparatus shown in FIG. 32.

FIG. 34 shows a second modification to the optical amplification apparatus for an optical communication system of the fifth embodiment of the present invention. Referring to FIG. 34, the modified optical amplification apparatus shown is different from the optical amplification apparatus of the fifth embodiment shown in FIG. 32 only in that it includes, in place of the excitation light source 65, a first excitation light source 65-1 and a second excitation light source 65-2 and the optical coupler 72 is constituted from first and second couples 72-1 and 72-2 of the 2-input 2-output type connected in series at two stages.

Here, the first and second excitation light sources 65-1 and 65-2 simultaneously output excitation light. However, when their oscillation wavelengths are to be varied, a different frequency or frequencies are supplied to one or both the first and second excitation light sources 65-1 and 65-2 to vary polarization of excitation light from them. Further, the first and second excitation light sources 65-1 and 65-2 are set so that the sum of the light powers outputted from them may be lower than a maximum excitation light power which can be outputted from one of them when the other of them is broken.

Accordingly, also the optical amplification apparatus for an optical communication system shown in FIG. 34 presents similar advantages to those of the fifth embodiment described above due to the provision of the first and second excitation light sources 65-1 and 65-2 and the first and second couplers 72-1 and 72-2, and since the oscillation wavelengths of excitation light can be varied, excessive losses of the wave combiners can be suppressed. Consequently, there is an additional advantage in that deterioration of the signal to noise ratio of signal light can be suppressed further.

f3. Description of the Third Modification to the Fifth Embodiment

Figure 35:
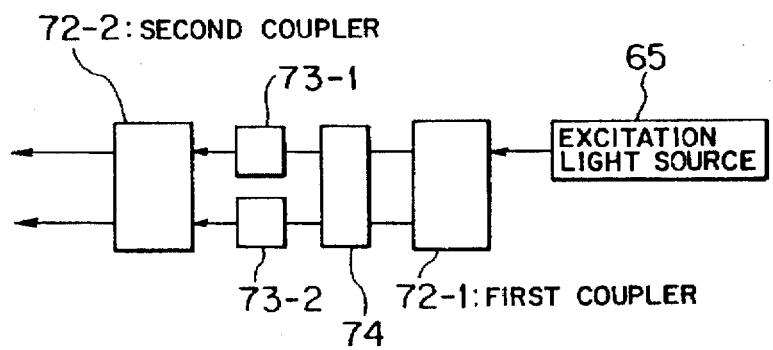
FIG. 35 is a block diagram showing a third modification to the optical amplification apparatus shown in FIG. 32.

FIG. 35 shows a third modification to the optical amplification apparatus for an optical communication system of the fifth embodiment of the present invention. Referring to FIG. 35, the modified optical amplification apparatus shown is different from the optical amplification apparatus of the fifth embodiment shown in FIG. 32 in that a delay time difference providing section 74 is interposed between the first and second couplers 72-1 and 72-2.

In particular, the delay time difference providing section 74 provides a delay time to one of two excitation light beams branched into two routes P and Q by the first coupler 72-1 so as to provide a great delay time difference between the two routes P and Q before the two excitation light beams are coupled by the second coupler 72-2.

The first and second couplers 72-1 and 72-2 are connected at connection portions 73-1 and 73-2, respectively. Thus, the two output terminals of the first coupler 72-1 are connected to the two input terminals of the second coupler 72-2 by way of the connection portions 73-1 and 73-2.

Accordingly, if excitation light is branched into two beams and the two beams are coupled after they pass two different routes, then interference of light sometimes occurs to produce a fluctuation in intensity of light. However, by providing a delay time difference between the two routes P and Q as described above, the correlation of two light beams to be coupled is reduced to suppress the fluctuation in intensity of light.

In this manner, with the optical amplification apparatus for an optical communication system of the third modification to the fifth embodiment of the present invention, the advantages achieved by the fifth embodiment are achieved. Besides, since the fluctuation in intensity of light can be suppressed, further stabilized excitation light can be supplied. Consequently, there is an advantage in that deterioration of the signal to noise ratio of signal light can be suppressed further.

f4. Description of the Fourth Modification to the Fifth Embodiment

Figure 36:
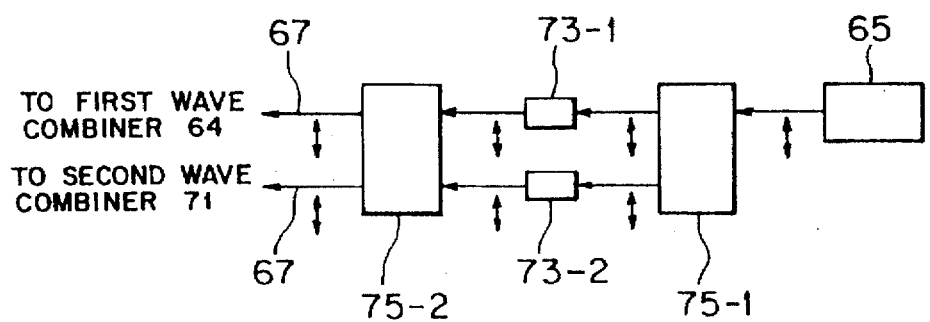
FIG. 36 is a block diagram showing a fourth modification to the optical amplification apparatus shown in FIG. 32.

FIG. 36 shows a fourth modification to the optical amplification apparatus for an optical communication system of the fifth embodiment of the present invention. Referring to FIG. 36, the modified optical amplification apparatus shown is different from the optical amplification apparatus of the fifth embodiment shown in FIG. 32 in that excitation light is outputted from the excitation light source 65 to the first and second doped fibers 61 and 68 by way of the polarization holding fiber 67 and the optical coupler 72 is constituted from a first polarization holding fiber coupler 75-1 and a second polarization holding fiber coupler 75-2 connected in series at two stages.

Further, the first and second polarization holding fiber couplers 75-1 and 75-2 are connected to each other by way of the connection portions 73-1 and 73-2. Here, however, they are constructed such that the polarization directions of the first and second polarization holding fiber couplers 75-1 and 75-2 at the connection portion 73-1 coincide with each other and the polarization directions of the first and second polarization holding fiber couplers 75-1 and 75-2 at the other connection portion 73-2 coincide with each other.

In particular, when the main axis of output light of the excitation light source 65 is directed in a vertical direction in FIG. 36 and the main axis of output light of the first polarization holding fiber coupler 75-1 at the connection portion 73-1 is directed in a vertical direction, then also the main axis of input light to the second polarization holding fiber coupler 57-2 is directed in a vertical direction. Similarly, when the main axis of output light of the first polarization holding fiber coupler 75-1 at the connection portion 73-2 is direction in a vertical direction, also the main axis of input light to the second polarization holding fiber coupler 75-2 is directed in a vertical direction.

It is to be noted that, in this instance, the main axes of excitation light outputted from the second polarization holding fiber coupler 75-2 to the first and second wave combiners 64 and 71 are both directed in a vertical direction.

Accordingly, also with the optical amplification apparatus for an optical communication system of the present modification, the advantages achieved by the fifth embodiment are achieved. In addition, since excitation light is supplied by way of the polarization holding fiber 67, further stabilized excitation light can be supplied, and consequently, there is an advantage in that otherwise possible deterioration of the signal to noise ratio of signal light can be suppressed further.

f5. Description of the Fifth Modification to the Fifth Embodiment

Figure 37:
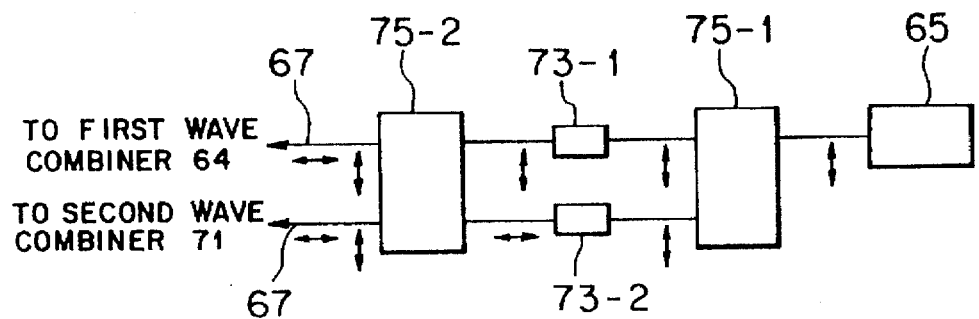
FIG. 37 is a block diagram showing a fifth modification to the optical amplification apparatus shown in FIG. 32.

FIG. 37 shows a fifth modification to the optical amplification apparatus for an optical communication system of the fifth embodiment of the present invention. Referring to FIG. 37, the modified optical amplification apparatus shown is a modification also to and different from the optical amplification apparatus of the fourth modification to the fifth embodiment in that the second polarization holding fiber coupler 75-2 is connected at the connection portions 73-1 and 73-2 such that the main axes of two polarized light beams of excitation light inputted to the second polarization holding fiber coupler 75-2 are different from each other.

In particular, the second polarization holding fiber coupler 75-2 is connected at the connection portions 73-1 and 73-2 such that, where the main axis of output light of the excitation light source 65 is directed in a vertical direction and the main axes of two output light beams of the first polarization holding fiber coupler 75-1 at the connection portions 73-1 and 73-2 are both directed in a vertical direction, the main axis of input light to the second polarization holding fiber coupler 75-2 is directed in a vertical direction at the connection portion 73-1 and the main axis of input light to the second polarization holding fiber coupler 75-2 is directed in a horizontal direction at the connection portion 73-2.

In this manner, with the optical amplification apparatus for an optical communication system of the fifth modification to the fifth embodiment of the present invention, the advantages achieved by the fifth embodiment are achieved. Besides, since the fluctuation in intensity of light can be suppressed, further stabilized excitation light can be supplied. Consequently, there is an advantage in that deterioration of the signal to noise ratio of signal light can be suppressed further.

f6. Description of the Sixth Modification to the Fifth Embodiment

Figure 38:
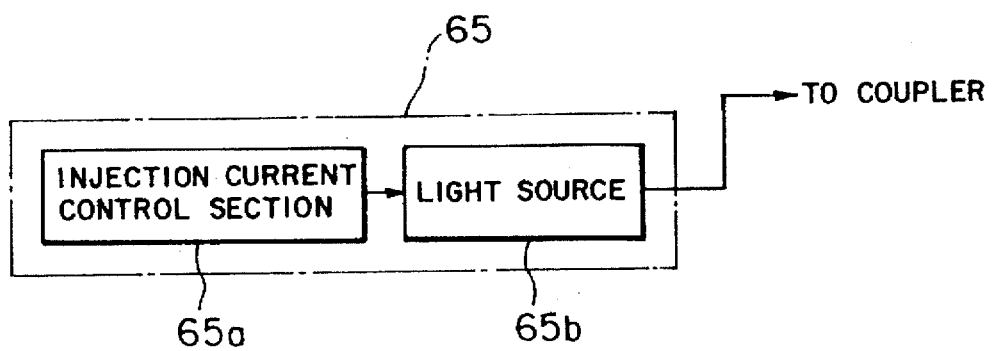
FIG. 38 is a block diagram showing a sixth modification to the optical amplification apparatus shown in FIG. 32.

FIG. 38 shows a sixth modification to the optical amplification apparatus for an optical communication system of the fifth embodiment of the present invention. Referring to FIG. 38, the modified optical amplification apparatus shown is different from the optical amplification apparatus of the fifth embodiment in that the excitation light source 65 includes an injection current control section 65a and a light source 65b.

In particular, the injection current is varied under the control of the injection current control section 65a so that excitation light outputted from the light source 65b may vary with a frequency higher than 1 kHz.

Accordingly, the variation of the optical output of excitation light from the excitation light source 65 by a temperature variation or a like parameter can be compensated for, and excessive losses of the first and second wave combiners 64 and 71 can be suppressed. Consequently, such advantages as are achieved by the fifth embodiment are achieved, and besides, since stabilized excitation light can be outputted, there is an additional advantage that enhancement of the signal to noise ratio can be further promoted.

f7. Description of the Seventh Modification to the Fifth Embodiment

Figure 39:
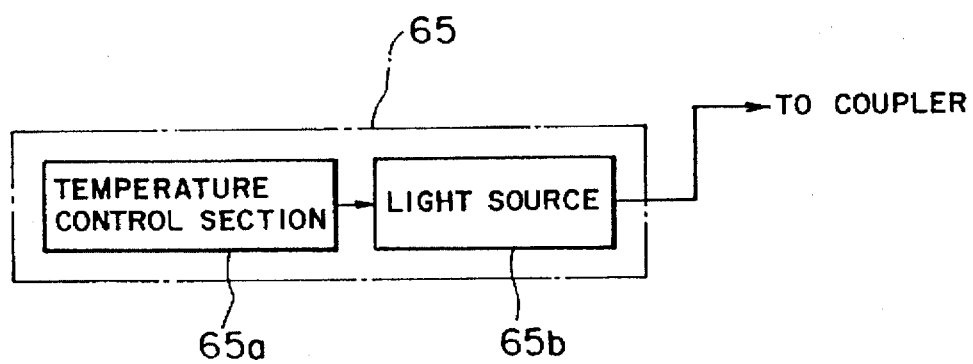
FIG. 39 is a block diagram showing a seventh modification to the optical amplification apparatus shown in FIG. 32.

FIG. 39 shows a seventh modification to the optical amplification apparatus for an optical communication system of the fifth embodiment of the present invention. Referring to FIG. 39, the modified optical amplification apparatus shown is different from the optical amplification apparatus of the fifth embodiment only in that the excitation light source 65 includes a temperature control section 65c and a light source 65b.

In particular, the temperature around the excitation light source 65 is varied under the control of the temperature control section 65c so that excitation light outputted from the light source 65b may be varied with a frequency higher than 1 kHz.

Accordingly, the variation of the optical output of excitation light from the excitation light source 65 by a temperature variation or a like parameter can be compensated for, and excessive losses of the first and second wave combiners 64 and 71 can be suppressed. Consequently, such advantages as are achieved by the fifth embodiment are achieved, and besides, since stabilized excitation light can be outputted, there is an additional advantage that enhancement of the signal to noise ratio can be further promoted.

f8. Description of the Eighth Modification to the Fifth Embodiment

Figure 40:
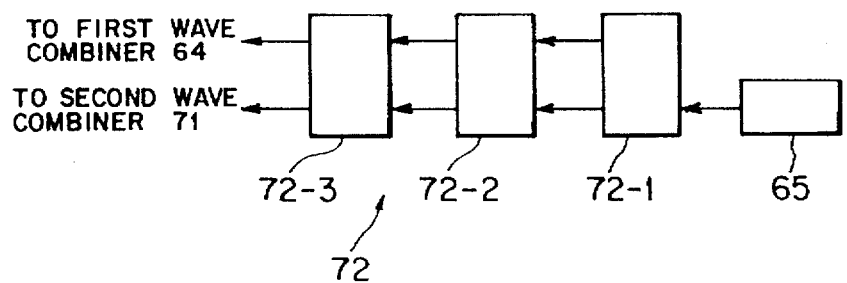
FIG. 40 is a block diagram showing an eighth modification to the optical amplification apparatus shown in FIG. 32.

FIG. 40 shows an eighth modification to the optical amplification apparatus for an optical communication system of the fifth embodiment of the present invention. Referring to FIG. 40, the modified optical amplification apparatus shown is different from the optical amplification apparatus of the fifth embodiment only in that the optical coupler 72 includes first, second and third couplers 72-1, 72-2 and 72-3 connected in series at three stages.

Due to the connection, the branching ratio variation of the optical coupler can be further suppressed comparing with an optical coupler in which two optical couplers are connected in series at two stages as in the fifth embodiment, and accordingly, there is an advantage in that deterioration of the signal to noise of signal light can be suppressed.

It is to be noted that, while the optical coupler 72 in the present modification includes three optical couplers connected in series at three stages, the present invention is not limited to the specific arrangement, and optical couplers may be connected at a plurality of stages greater than three. This may also be applied to the modifications described above.

g. Description of the Sixth Embodiment

Figure 41:
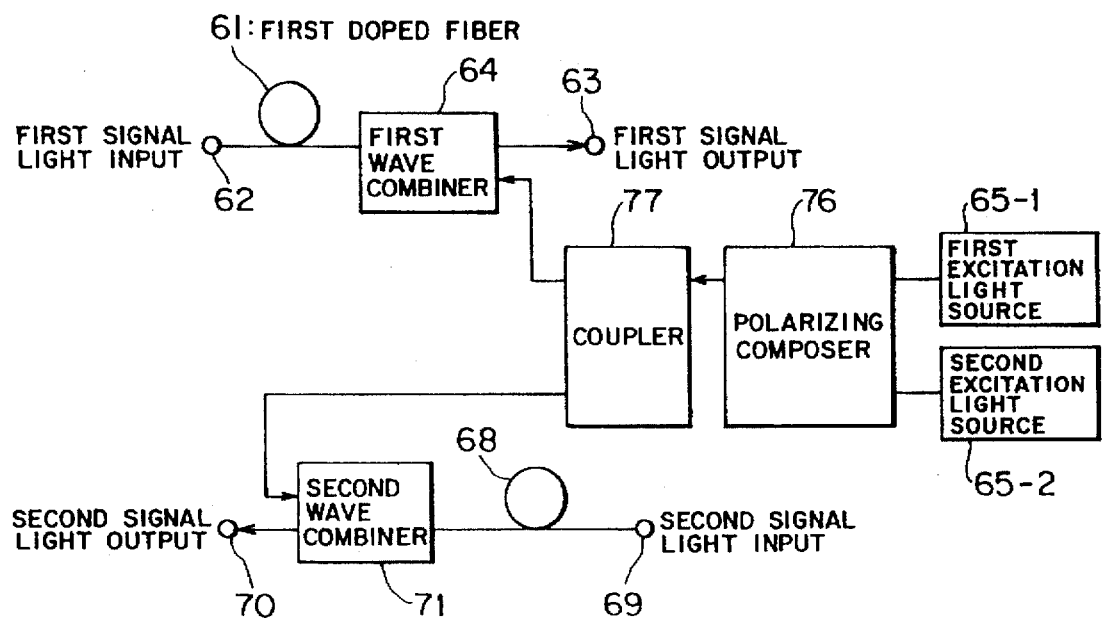
FIG. 41 is a block diagram of a still further optical amplification apparatus for an optical communication system showing a sixth preferred embodiment of the present invention.

Referring now to FIG. 41, there is shown an optical amplification apparatus for an optical communication system according to a sixth preferred embodiment of the present invention. Also the present optical amplification apparatus for an optical communication system is applied to such a repeater 17 in an optical communication system as described hereinabove with reference to FIG. 8.

The optical amplification apparatus shown is a modification to and but different from the optical amplification apparatus for an optical communication system of the fourth or fifth embodiment described hereinabove with reference to FIG. 24 or 32 in that it includes, in place of the excitation light source 65, two excitation light sources including a first excitation light source 65-1 and a second excitation light source 65-2 and additionally includes a polarizing composer 76 serving as excitation light distribution means and an optical coupler 77 which serves as excitation light distribution means but is not constituted from a polarization holding fiber coupler but constituted from a directional coupler.

In particular, excitation light beams outputted from the first and second excitation light sources 65-1 and 65-2 are inputted to the polarizing composer 76 and composed into a single excitation light beam, which is inputted to the coupler 77. Consequently, the excitation light beams from the first and second excitation light sources 65-1 and 65-2 are supplied simultaneously to the first and second doped fibers 61 and 68.

Further, the first and second excitation light sources 65-1 and 65-2 simultaneously output excitation light. However, when their oscillation wavelengths are to be varied, a different frequency or frequencies are supplied to one or both of the first and second excitation light sources 65-1 and 65-2 to vary polarization of excitation light from them. Further, the first and second excitation light sources 65-1 and 65-2 are set so that the sum of the light powers outputted from them may be lower than a maximum excitation light power which can be outputted from one of them when the other of them is broken.

The first and second doped fibers 61 and 68 doped with erbium, the first and second input ports 62 and 69, the first and second output ports 63 and 70, and the first and second wave combiners 64 and 71 have similar functions to those of the optical amplification apparatus for an optical communication system of the fourth or fifth embodiment described hereinabove.

Accordingly, since excitation light is supplied simultaneously to the first and second doped fibers 61 and 68, the variations of the gains of signal light outputted by way of the first and second output ports 63 and 67 can be suppressed. Consequently, there is an advantage in that deterioration of the signal to noise ratio of signal light can be suppressed.

g1. Description of the First Modification to the Sixth Embodiment

Figure 42:
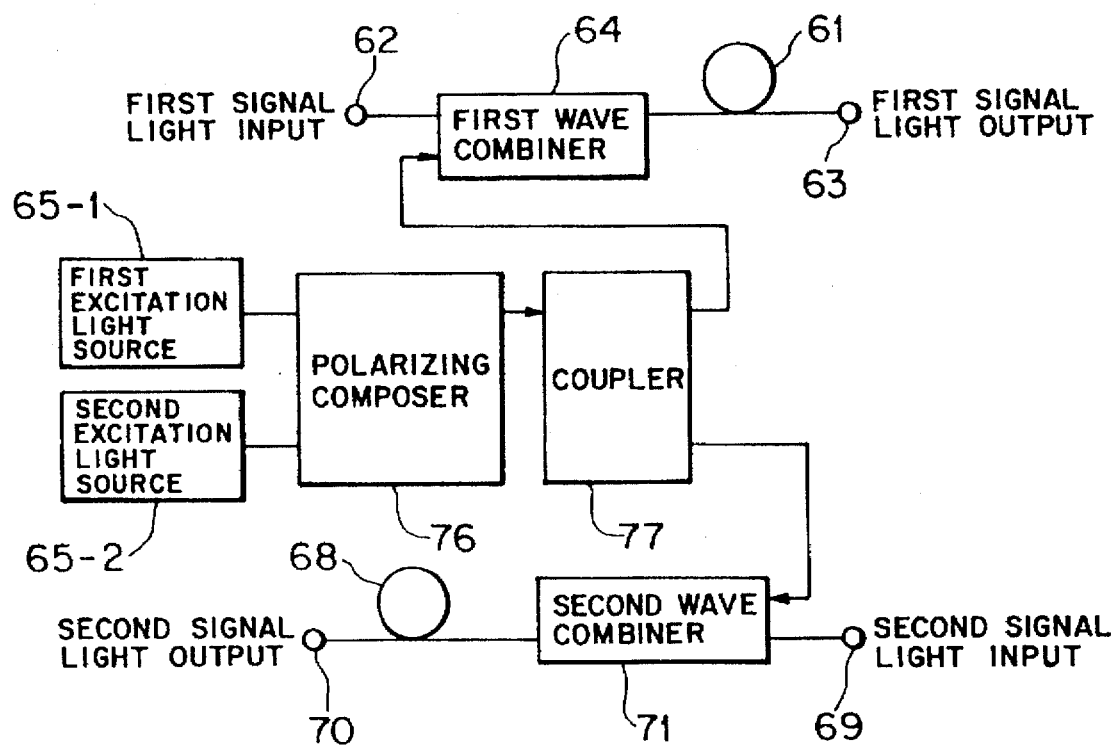
FIG. 42 is a block diagram showing a first modification to the optical amplification apparatus shown in FIG. 41.

FIG. 42 shows a first modification to the optical amplification apparatus for an optical communication system of the sixth embodiment of the present invention. Referring to FIG. 42, the modified optical amplification apparatus shown is different from the optical amplification apparatus of the sixth embodiment shown in FIG. 41 only in that, while the optical amplification apparatus of the sixth embodiment has a forward excitation construction wherein excitation light is inputted to the first and second doped fibers 61 and 68 from the front, the modified optical amplification apparatus has a rearward excitation construction wherein excitation light is inputted to the first and second doped fibers 61 and 68 from the rear.

Accordingly, also the optical amplification apparatus for an optical communication system shown in FIG. 42 presents similar advantages to those of the sixth embodiment described above.

g2. Description of the Second Modification to the Sixth Embodiment

Figure 43:
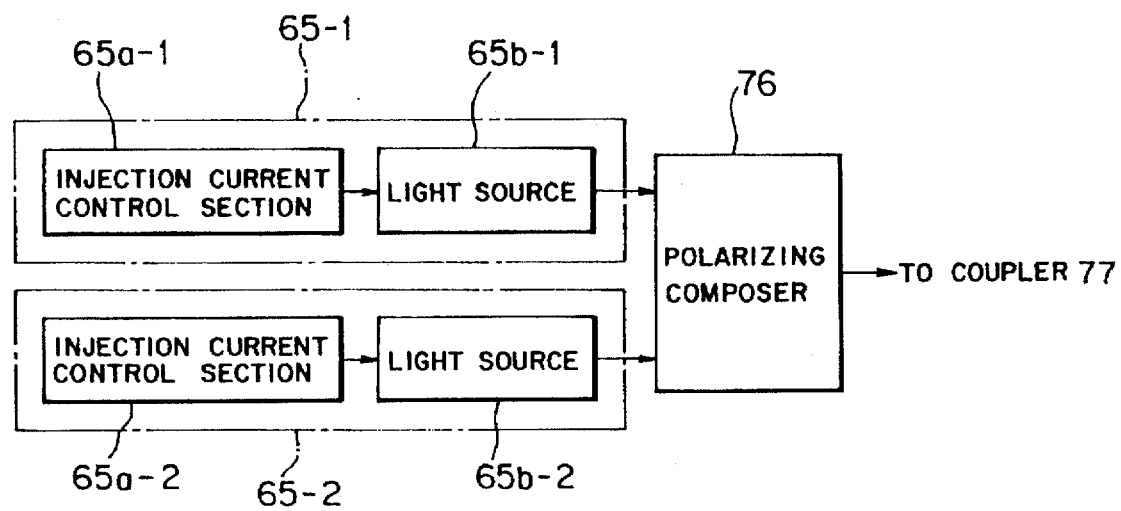
FIG. 43 is a block diagram showing a second modification to the optical amplification apparatus shown in FIG. 41.

FIG. 43 shows a second modification to the optical amplification apparatus for an optical communication system of the sixth embodiment of the present invention. Referring to FIG. 43, the modified optical amplification apparatus shown is different from the optical amplification apparatus of the sixth embodiment shown in FIG. 41 only in that the excitation light source 65-1 includes an injection current control section 65a-1 and a light source 65b-1 and the excitation light source 65-2 includes an injection current control section 65a-2 and a light source 65b-2.

In particular, the injection currents are varied under the control of the injection current control sections 65a-1 and 65a-2 so that excitation light outputted from the light sources 65b-1 and 65b-2 may vary with a frequency higher than 1 kHz.

Accordingly, the variations of the optical outputs of excitation light from the excitation light sources 65-1 and 65-2 by a temperature variation or a like parameter can be compensated for, and excessive losses of the first and second wave combiners 64 and 71 can be suppressed. Consequently, such advantages as are achieved by the sixth embodiment are achieved, and besides, since stabilized excitation light can be outputted, there is an additional advantage that enhancement of the signal to noise ratio can be further promoted.

g3. Description of the Third Modification to the Sixth Embodiment

Figure 44:
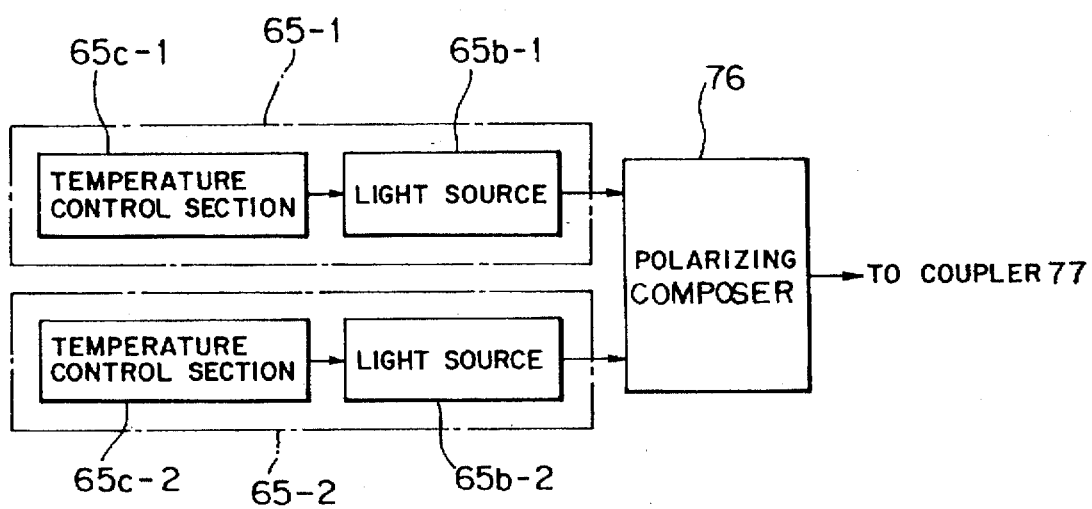
FIG. 44 is a block diagram showing a third modification to the optical amplification apparatus shown in FIG. 41.

FIG. 44 shows a third modification to the optical amplification apparatus for an optical communication system of the sixth embodiment of the present invention. Referring to FIG. 44, the modified optical amplification apparatus shown is different from the optical amplification apparatus of the sixth embodiment only in that the first excitation light source 65-1 includes a temperature control section 65c-1 and a light source 65b-1 and the second excitation light source 65-2 includes a temperature control section 65c-2 and a light source 65b-2.

In particular, the temperature around the excitation light source 65 is varied under the control of the temperature control sections 65c-1 and 65c-2 so that excitation light outputted from the light sources 65b-1 and 65b-2 may be varied with a frequency higher than 1 kHz.

Accordingly, the variations of the optical outputs of excitation light from the excitation light sources 65-1 and 65-2 by a temperature variation or a like parameter can be compensated for, and excessive losses of the first and second wave combiners 64 and 71 can be suppressed. Consequently, such advantages as are achieved by the sixth embodiment are achieved, and besides, since stabilized excitation light can be outputted, there is an additional advantage that enhancement of the signal to noise ratio can be further promoted.

g4. Description of the Fourth Modification to the Sixth Embodiment

Figure 45:
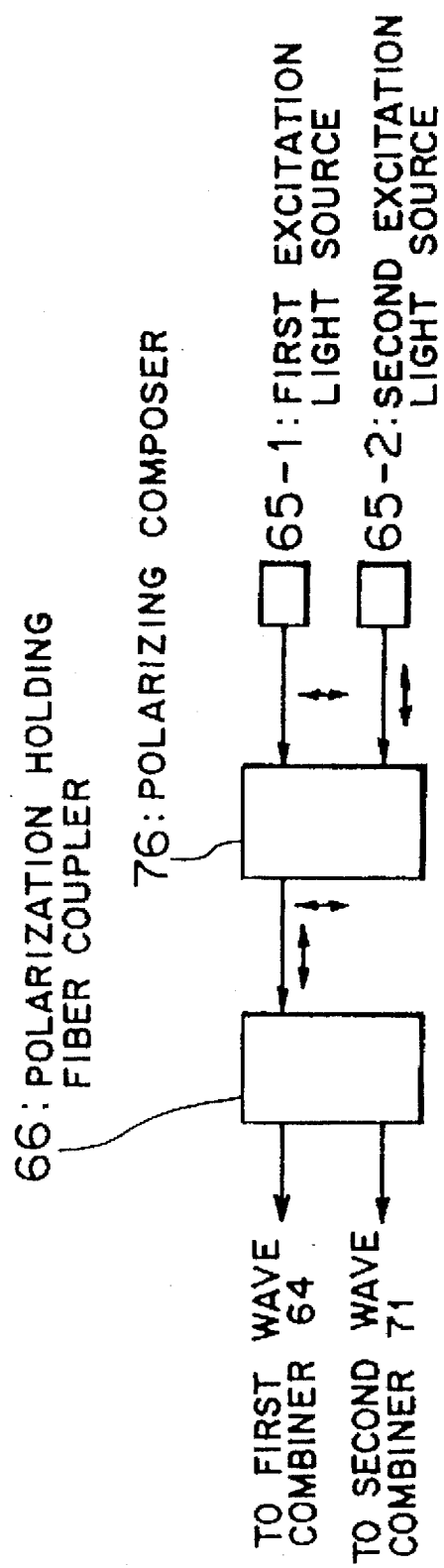
FIG. 45 is a block diagram showing a fourth modification to the optical amplification apparatus shown in FIG. 41.

FIG. 45 shows a fourth modification to the optical amplification apparatus for an optical communication system of the sixth embodiment of the present invention. Referring to FIG. 45, the modified optical amplification apparatus shown is different from the optical amplification apparatus of the sixth embodiment in that the first and second excitation light sources 65- and 65-2 and the first and second wave combiners 64 and 71 are connected to each other by way of a polarization holding fiber 67 and the optical coupler 77 is replaced by a polarization holding fiber coupler 66.

In particular, excitation light is outputted from the excitation light source 65 to the polarization composer 76 by way of the polarization holding fiber 67. Then, the polarized light composed by the polarization composer 76 is outputted to the first and second doped fibers 61 and 68 by way of the polarization holding fiber 67 while it maintains the polarization condition thereof.

It is to be noted that the first and second doped fibers 61 and 68 doped with erbium, the first and second input ports 62 and 69, the first and second output ports 63 and 70, and the first and second wave combiners 64 and 71 have similar functions to those of the optical amplification apparatus for an optical communication system of the sixth embodiment described hereinabove.

Further, the polarization composer 76 is connected such that the main axis of polarized light on the output side thereof may coincide with the main axis of polarized light of the polarization holding fiber 67.

In particular, the polarization composer 76 is connected such that, where the main axis of polarized light of output light from the first excitation light source 65-1 is directed in a vertical direction and the main axis of polarized light of output light from the second excitation light source 65-2 is directed in a horizontal direction as seen in FIG. 45, the main axis of polarized light on the output side of the polarization composer 76 is directed in either one of a horizontal direction and a vertical direction.

Accordingly, also with the optical amplification apparatus for an optical communication system of the present modification, such advantages as are achieved by the sixth embodiment are achieved, and besides, since excitation light is supplied by way of the polarization holding fiber 67 and the polarization holding fiber coupler 66, further stabilized excitation light can be supplied by maintaining the polarization condition of excitation light. Consequently, there is an additional advantage that deterioration of the signal to noise ratio of signal light can be suppressed further.

h. Others

It is to be noted that, also with the optical transmission apparatus for an optical communication system according to the second embodiment of the present invention, simulation calculation results of the polarization condition variation similar to those achieved by the first embodiment and illustrated in FIGS. 46 to 50 can be achieved, and naturally the optical amplifier apparatus for an optical communication system according to the third to sixth embodiments can be applied to the model of simulation calculation of the polarization condition variation described hereinabove.

The present invention is not limited to the specifically described embodiment, and variations and modifications may be made without departing from the scope of the present invention.

What is claimed is:

1. An optical transmission method for an optical communication system having an optical transmission apparatus, comprising the steps of:

providing light depolarization means on an optical transmission apparatus side in said communication system and producing depolarized light;

providing a modulator on said optical transmission apparatus side and connecting said modulator to said depolarization means such that the depolarized light outputted from said depolarization means is inputted to said modulator in such polarization directions that polarization dependencies of said depolarization means and said modulator are cancelled with each other;

modulating depolarized light produced by said depolarization means, to produce modulated depolarized signal light by said modulator; and transmitting the modulated depolarized signal light, said signal light being amplified by an optical amplifier including a rare earth metal doped fiber.

2. An optical transmission apparatus for an optical communication system, comprising:

a depolarized light source for outputting depolarized light;

an external modulator for modulating the depolarized light from said depolarized light source to produce modulated depolarized signal light to be transmitted, said signal light being amplified by an optical amplifier including a rare earth metal doped fiber; and said depolarized light source and said external modulator being connected to each other such that the depolarized light outputted from said depolarized light source is inputted to said external modulator in such polarization directions that polarization dependencies of said depolarized light source and said external modulator are cancelled with each other.

3. An optical transmission apparatus for an optical communication system as claimed in claim 2, wherein said external modulator is an electric field absorbing modulator.

4. An optical transmission apparatus for an optical communication system as claimed in claim 2, wherein said depolarized light source includes a light source and depolarization means.

5. An optical transmission apparatus for an optical communication system as claimed in claim 4, wherein said depolarized light source further includes polarization control means interposed between said light source and said depolarization means for outputting linearly polarized light.

6. An optical transmission apparatus for an optical communication system as claimed in claim 2, wherein said depolarized light source is spontaneous emission light emitted from an external amplifier.

7. An optical transmission apparatus for an optical communication system as claimed in claim 6, wherein the spontaneous emission light emitted from said external amplifier is used as said depolarized light source after it is narrowed into light of a narrow band by an optical filter.

8. An optical transmission apparatus for an optical communication system as claimed in claim 2, wherein said depolarized light source includes a light emitting diode.

9. An optical transmission apparatus for an optical communication system as claimed in claim 8, wherein said depolarized light source further includes an optical filter for narrowing output light of said light emitting diode into light of a narrow band.

10. An optical transmission apparatus for an optical communication system as claimed in claim 2, wherein said depolarized light source includes a pair of light sources for outputting linearly polarized light beams having an equal output power, and a wave combiner for coupling the linearly polarized light beams from said light sources orthogonally to each other, said light sources outputting light beams which have signal wavelengths equal to or a little different from each other.

11. An optical transmission apparatus for an optical communication system as claimed in claim 10, wherein said depolarized light source further includes a pair of polarization control means interposed between said light sources and said wave combiner each for outputting linearly polarized light.

12. An optical transmission method for an optical communication system, comprising the steps of:

depolarizing light emitted from a light source and modulating said light during the depolarization to produce modulated/depolarized signal light; and transmitting the modulated/depolarized signal light, said signal light being amplified by an optical amplifier including a rare earth metal doped fiber.

13. An optical transmission apparatus for an optical communication system, comprising:

a light source for outputting light; and external modulation/depolarization means for depolarizing the light from said light source and modulating said light during the depolarization to produce modulated/depolarized signal light, said signal light being transmitted to an optical amplifier including a rare earth metal doped fiber.

14. An optical transmission apparatus for an optical communication system as claimed in claim 13, further comprising polarization control means interposed between said light source and said external modulator for outputting linearly polarized light.

15. An optical transmission apparatus for an optical communication system as claimed in claim 13, wherein said external modulator is an electric field absorbing modulator.

16. An optical transmission apparatus for an optical communication system as claimed in claim 13, wherein said light source includes linearly polarized light outputting means for outputting linearly polarized light, and a beam splitter for branching the linearly polarized light from said linear polarized light outputting means into two beams while maintaining polarization thereof; said external modulator includes a first external modulator for modulating one of the two beams from said beam splitter, and a second external modulator for modulating the other beam from said beam splitter; and said depolarization means includes delay means provided on a route of one of the two beams from said beam splitter for providing a route difference from another route of the other beam from said beam splitter to the route of the one beam with which a delay time difference of the route of the one beam from the route of the other beam is sufficiently longer than a coherence time, and a wave combiner for coupling the two polarized signal light beams from said first and second external modulators orthogonally to each other.

17. An optical transmission apparatus for an optical communication system as claimed in claim 16, wherein said light source outputs a solution pulse train, and the lengths of the routes of the two beams from said beam splitter to said first and second external modulators are adjusted so that a delay time difference between the two routes may be equal to an integral number of times of a solution pulse cycling time.

18. An optical transmission apparatus for an optical communication system as claimed in claim 16, further comprising means for providing a delay time difference between driving data signals to be supplied to said first and second external modulators.

19. An optical transmission apparatus for an optical communication system as claimed in claim 16, wherein a pair of routes along which driving data signals are supplied to said first and second external modulators and another pair of routes along which optical signals are transmitted from said first and second external modulators to said wave combiner are set equal in length to each other.

20. An optical transmission apparatus for an optical communication system as claimed in claim 13, wherein said light source includes first and second light sources for outputting linearly polarized light beams having an equal output power; said external modulator includes first and second external modulators for modulating the linearly polarized light beams from said first and second light sources, respectively; and said depolarization means includes a wave combiner for coupling the polarized light beams from said first and second external modulators orthogonally to each other; said first and second light sources outputting light beams which have signal wavelengths equal to or a little different from each other.

21. An optical transmission apparatus for an optical communication system as claimed in claim 20, further comprising means for providing a delay time difference between driving data signals to be supplied to said first and second external modulators.

22. An optical transmission apparatus for an optical communication system as claimed in claim 20, wherein a pair of routes along which driving data signals are supplied to said first and second external modulators and another pair of routes along which optical signals are transmitted from said first and second external modulators to said wave combiner are set equal in length to each other.

* * * * *